United States Patent
Aker et al.

(10) Patent No.: US 6,803,746 B2
(45) Date of Patent: Oct. 12, 2004

(54) FAST CHARGER FOR HIGH CAPACITY BATTERIES

(75) Inventors: John F. Aker, Barboursville, VA (US); James R. Wade, Palmyra, VA (US)

(73) Assignee: Aker Wade Power Technologies, LLC, Charlottesville, VA (US)

( * ) Notice: Subject to any disclaimer, the term of this patent is extended or adjusted under 35 U.S.C. 154(b) by 74 days.

(21) Appl. No.: 10/287,753

(22) Filed: Nov. 4, 2002

(65) Prior Publication Data

US 2003/0102845 A1 Jun. 5, 2003

Related U.S. Application Data

(60) Provisional application No. 60/336,396, filed on Nov. 2, 2001.

(51) Int. Cl.⁷ .......................... H01M 10/44; H01M 10/46
(52) U.S. Cl. ........................................................ 320/139
(58) Field of Search ................................. 320/166, 107, 320/111, 128, 139, 140, 141, 145; 363/62

(56) References Cited

U.S. PATENT DOCUMENTS

| | | | |
|---|---|---|---|
| 3,959,707 A | 5/1976 | Stephens | |
| 5,150,033 A | 9/1992 | Conway | |
| 5,177,427 A | 1/1993 | Bugaj | |
| 5,245,520 A | * 9/1993 | Imbertson | 363/17 |
| 5,638,265 A | * 6/1997 | Gabor | 363/89 |
| 5,742,151 A | 4/1998 | Hwang | |
| 5,940,287 A | 8/1999 | Brkovic | |
| 6,215,282 B1 | 4/2001 | Richards et al. | |
| 6,232,754 B1 | 5/2001 | Liebler et al. | |
| 6,326,766 B1 | * 12/2001 | Small | 320/112 |
| 6,388,425 B1 | 5/2002 | Petrovic | |

* cited by examiner

*Primary Examiner*—Edward H. Tso
(74) *Attorney, Agent, or Firm*—Steven J. Hultquist; Janet R. Elliott; Yongzhi Yang

(57) ABSTRACT

A highly efficient fast charger for high capacity batteries and methods for fast charging high capacity batteries. The fast charger preferably comprises a rectified AC input of single or preferably three phases, with an optional power factor corrected input, minimally filtered with high frequency, high ripple current capacitors, which is switched with a power switching circuit in the "buck" configuration into an inductor/capacitor output filter. Metallized film capacitors are employed, to minimize the rectified 360 Hertz AC component filtering while providing transient switch protection and ripple current requirements for the buck regulator, to provide a high current fast charger with substantially improved power factor. High power, high frequency switching with minimized output filter size provides a highly filtered DC output. The fast charger is adapted to be constructed in a modular design for simple maintenance.

100 Claims, 47 Drawing Sheets

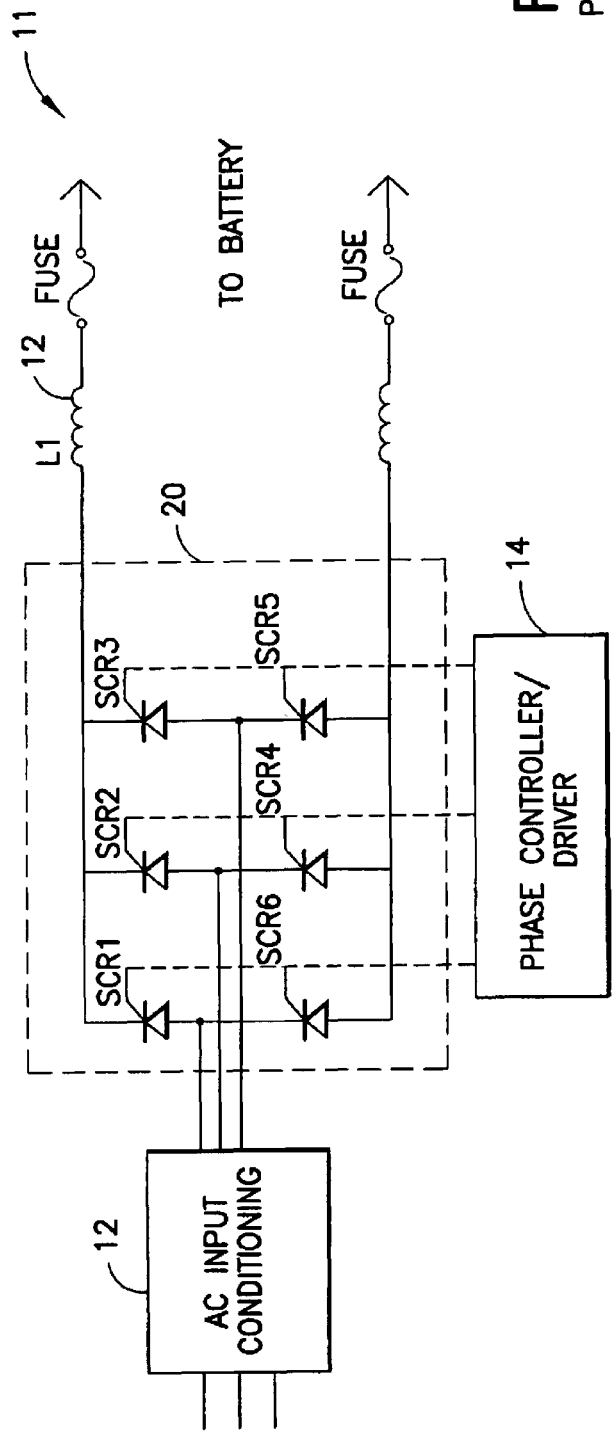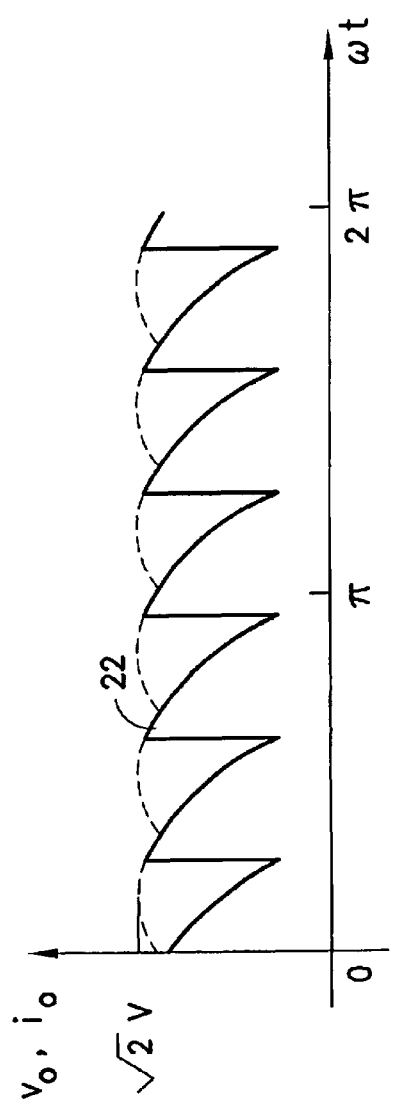
FIG.2 PRIOR ART
FIG2A

Software Code

;******* T1 PWM Control Code ***************
T1PWM_CNTRL
         CALL    ADC_AVG1
         LDP     #VOLTS1              ;SET UP DATA POINTER
         LAR     AR1,VOLTS1           ;Load VOLTS1 in AR1
         LDP     #MAX_VOLTS1          ;SET UP DATA POINTER
         LAR     AR0,MAX_VOLTS1       ;Load MAX_VOLTS in AR0
         MAR     *,AR1
         CMPR    2                    ;Test if AR1 > AR0
         BCND    DEC_PWM1,TC          ;If Volts1 > Vmax then DEC PWM
                                      ;If Volts1 <= Vmax, check amps ;******* CURRENT CONTROL *******************
AMPS_CHECK1
         LDP     #AMPS1               ;SET UP DATA POINTER
         LAR     AR1,AMPS1            ;Load VOLTS1 in AR1
         LDP     #MAX_AMPS1           ;SET UP DATA POINTER
         LACL    MAX_AMPS1
         SFR
         SFR
         ADD     MAX_AMPS1
         LDP     #TEMP2
         SACL    TEMP2                ;Divide MAX AMPS by 4
         LAR     AR0,TEMP2
         MAR     *,AR1
         CMPR    2                    ;Load MAX_AMPS+25% in AR0
         BCND    DEC_PWM1,TC          ;Test if AR1 > AR0
                                      ;IfAMPS1>MAX_AMPS+12.5%then
                                      ;DEC PWM Immediately

```
        LDP     #MODE_FLAG1
        BIT     MODE_FLAG1,BIT1
        BCND    JMP_RDELAY1,TC          ;Read CV Flag
        BIT     MODE_FLAG1,BIT3         ;If CV, skip delay
        BCND    JMP_RDELAY1,TC          ;Read EQ Flag
        LDP     #RAMP_CNT1              ;If EQ, skip delay
        LACL    RAMP_CNT1               ;Else Ramp Delay
        SUB     #1
        SACL    RAMP_CNT1
        BCND    CLEAR_T1C,NEQ
        SPLK    #42,RAMP_CNT1

JMP_RDELAY1:
        LDP     #AMPS1                  ;SET UP DATA POINTER
        LAR     AR0,AMPS1               ;Load AMPS1 into AR0
        LDP     #MAX_AMPS                ;SET UP DATA POINTER
        LAR     AR1,MAX_AMPS1           ;Load MAX_AMPS into AR1
        MAR     *,AR1
        CMPR    1                       ;Test if AR1 < AR0 (AMPS1 > MAX_AMPS)
        BCND    DEC_PWM1,TC             ;If AMPS1 > MAX_AMPS decrement PWM
        CMPR    2                       ;Test if AR1 > AR0 (AMPS1 < MAX_AMPS)
        BCND    INC_PWM1,TC             ;If AMPS1 < MAX_AMPS increment PWM
        B       CLEAR_T1C               ;If equal, Clear flag and exit INC_PWM1:
        LDP     #T1CMPR>>7              ;SET UP DATA POINTER
        LAR     AR0,#0192H              ;Load 33% of T1PR in AR0
        MAR     *,AR1
        LAR     AR1,T1CMPR              ;Load T1CMPR in AR1
        CMPR    2                       ;Test if AR1>AR0 (T1CMPR>33%)
```

```
         BCND    CLEAR_T1C,TC        ;If PWM>33% then do not increment
         LAR     AR0,#0064H          ;Min pulse duty cycle
         CMPR    2                   ;Check if AR0<AR1 (Min Pulse < Present value)
         BCND    POS_STEP1,TC        ;If so branch to single increment
         CMPR    0                   ;Check if AR0=AR1 (Min Pulse = Present value)
         BCND    POS_STEP1,TC        ;If so branch to single increment
         SPLK    #0064H,T1CMPR       ;else, load min pulse width (10%)
         B       CLEAR_T1C           ;Clear flag and exit
POS_STEP1
         MAR     *+
         SAR     AR1,T1CMPR          ;Store new value into T1CMPR
         B       CLEAR_T1C           ;Clear flag and exit DEC_PWM1
         LDP     #T1CMPR>>7          ;SET UP DATA POINTER
         LAR     AR0,#0000H          ;Load min T1CMPR (0) in AR0
         MAR     *,AR1
         LAR     AR1,T1CMPR          ;Load T1CMPR in AR1
         CMPR    0                   ;Test if AR1=AR0
         BCND    CLEAR_T1C,TC        ;If PWM=0 then exit
         LAR     AR0,#0064H          ;Min pulse duty cycle
         CMPR    2                   ;Check if AR0<AR1 (Min Pulse < Present value)
         BCND    NEG_STEP1,TC        ;If so branch to single decrement
         SPLK    #0000H,T1CMPR       ;else if less than min pulse, load ZERO
         B       CLEAR_T1C           ;Clear flag and exit
NEG_STEP1
         MAR     *-                  ;else decrement
         SAR     AR1,T1CMPR          ;Store new value into T1CMPR
```

FIG. 13C

```
CLEAR_T1C
    LDP     #EVAIFRA>>7        ;SET UP DATA POINTER
    SPLK    #0100H, EVAIFRA    ;Clear T1CINT flag
    B       END_INT2           ;end interrupt if flag not set
```

FIG.13D

| FIG.13A |
|---|
| FIG.13B |
| FIG.13C |
| FIG.13D |

FIG.13

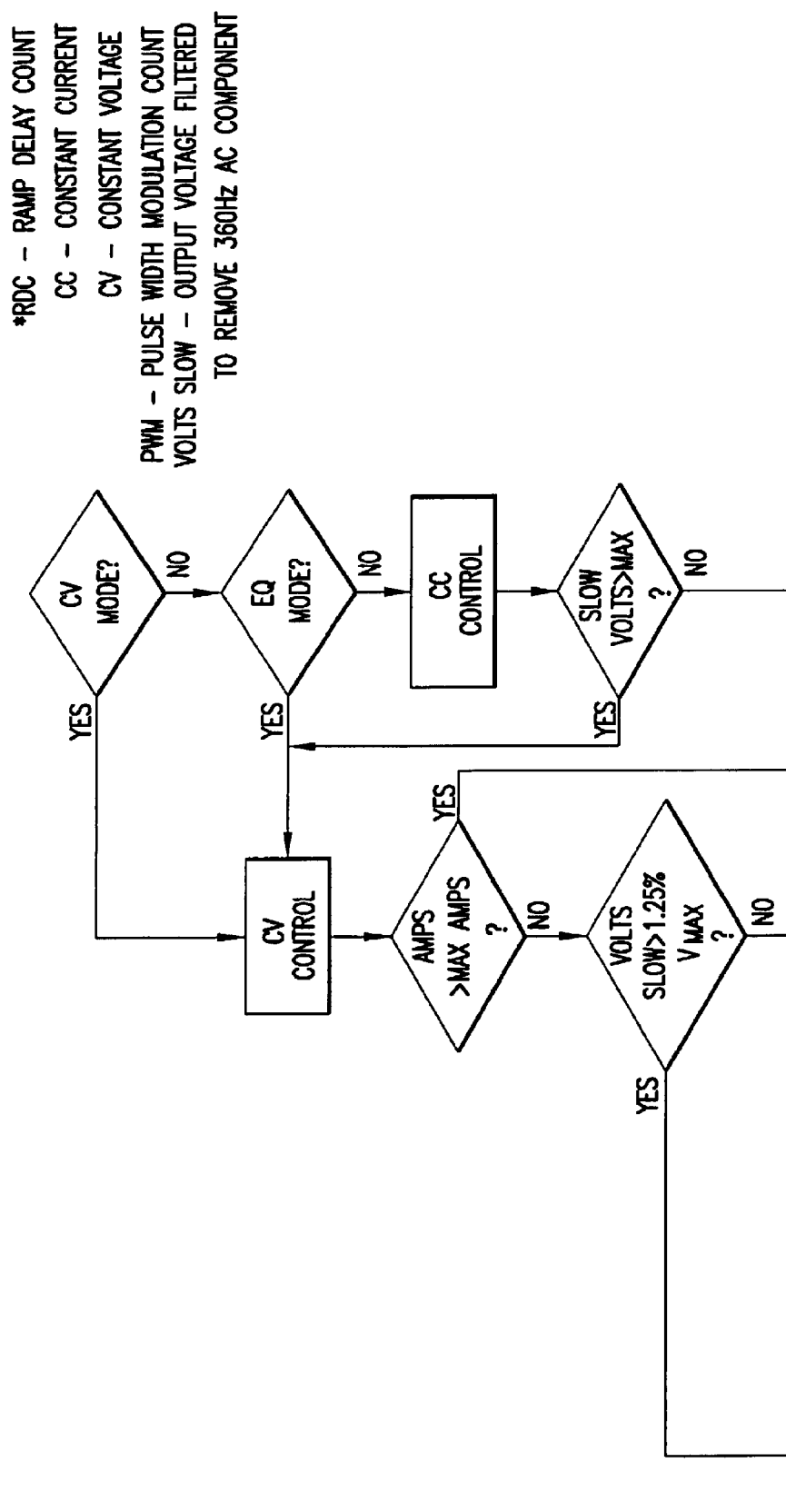

Software Listing

```
;********** T1 PWM Control Code **********
T1PWM_CNTRL CALL    ADC_AVG1
            LDP     #MODE_FLAG1
            BIT     MODE_FLAG1,BIT1         ;Read CV Flag
            BCND    CV_CONTROL1,TC          ;If CV, Branch
            BIT     MODE_FLAG1,BIT3         ;Read EQ Flag
            BCND    CV_CONTROL1,TC          ;If EQ, branch
                                            ;Else,drop into CC control
                                            ;Check over voltage first
CC_CONTROL1 LDP     #VOLTS1_SLOW
            LAR     AR1,VOLTS1_SLOW         ;Load VOLTS1 in AR1
            LDP     #MAX_ADJ_VOLTS1         ;SET UP DATA POINTER
            LAR     AR0,MAX_ADJ_VOLTS1      ;Load MAX_ADJ_VOLTS in AR0
            MAR     *,AR1
            CMPR    2                       ;Test if AR1 > AR0
            BCND    CV_RDEL1,TC             ;If Volts > Vmax then DEC PWM
                                            ;If Volts <= Vmax, check amps
;********** CURRENT CONTROL **********
            LDP     #AMPS1
            LAR     AR1,AMPS1               ;SET UP DATA POINTER
            LDP     #MAX_AMPS1              ;Load VOLTS1 in AR1
            LACL    MAX_AMPS1               ;SET UP DATA POINTER
            SFR
            SFR                             ;Divide MAX AMPS by 4
            ADD     MAX_AMPS1
            LDP     #TEMP2
            SACL    TEMP2
            LAR     AR0,TEMP2               ;Load MAX_AMPS+25% in AR0
```

FIG. 15A

```
          MAR   *,AR1
          CMPR  2                    ;Test if AR1 > AR0
          BCND  DEC_PWM1,TC          ;If AMPS1>MAX_AMPS+12.5% then DEC
                                     ;PWM Immediately ;Else Ramp Delay CC_RDEL1  LDP   #RAMP_CNT1
          LACL  RAMP_CNT1
          SUB   #1
          SACL  RAMP_CNT1
          BCND  CLEAR_T1C,NEQ
          SPLK  #84,RAMP_CNT1        ;Reload ramp count
          LDP   #AMPS1               ;SET UP DATA POINTER
          LAR   AR0,AMPS1            ;Load AMPS into AR0
          LDP   #MAX_AMPS1           ;SET UP DATA POINTER
          LAR   AR1,MAX_AMPS1        ;Load MAX_AMPS into AR1
          MAR   *,AR1
          CMPR  1                    ;Test if AR1 < AR0 (AMPS > MAX_AMPS)
          BCND  DEC_PWM1,TC          ;If AMPS > MAX_AMPS decrement PWM
          CMPR  2                    ;Test if AR1 > AR0 (AMPS1 < MAX_AMPS)
          BCND  INC_PWM1,TC          ;If AMPS < MAX_AMPS increment PWM
          B     CLEAR_T1C            ;If equal, Clear flag and exit
;*********************************************

CV_CONTROL1 LDP  #AMPS1              ;Check over AMPS first
            LAR  AR1,AMPS1           ;Load Amps in AR1
            LDP  #MAX_AMPS1          ;SET UP DATA POINTER
            LAR  AR0,MAX_AMPS1       ;Load MAX_AMPS in AR0
            MAR  *,AR1
            CMPR 2                   ;Test if AR1 > AR0
```

```
          BCND    CC_RDEL1,TC                    ;If AMPS > Imax then DEC PWM
                                                 ;If AMPS <= Imax, check Volts
;********** Voltage CONTROL **********************
          LDP     #VOLTS1_SLOW                   ;SET UP DATA POINTER
          LAR     AR1,VOLTS1_SLOW                ;Load VOLTS1 in AR1
          LDP     #MAX_ADJ_VOLTS1                ;SET UP DATA POINTER
          LACL    MAX_ADJ_VOLTS1
          SFR
          SFR
          SFR
          ADD     MAX_ADJ_VOLTS1
          LDP     #TEMP2
          SACL    TEMP2                          ;Divide MAX VOLTS by 8
          LAR     AR0,TEMP2
          MAR     *,AR1
          CMPR    2                              ;Load MAX_ADJ_VOLTS+12.5% in AR0
          BCND    DEC_PWM1,TC                    ;Test if AR1 > AR0
                                                 ;If AMPS1>MAX_ADJ_VOLTS+12.5% then
                                                 ; DEC PWM Immediately
CV_RDEL1  LDP     #RAMP_CNT1                     ;Else Ramp Delay
          LACL    RAMP_CNT1
          SUB     #1
          SACL    RAMP_CNT1
          BCND    CLEAR_T1C,NEQ
          SPLK    #84,RAMP_CNT1
          LDP     #VOLTS1_SLOW                   ;SET UP DATA POINTER
          LAR     AR0,VOLTS1_SLOW                ;Load VOLTS1 into AR0
          LDP     #MAX_ADJ_VOLTS1                ;SET UP DATA POINTER
          LAR     AR1,MAX_ADJ_VOLTS1             ;Load MAX_ADJ_VOLTS into AR1
```

```
          MAR    *,AR1
          CMPR   1                      ;Test if AR1 < AR0 (VOLTS >
                                        ; MAX_ADJ_VOLTS)
          BCND   DEC_PWM1,TC            ;If VOLTS > MAX_ADJ_VOLTS decrement
                                        ; PWM
          CMPR   2                      ;Test if AR1 > AR0 (VOLTS <
                                        ; MAX_ADJ_VOLTS)
          BCND   INC_PWM1,TC            ;If VOLTS < MAX_ADJ_VOLTS increment
                                        ; PWM
          B      CLEAR_T1C              ;If equal, Clear flag and exit
;****************************************************
INC_PWM1  LDP    #MAX_PWM1              ;SET UP DATA POINTER
          LAR    AR0,MAX_PWM1           ;Load MAX% of T1PR in AR0
          MAR    *,AR1
          LDP    #T1CMPR>>7             ;SET UP DATA POINTER
          LAR    AR1,T1CMPR             ;Load T1CMPR in AR1
          CMPR   2                      ;Test if AR1>AR0 (T1CMPR>MAX%)
          BCND   CLEAR_T1C,TC           ;If PWM>MAX% then do not increment
          LAR    AR0,#0064H             ;Min pulse duty cycle
          CMPR   2                      ;Check if AR0<AR1 (Min Pulse < Present value)
          BCND   POS_STEP1,TC           ;If so branch to single increment
          CMPR   0                      ;Check if AR0=AR1 (Min Pulse = Present value)
          BCND   POS_STEP1,TC           ;If so branch to single increment
          SPLK   #0064H,T1CMPR          ;else, load min pulse width (10%)
          B      CLEAR_T1C              ;Clear flag and exit
POS_STEP1 MAR    *+
          SAR    AR1,T1CMPR             ;Store new value into T1CMPR
          B      CLEAR_T1C              ;Clear flag and exit
```

FIG. 15D

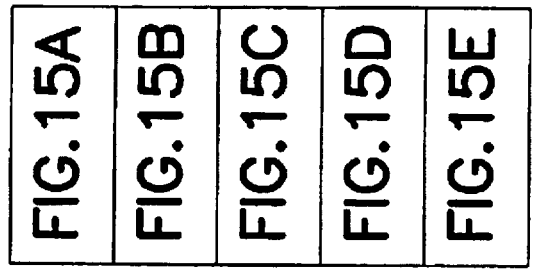

```
DEC_PWM1   LDP    #T1CMPR>>7          ;SET UP DATA POINTER
           LAR    AR0,#0000H          ;Load min T1CMPR (0) in AR0
           MAR    *,AR1
           LAR    AR1,T1CMPR          ;Load T1CMPR in AR1
           CMPR   0                   ;Test if AR1=AR0
           BCND   CLEAR_T1C,TC        ;If PWM=0 then exit
           LAR    AR0,#0064H          ;Min pulse duty cycle
           CMPR   2                   ;Check if AR0<AR1 (Min Pulse < Present value)
           BCND   NEG_STEP1,TC        ;If so branch to single decrement
           SPLK   #0000H,T1CMPR       ;else if less than min pulse, load ZERO
           B      CLEAR_T1C           ;Clear flag and exit
NEG_STEP1  MAR    *-                  ;else decrement
           SAR    AR1,T1CMPR          ;Store new value into T1CMPR
CLEAR_T1C  LDP    #FLAG_MEM
           SETBIT FLAG_MEM,0800H      ;Set flag for Watchdog
           LDP    #EVAIFRA>>7         ;SET UP DATA POINTER
           SPLK   #0100H,EVAIFRA      ;Clear T1CINT flag
           B      END_INT2            ;end interrupt if flag not set
```

FIG.15E

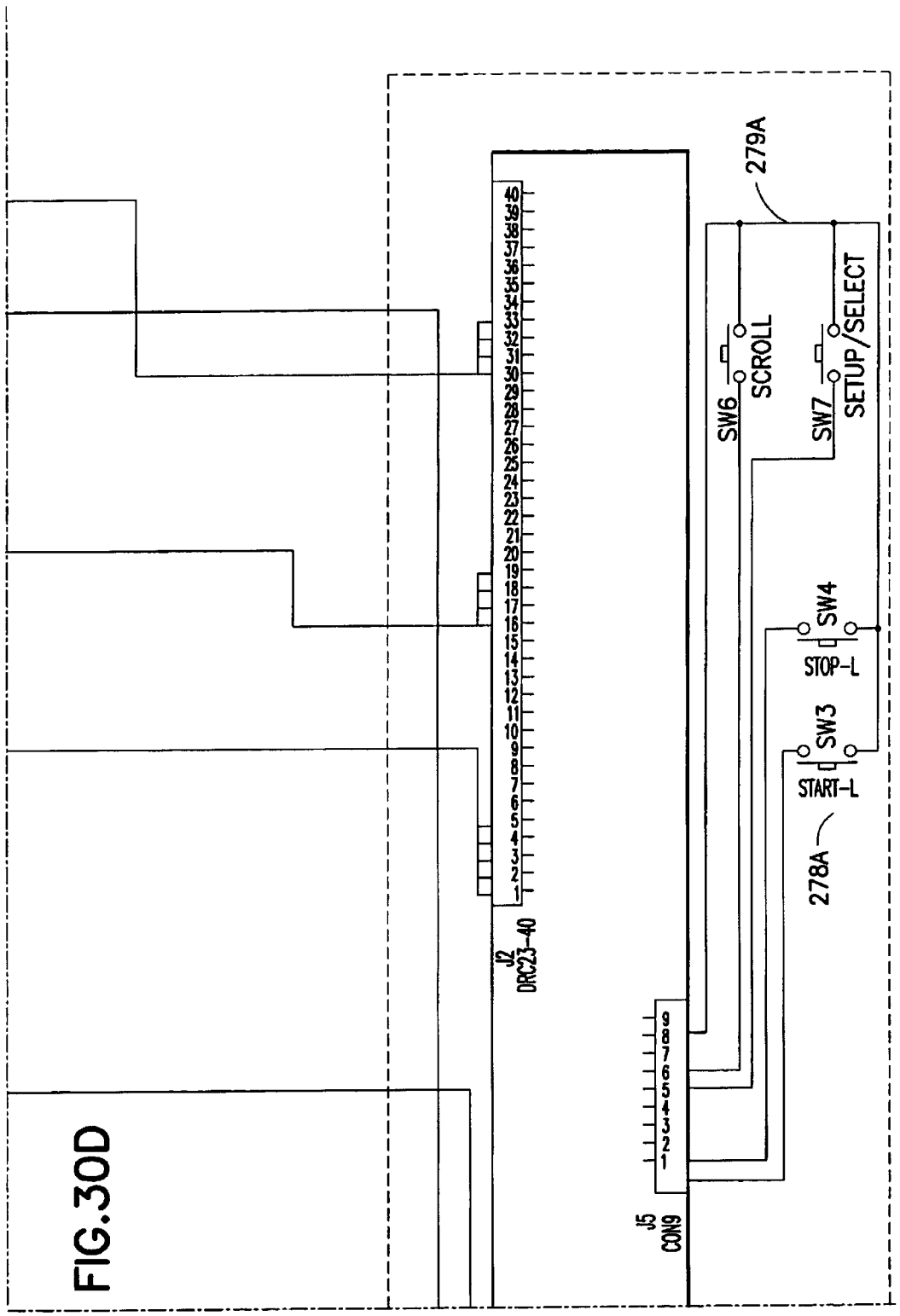

FAST CHARGER FOR HIGH CAPACITY BATTERIES

CROSS-REFERENCE TO RELATED APPLICATION

This application claims the priority under 35 U.S.C. §119 of U.S. Provisional Patent Application No. 60/336,396, filed Nov. 2, 2001 in the names of John F. Aker and James R. Wade for "COMPACT BATTERY CHARGER FOR BATTERY OPERATED FORKLIFTS AND THE LIKE." The disclosure of such application hereby is incorporated herein by reference in its entirety.

FIELD OF THE INVENTION

This invention pertains to fast charging of high capacity batteries, in particular to an apparatus and electrical circuits for fast charging high capacity batteries, methods for battery charging, and methods and software for controlling the delivery of voltage and current to high capacity batteries during fast charging.

BACKGROUND

"Fast charging" refers herein to charging a battery at a rate of greater than 30 Amperes per 100 Ampere-hours ("Ahrs") of battery capacity. A goal of fast charging is to bring the state of charge ("SOC") of a battery from 30% to 80% of full charge in less than about 1.5 hours. Conventional battery chargers typically operate at charging rates that are at or below 20A per 100 Ahrs of battery capacity, their charging rate decreases early in the charge cycle, and 8–12 hours may be required to restore a battery to full charge.

Previously, with conventional chargers, the time required for recharging has significantly inconvenienced users of high capacity batteries when the battery-powered equipment needs to remain in continuous service. "High capacity batteries" refers herein to batteries of greater than about 100 Ahrs capacity. For example, industrial users for battery-powered material handling equipment such as forklifts, electric carts, and the like have had to trade out batteries for recharging, remove them from vehicles, typically in a central battery room at some distance across the physical plant. Therefore conventional charging results in a number of disadvantages for the industrial user: loss of employee time for non-productive tasks; safety issues due to additional truck travel away from normal work areas within the plant and the need to handle heavy batteries; increased capital expenditures for the two or more batteries required per piece of equipment; and operation of battery-powered equipment at a low SOC, hence higher current, resulting in increased vehicle maintenance. Fast charging has the potential to increase employee productivity by eliminating battery change-outs; increasing safety by eliminating cross-plant trips for battery change-outs and the need for frequent handling of heavy batteries; decreasing capital expenditures by creating a 1 to 1 battery to equipment ratio; and decreasing vehicle maintenance costs because the batteries are operated at higher SOC.

Recreational users of high capacity batteries, such as electric golf carts, have had to contend with low rate battery chargers that require a spent cart to remain at the charge station until the next day. With fast charging, the cart could be made usable in less than 1.5 hours. This capability could also reduce the total number of carts needed in the recreational operation and thereby significantly reduce capital expenditures.

Automotive users of high capacity batteries would also benefit from fast charging of batteries by being able to enjoy fast recharge rates to bring their electric automobile batteries back up. A fast charger in the garage would bring back up the family auto after the commute home to allow a drive to the mall or soccer field in the evening, which may otherwise not be possible in the absence of fast charging. Fast chargers in parking areas could also be used to restore automobile batteries to high SOC levels.

Fast charging could change the way we live by turning the battery, in effect, into an electrochemical "gas tank". As fast charge battery technology progresses, and batteries with the ability to accept higher rates of charging become available, higher power fast charging becomes even more desirable. Fast charging has the potential to lower battery recharge times dramatically and become an enabling technology for electric motive power applications.

The majority of currently available high rate chargers fall into two categories—ferro-resonant, and silicon controlled rectifier (SCR) phase control. These chargers contain an input section, power conversion section, and an output section. The input section receives an input three-phase supply voltage and conditions this input for coupling to the power conversion section. The power conversion section converts the coupled input to a desired output voltage. Lastly, the output section couples the voltage from the power conversion section with rectifying diodes and filter if applicable.

FIG. 1 (PRIOR ART) shows a typical three-phase AC input ferro-resonant charger circuit 10 of the prior art. This circuit includes input transformers with one primary and two secondary circuits. One secondary circuit is the RC circuit with resonant winding 1 as shown, and the other secondary circuit includes a winding 2 coupled to the battery via rectifying diodes 3. The transformers are arranged to charge only one battery voltage.

The ferro-resonant style charger described above has a number of inherent deficiencies that limit its practical utility. If a user has more than one battery and they are not the same voltage, two different ferro-resonant chargers will be required. Another inherent problem is the different Ampere-hour ratings of various batteries. A manual change is required to tune the ferro-resonant charger to accommodate the various Ampere-hour ratings, thereby increasing the time and complexity of the charging operation. In addition, the selection range is limited for such modifications to accommodate different Ahr battery ratings. The limited control of output voltage that is characteristic of ferro-resonant chargers also prevents maximum charge rates from being achieved throughout the entire charge cycle. Further, ferro-resonant chargers are unable to take significant corrective action to compensate for supply voltage variations. Because the output of the charger is rectified from the ferro-resonant transformers, a large amount of AC voltage is supplied to the battery. This AC component causes extra heating within the battery and presents a thermal management issue that is of particular concern in the application of ferro-resonant chargers to high rate charging. Self-heating occurs in the transformer primary and secondary as well as the rectifying diodes of the ferro-resonant charger. In the ferro-resonant charger circuitry (see FIG. 1), the resonant secondary winding 1 puts all of the energy in the resistor-capacitor, which makes no contribution to delivery of energy to the battery. These various shortcomings cause the ferro-resonant charger to be inefficient in operation, inflexible in voltage output, and non-optimal in its charging profile.

A second major type of prior art charger is the silicon-controlled rectifier (SCR) phase control charger, for which an electrical schematic diagram is shown in FIG. 2 (PRIOR ART). SCR chargers receive three-phase supply voltage, shown entering the AC input conditioning module 12 in FIG. 2, and couple this input to the power conversion section comprising the SCR switch matrix 20. The SCR switch matrix, coupled to phase controller/driver module 14, converts the input to an output waveform that feeds the output section, which preferably includes a large inductive filter 21. Because the SCR matrix is phase-controlled to obtain the desired output, the output inductor must filter a 360 Hertz distorted AC waveform. This circumstance requires the inductor to be large and expensive. If a smaller, less costly inductor is employed, the additional 360 Hertz AC ripple component superimposed on the DC voltage from the charger will cause heating within the battery load and degrade the power factor of the charger. The AC component effectively serves as an added heat source for the internal resistance of the battery.

SCR chargers are able to accommodate multiple voltage outputs by phase control of the SCR switch matrix. The transformer output voltage is selected to effectively charge the highest voltage battery anticipated. As a result, the power factor of such charger is adversely affected when the charger is used to charge lower voltage batteries. FIG. 2A depicts the SCR switch matrix phase control duty cycle, and shows that for lower voltage batteries, the SCR switch matrix phase control duty cycle must be reduced (see waveform 22) and this reduction in turn greatly degrades power factor. The resultant low power factor results in high currents being drawn from the AC input line in proportion to the true power being delivered to the battery.

Additionally, the SCR switch matrix requires that two SCR switches be on at any given time. SCR-based chargers experience both steady state and switching losses, which degrade their overall efficiency. Furthermore, SCR commutation requirements dictate higher current VA ratings for other circuit components, and SCR recovery times significantly slow down the maximum switching frequencies obtainable. Snubber inductors and RC networks may be needed in order to effect current transfer without occurrence of diode recovery problems in such SCR systems. The drive control circuitry for the SCR switch matrix is complex and expensive because there are multiple SCRs to control (e.g., six in the illustrative system shown in FIG. 2). Finally, the input three-phase AC supply must be connected in the correct sequence in order to prevent phase reversal, since phase reversal would result in an SCR switch matrix error.

Full bridge circuits, if considered for fast charging applications, would appear potentially attractive for fabrication of compact chargers, since a bulky transformer would not be required. However, problems would remain in achieving the power levels necessary for very high capacity batteries (>600 Ahrs capacity) required in many industrial applications. The full bridge circuit employs 4 switches, and, when high voltages are switched, the circuit is susceptible to problems relating to the slower switching speed characteristics of high voltage devices and heat generation. Additionally, transients on the line voltage may destroy the switches, since they are not well isolated.

"Buck" regulator circuits are known in battery chargers for standard rate charging applications. The terms "buck regulator" and "buck converter" are used interchangeably herein. However, design of a buck regulator system for fast charging high capacity batteries has not been achieved and faces a number of technical challenges that have heretofore remained unsolved. Available three-phase electric power would have to be transformed, rectified, switched and filtered in a manner accommodating high rate charging. Relative to switching requirements, switches that switch high currents at high frequencies (e.g., greater than about 5000 Hz) are characteristically associated with unacceptable heat generation, and switches that operate at lower frequencies would require unacceptably large and expensive filters. In addition, the currents required for fast charging of high capacity batteries are very high, e.g., hundreds of Amperes, and thus introduce a myriad of problems relating to the electrolytic capacitors needed for the AC input rectifier circuitry. For high capacity battery charging, these capacitors would have to be so large that their pulse current capability would be very low, e.g., on the order of about 30A each, and they are less effective at high frequencies because they develop higher inductance under such conditions. If such capacitors were of smaller size to provide higher frequency response, they would have even smaller current handling capability, e.g., less than about 5A each—over one hundred such capacitors would be required to satisfy the pulsed current and frequency response requirements for fast charging of high capacity batteries. The resulting bus structure would be so large and inductive as to render the construction impractical. Additionally, the use of such capacitors, whether of large size or of small size, results in a low power factor.

Faced with these problems, the art has been unable to achieve a truly viable fast charging technology.

Accordingly, the art remains in need of an effective and practical fast charger for high capacity batteries.

SUMMARY OF THE INVENTION

The present invention generally relates to a fast charger for high capacity batteries, and to associated methods and features of fast charging systems.

In one aspect, the invention relates to a fast charger for high capacity batteries, comprising:
  an input power conditioner including an AC input rectifier yielding rectified input, and a film capacitor coupled with the AC input rectifier, wherein the film capacitor operates at frequency above about 2 kilohertz;
  a power converter including a buck regulator coupled with the input power conditioner to receive rectified input therefrom, and including switching componentry operating at frequency above about 2 kilohertz, producing a power output; and
  an inductive filter coupled in power output-receiving relationship to said power converter, to produce a filtered fast charging power output.

A further aspect of the invention relates to a battery charger comprising a battery charging power transmission member, and a programmable controller programmably arranged to control time-varying charging at a fixed charging variable condition, wherein said charging variable is selected from the group consisting of charging voltage and charging current, and wherein said programmable controller is programmably arranged to control time-varying charging according to a predetermined charging profile.

Another aspect of the invention relates to a battery charger comprising a battery charging power transmission member, and a programmable controller programmably arranged to control time-varying charging at a fixed charging variable condition, wherein said charging variable is selected from the group consisting of charging voltage and charging current, and wherein said programmable controller is programmably arranged to control time-varying charging according to an IVI charging profile.

A further aspect of the invention relates to a battery charger comprising a battery charging power transmission member, and a housing having disposed therein power management circuitry for producing battery charging power, wherein said battery charging power transmission member comprises a charging cable arranged with a retractor enabling said charging cable to be retracted toward the housing from an extended use position to a retracted non-use position, and to be extensibly drawn away from said housing for battery charging.

In another aspect, the invention relates to a battery charging meter, comprising a selectively illuminatable array of illuminating elements, and circuitry for electrically coupling said array to a battery charger, arranged to actuate a progressively increasing number of said illuminating elements for emission of illumination therefrom in correspondence to a state of charge of a battery when connected to the battery charger and during charging of the battery by the battery charger.

Still another aspect of the invention relates to a battery charger comprising a battery charging power transmission member, and a housing having disposed therein power management circuitry for producing battery charging power, said housing including an openable/closable member for selective access to an interior region of said housing, wherein said openable/closeable member is coupled with a member for producing an open circuit condition in said power management circuitry when said openable/closeable member is opened.

The invention relates in one method aspect to a method of fast charging high capacity batteries, comprising:
  conditioning input power by AC input rectification thereof yielding rectified input, in a circuit including a film capacitor coupled with an AC input rectifier, wherein the film capacitor operates at frequency above about 2 kilohertz;
  converting power from said conditioning step in a circuit including a buck regulator and switching componentry operating at frequency above about 2 kilohertz, to produce a power output; and
  inductively filtering the power output, to produce a filtered fast charging power output.

Another method aspect of the invention relates to a method of charging a battery, comprising transmitting charging energy to said battery according to an IVI charging profile.

In a further aspect, the invention relates to a method of recharging a high capacity battery having a depleted state of charge, comprising:
  charging said battery at a rate of greater than 30 Amperes per 100 Ampere-hours of battery capacity, to bring the state of charge of said battery from 30% to 80% of full charge in less than about 1.5 hours; and
  maintaining temperature of said battery below 125° F. during said charging.

Yet another aspect of the invention relates to a fast charger for high capacity batteries, comprising:
  (a) an AC input;
  (b) means for rectifying AC power from said AC input to produce a rectified output;
  (c) means for converting said rectified output to a converted DC output for charging a high capacity battery, said means comprising high frequency, high ripple current capacitors switched with a power switching circuit in a buck configuration into an inductor/capacitor output filter; and
  (d) cabling for transmission of the rectified output to the high capacity battery.

A further aspect of the invention relates to a method of fast charging a high capacity battery, comprising generating output charging power with rectification and pulse width modulation of an AC input, modulating the output charging power in response to the rectified AC input waveform, and synchronously varying the pulse width modulation duty cycle in proportion and response to the AC ripple voltage of the rectified AC input waveform, to provide a substantially constant DC voltage output charging power.

A still further aspect of the invention relates to a fast charger for a high capacity battery, comprising:
  an input section including a transformer for voltage adjustment of inputted AC voltage and a rectifier for producing a rectified bus voltage;
  a conditioning section arranged to receive the rectified bus voltage, including a first electronic switch, a pulse width modulation circuit driving said first electronic switch, and a second electronic switch providing a current path with the first electronic switch is off in a pulse width modulation cycle of said pulse width modulation circuit, and at least one film capacitor filtering the first electronic switch and output filter circuitry while minimally filtering the bus voltage, said conditioning section producing a conditioned power output; and
  an output filter comprising said output filter circuitry, arranged to receive the conditioned power output and produce a charging power output.

Another method aspect of the invention relates to a method of fast charging of a high capacity battery, comprising:
  rectifying an input AC voltage to produce a rectified bus voltage;
  conditioning the rectified bus voltage, by conditioning circuitry including a first electronic switch, a pulse width modulation circuit driving said first electronic switch, and a second electronic switch providing a current path with the first electronic switch is off in a pulse width modulation cycle of said pulse width modulation circuit, and at least one film capacitor filtering the first electronic switch and output filter circuitry while minimally filtering the bus voltage, to produce a conditioned power output; and
  filtering said conditioned power output to produce a charging power output.

Other aspects, features and embodiments of the invention will be more fully apparent from the ensuing disclosure and appended claims.

BRIEF DESCRIPTION OF DRAWINGS

FIG. 2 (PRIOR ART) is an electrical schematic diagram of a prior art SCR battery charger; inset FIG. 2A shows the SCR switch matrix phase control duty cycle.

FIG. 13 (A–D) is a software listing for the second control technique shown in FIG. 12.

FIG. 15 (A–D) is a software listing for the third control technique shown in FIG. 14.

DETAILED DESCRIPTION OF THE INVENTION AND PREFERED EMBODIMENTS

Overview

Figure 1:
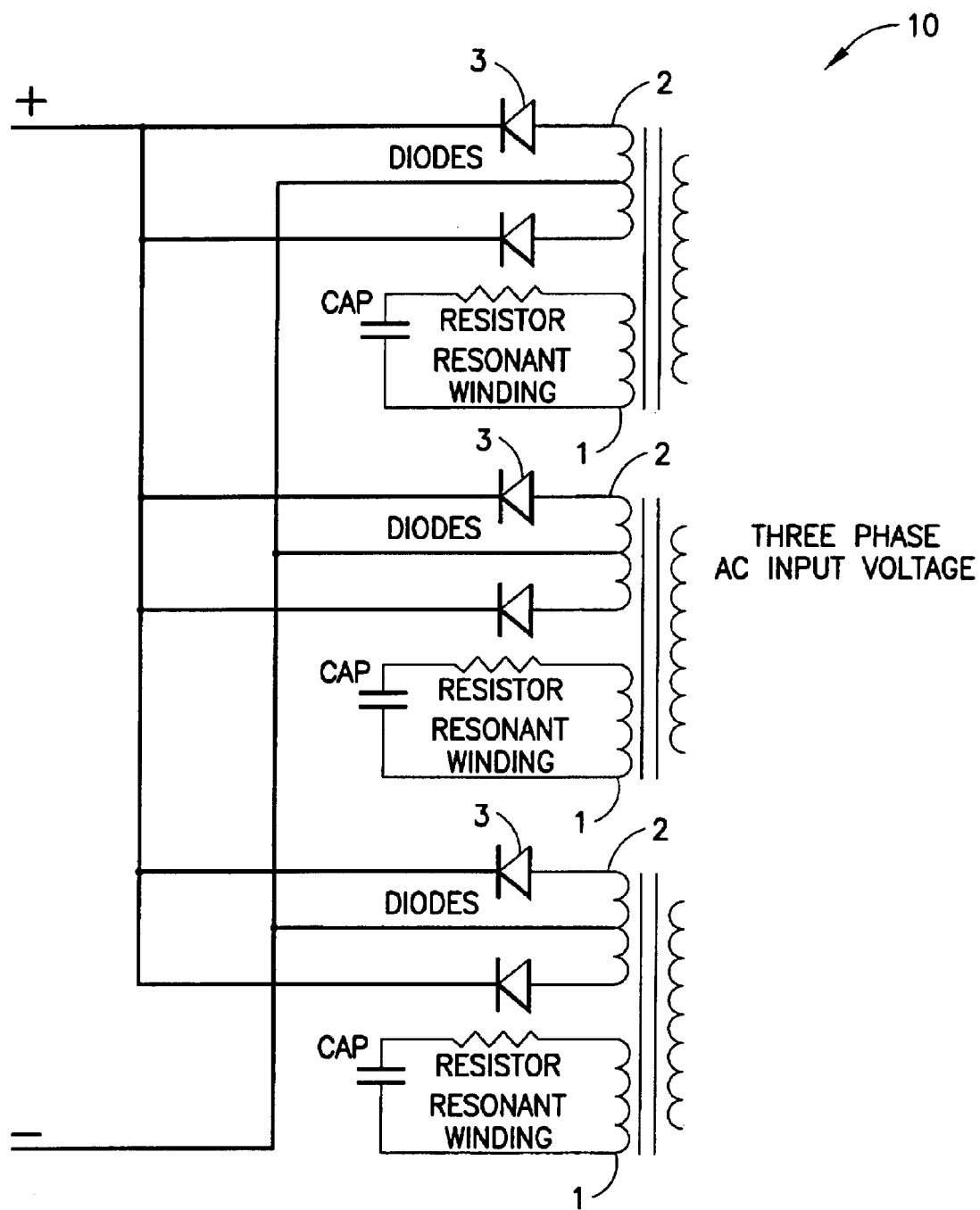
FIG. 1 (PRIOR ART) is an electrical schematic diagram of a prior art ferro-resonant battery charger.

The fast charger of the present invention provides an effective and practical fast charger for high capacity batteries.

By way of appreciation of the various aspects and features of the present invention, it is instructive to consider the attributes of an ideal fast charger system, as characteristic of the present invention.

Such fast charger is capable of charging batteries of different Ampere-hour ratings without equipment modification, allowing one charger to be used for any of the various types of high capacity batteries that may be present in a given setting. The ideal fast charger is not significantly affected by supply voltage variations, which are quite common in an industrial environment. Such a charger has the ability to charge various different battery voltages without sacrificing power factor or efficiency. The ideal fast charger for high capacity batteries avoids the phase reversal problem of conventional SCR chargers. Such charger therefore is capable of high switching frequencies, in the range of thousands of hertz, thus employing a relatively small and low-cost output low-pass filter, while providing a "clean" (low AC content) DC current output to minimize battery heating.

Power factor, the ratio of real power to apparent power, may be calculated as $\text{kilowatts}_{in}/\text{volt-amperes}_{in}$, and is a basic factor in determining power efficiency of a battery charger. Power factor therefore becomes a very important issue for charging high capacity batteries. Attaining a desirably high power factor is a particularly challenging problem for fast charging of high capacity batteries, since fewer components are available that can handle the high currents and frequencies required in such fast charging regime, where transients and switching losses become more significant. The ideal fast charger for high capacity batteries has a high power factor regardless of the battery voltage being charged. Further, the charger is capable of sustaining a maximum charging rate over the entire charge cycle, with minimal use of snubber circuits due to their added cost and the power wastage they entail.

In the normal environments in which high capacity batteries are useful, e.g., industrial, recreational and home environments, simple operation and maintenance of a fast charger are desirable. An ideal fast charger will in all cases be capable of rapid, even "one-step," maintenance, so that repair does not require extended down-time or sophisticated diagnostics.

The control methods for an ideal fast charger for high capacity batteries will enable the charger to be used flexibly, e.g., with batteries of different Ampere-hour ratings and different voltages, and will maintain an optimal charging profile throughout the charging cycle.

The present invention satisfies such criteria, and provides a highly efficient fast charger for high capacity batteries and methods for fast charging high capacity batteries.

The fast charger of the invention can be usefully employed for fast charging of high capacity batteries such as industrial lead-acid batteries, delivering energy at a voltage in a range of from about 12 to about 300 volts. The fast charger preferably comprises a rectified AC input of single or preferably three phases, with an optional power factor corrected input, minimally filtered with high frequency, high ripple current capacitors, which is switched with a power switching circuit in the "buck" configuration into an inductor/capacitor output filter.

In the "buck" regulator configuration, the AC voltage is converted through a transformer to an appropriate voltage level, which is then rectified. This rectified "bus" voltage is then minimally filtered and switched by a first electronic switch driven by a pulse-width modulation circuit into the LC output filter, with a second electronic switch, for example, a flywheel diode, providing a current path when the first switch is OFF in the PWM cycle. The capacitors employed in the rectifier that minimally filter the bus voltage while adequately filtering the high frequency switch and output filter circuits are of a type capable of handling high currents with low capacitance. Ripple current represents the AC signal element in a voltage with a DC offset. As used herein, "high ripple current capacitors" refers to capacitors that can handle high currents and whose effective series resistance (ESR) is so low that little heat is generated even when the capacitor sees substantial ripple current. Traditional electrolytic capacitors have moderate current capacity (e.g., a 15,000 $\mu$F capacitor of such type may have about 35 amps of ripple capability at 120 Hertz, or ~2.3 mA/$\mu$F), but ESR is usually sufficiently high to generate heat if substantial AC/ripple current is allowed to pass—resulting, ultimately, in failure of the component.

Previous battery chargers have historically had a high AC ripple current delivered to the battery. The present invention provides a minimally filtered AC input rectifier section that enables an improved power factor. The high ripple current capacitors provide the switch transient protection while leaving the rectified AC input frequency largely unaffected, as described more fully hereinafter. In the practice of the present invention, the input AC bus is lightly filtered. Instead, output AC is filtered and AC ripple is limited by filtering out higher frequency and much of the lower frequency AC ripple components, to less than 2.5% of the maximum output, as hereinafter described.

In one aspect of the invention, a fast charger for high capacity batteries having high current output is provided. The charger comprises an input conditioning circuit including a rectifier, high-current-handling, high ripple current capacitors, a buck regulator including first and second electronic switches with a PWM control circuit, and a properly sized inductor-capacitor (LC) output filter; the output capacitor is a high current capacitor. The input conditioning circuit can include a transformer for providing a suitable input AC voltage to the rectifier. This input AC voltage is rectified, and minimally filtered. High ripple current capacitors capable of operation at high frequency, for example 2 to 50 kilohertz, filter the switch. The high ripple current capacitors are sized to only minimally filter the rectified 360 Hertz AC component while providing transient switch protection and ripple current requirements for the buck regulator, thereby enabling a substantially improved power factor to be achieved.

The buck regulator's electronic switches preferably comprise a first switch selected from power transistors and a second switch selected from free-wheeling diodes. The first switch is preferably selected from high power transistors, e.g., MOSFETs and bipolar transistors having high power capability. Insulated Gate Bipolar Transistors (IGBTs) are a suitable high power switch that is available in the sizes and switching frequencies required, e.g., switching about 100V to 1400V, preferably about 300V to about 1200V, at frequencies ranging from about 2 kilohertz to about 50 kilohertz and above. Though frequency and voltage considerations favor the use of bipolar transistors, MOSFETs may be used for embodiments that use bus voltages of about 100V and lower. The first switch is more preferably a trench-gate IGBT and the second switch is more preferably a fast soft recovery flywheel diode. Trench-gate IGBTs are efficient and allow higher frequency switching at the higher power outputs that are required for fast charging. Higher frequency operation minimizes the required output filter size. The output filter consists of an inductor and a high frequency, high ripple current capacitor. By selecting a suitable capacitor and sizing the inductor appropriately, a highly filtered direct current (DC) output can be realized. The pulse-width modulating (PWM) circuit combines transducers measuring the output, a controller circuit reading the transducers, and a controller regulating the PWM signal to the IGBT buck regulator.

It will be recognized that solid state switches may be employed in the practice of the invention without limitation on switching rate. At higher switching rates, input and output filters can be smaller. Other types of flywheel diodes can be employed, such as silicon carbide (SiC) Schottky diodes capable of operating at high temperature, e.g., temperatures on the order of 300° C., at frequencies of 10 to 50 kilohertz, thereby permitting a smaller output inductor to be employed and capacitance on the input to be reduced, and enabling the digital signal processing logic componentry to operate at high (e.g., megahertz) speeds, consistent with high switching speeds, as for example on the order of 250 kilohertz and higher.

Because the transformer provides good isolation, the fast charger is less affected by any supply transient voltage variations than full-bridge based chargers. Additionally, by virtue of its active switching components, the fast charger of the present invention is markedly superior in performance to ferro-resonant chargers, against supply voltage variations.

In one aspect, an AC to DC battery charger with a high current output is provided having an input conditioning circuit comprising high frequency, high ripple current metallized polypropylene film capacitors, a buck regulator comprising an IGBT, preferably a trench gate IGBT, and a flywheel diode, preferably a fast soft recovery flywheel diode, a PWM control circuit such as are known in the art, and a properly sized inductor-capacitor (LC) output filter. The input conditioning circuit can include a transformer for obtaining the proper AC voltage level to the buck regulator. This AC voltage is then rectified and filtered with the high frequency, high ripple current film capacitors. The film capacitors are sized to minimize the rectified 360 Hertz AC component filtering while providing transient switch protection and ripple current requirements for the buck regulator. In this manner, the charger will have a substantially better power factor. The preferred IGBT is a device with a trench gate design. This efficient device allows for higher frequency switching at the higher power outputs that are required for fast charging. The higher frequency of operation minimizes the input and output filter size. The output filter consists of an inductor and a high frequency high ripple current film capacitor. With the use of the film capacitor and inductor sizing, a substantially pure direct current (DC) output can be realized. The pulse-width modulating (PWM) circuit combines transducers measuring the output, a controller circuit reading the transducers, and then the controller regulating the PWM signal to the IGBT buck regulator.

While the invention is hereafter described in reference to the use of IGBT (Insulated gate bipolar transistor) as a preferred switch for the buck regulator, it will be recognized that the invention is not thus limited, and that other switches and switch componentry may be employed that are adapted for operation at the high power/high switching frequency conditions required for the buck regulator switch. Examples of alternative switches include MOSFETs (Metal Oxide Semiconductor Field Effect Transistors) and other suitable transistors.

The metallized film capacitors useful in the practice of the invention may be of any suitable type, including film materials such as polypropylene, or other polymeric materials (e.g., polyethylene, polybutylene, polytetrafluoroethylene, polyvinylidene chloride, polystyrene, polyvinybutryal, polysulfone, etc.), with polypropylene film capacitors being presently preferred. A particularly preferred metallized film capacitor is a GMKP-600-600-IBRX film capacitor, commercially available from Vishay Americas, Inc. (One Greenwich Place, Shelton, Conn., 06484 USA, E-mail address www.vishay.com).

A wide variety of film capacitors suitable for use in fast chargers of the invention are commercially available, including, for example, film capacitors commercially available from: Electronic Concepts (Eatontown, N.J., USA, E-mail address www.eci-capacitors.com); AVX Corporation (801 17th Ave. South, Myrtle Beach, S.C. 29578–0867 USA, E-mail address www.avxcorp.com); ICAR spa (Via Isonzo 10, 20052 MONZA (Milano), ITALY); and Vishay Americas, Inc. (One Greenwich Place, Shelton, Conn. 06484 USA, E-mail address www.vishay.com).

Metallized film capacitors have very high current handling capability per microfarad, e.g. tenths of Amperes per microfarad, and consequently have an excellent high frequency response. Such capacitors permit the construction of a low inductance, compact bus structure for integrating the capacitors with the power electronic switching devices. Surprisingly, a bus designed to handle the pulsed current provided a further benefit: a higher power factor was achieved because of the low capacitance present on the rectified bus. Power factor calculations can be made using techniques known in the art.

Integrating the high pulse current metallized film capacitors into buck-converter based fast charging circuits allows the fast charger to operate at high frequency with minimal input capacitance. High frequency operation allows smaller output filters and minimizes the output ripple voltage and current. The low bus capacitance/AC modulated technology provides the high current fast charger with a higher power factor than does a fully filtered DC bus, which is the standard practice, but more importantly it allows the required capacitance to be reduced by about 60 to 1. In practical terms, a compact floor unit is enabled.

Circuit and Component Considerations

"Buck regulator" refers to an electrical circuit for converting a higher DC voltage to a lower DC voltage by switching the higher voltage at a selected frequency and pulse-width into a low-pass filter, to provide a low-pass filter output signal of lower DC voltage. For the fast charger of the invention, the switch is selected to be capable of handling high power, e.g., pulsed currents in the range of hundreds of amperes to a few thousand amperes, preferably greater than about 100 amperes to about 2000 amperes. The switch must be capable of switching rectified voltages ranging from about 1.25 to about 5 times the voltage of the battery being charged. The low-pass filter is selected to filter the switch output to reduce ripple voltage in order to minimize heating of the battery being charged.

Figure 3:
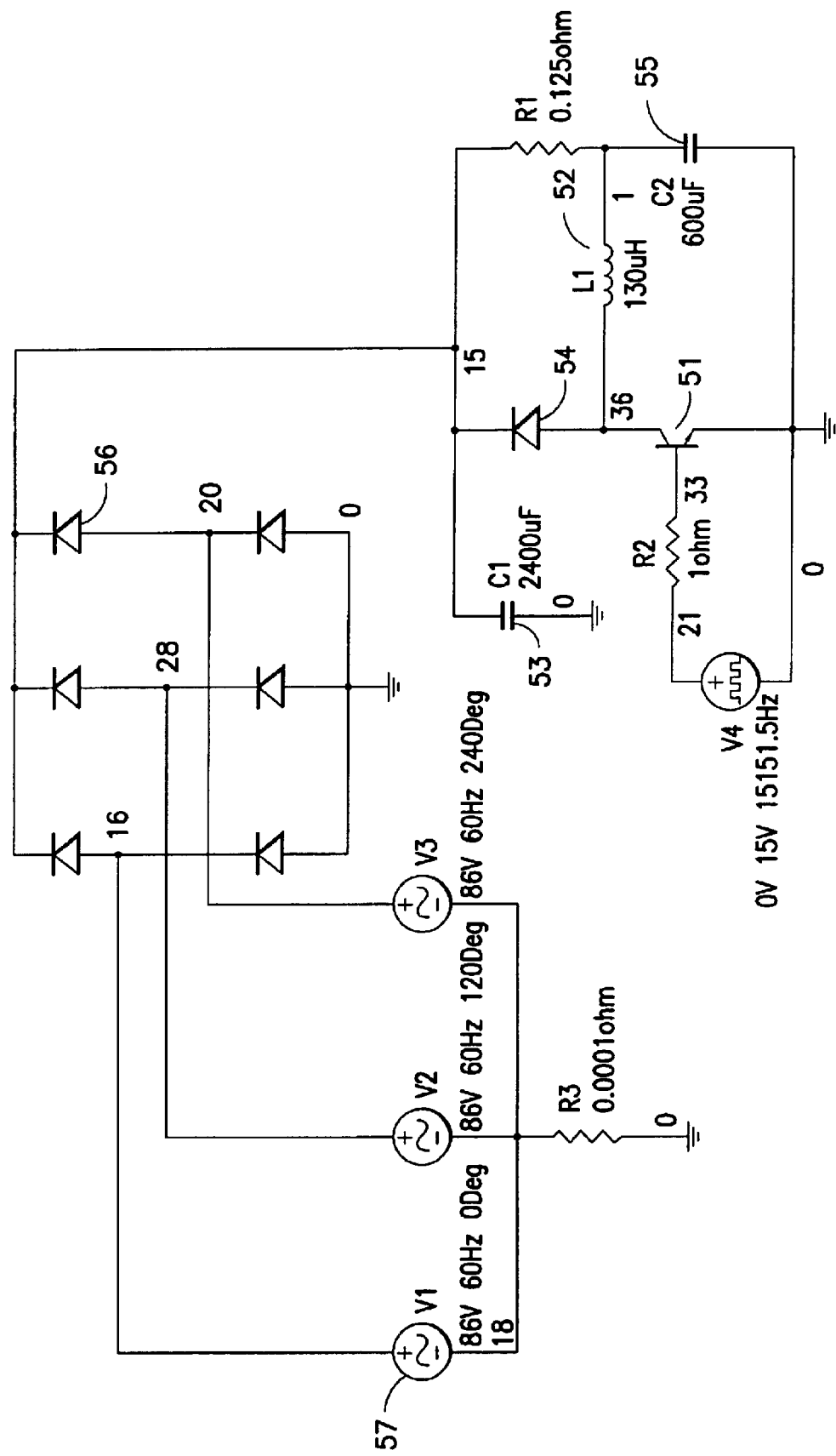
FIG. 3 is an electrical circuit diagram of an exemplary buck regulator useful in battery chargers of the present invention.
Figure 4:
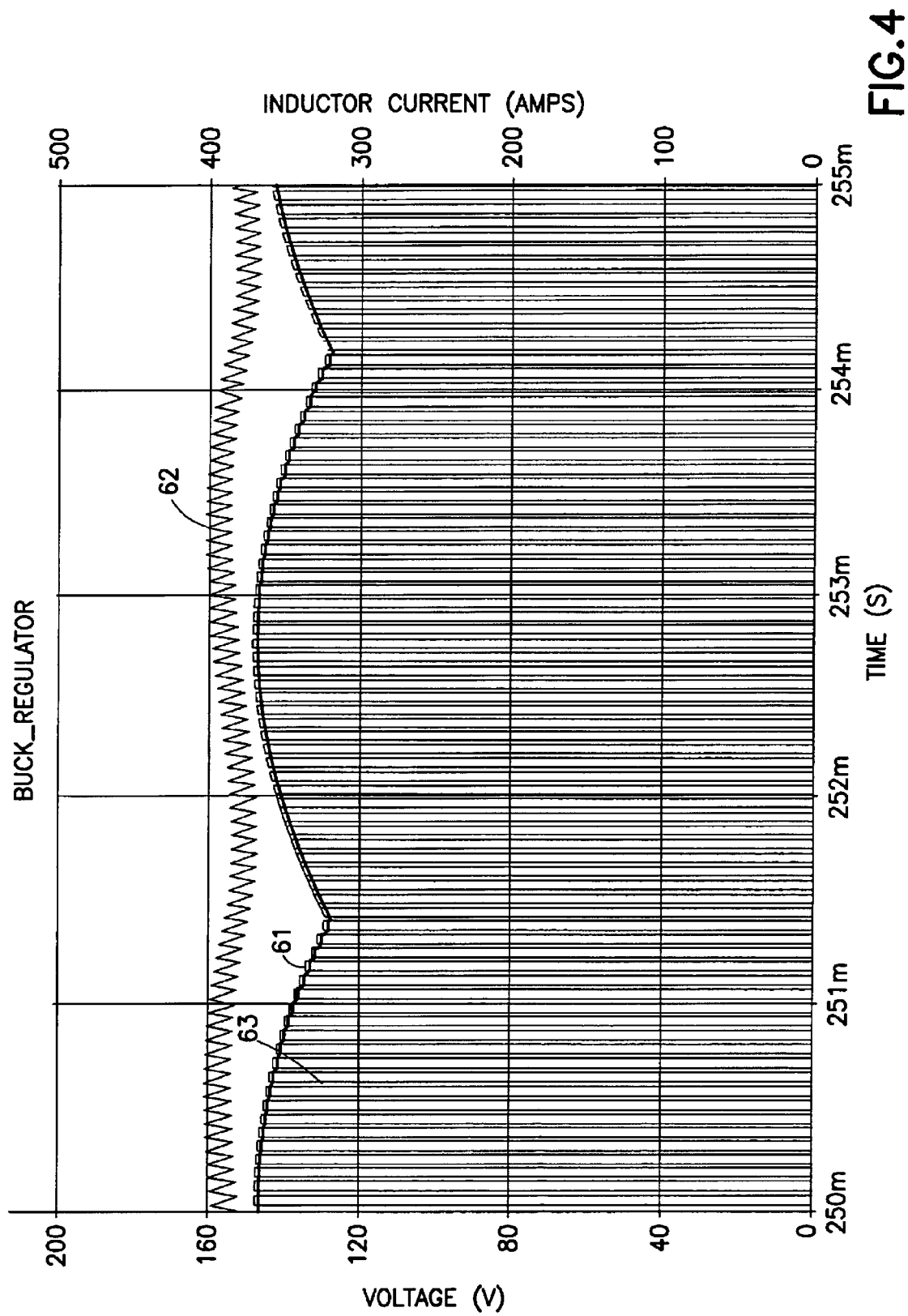
FIG. 4 shows plots of voltage vs. time for the output of the switch of FIG. 3; voltage vs. time for the filtered output of the switch of FIG. 3; and current vs. time for the current through the inductor of FIG. 3.

FIG. 3 shows an illustrative buck converter circuit used to simulate and generate the plots of current and voltage vs. time shown in FIG. 4. The buck converter comprises first electronic switch 51, inductor 52, and second electronic switch 54. The bus capacitor 53 is sized for minimal capacitance.

Figure 5:
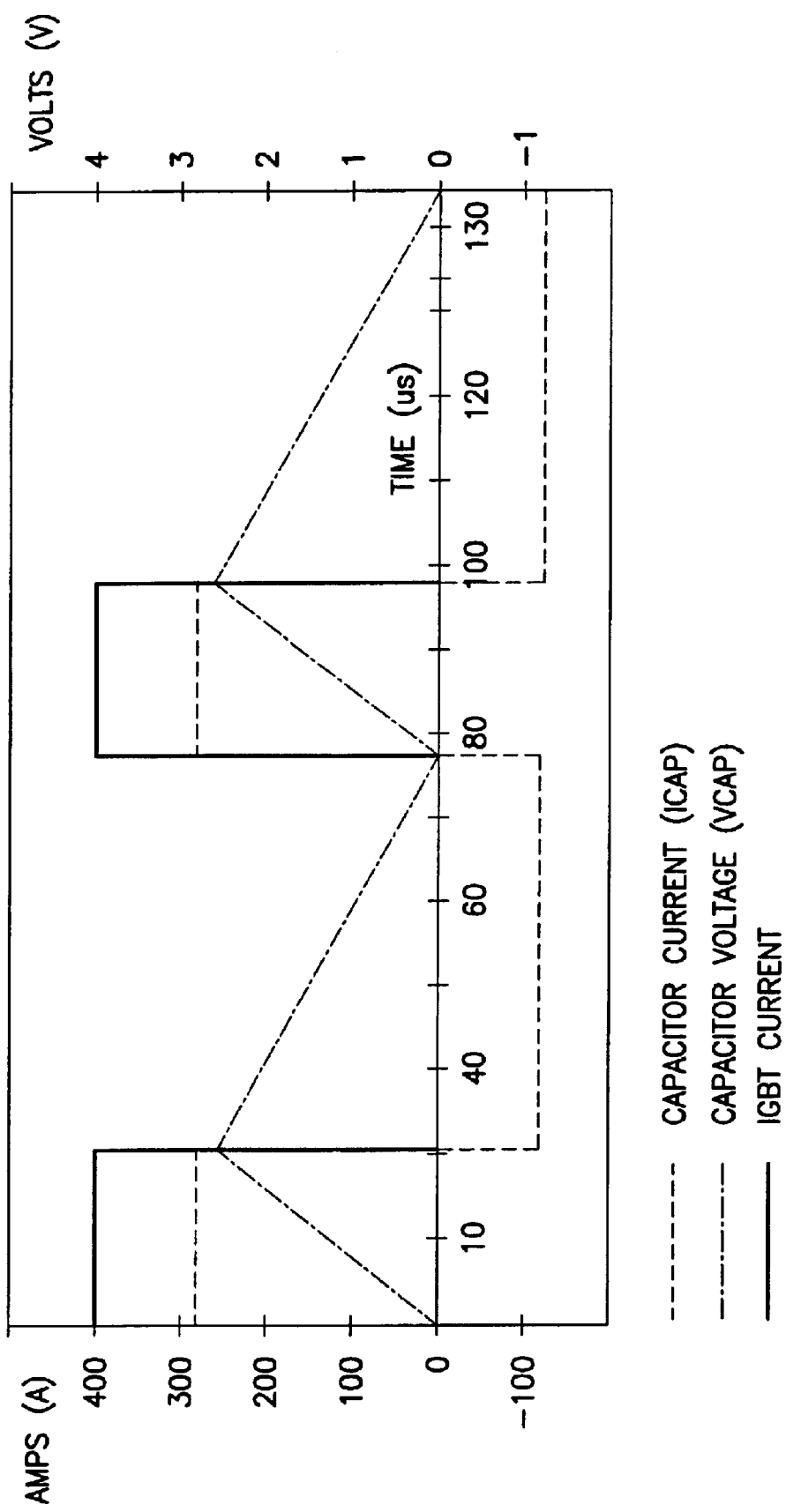
FIG. 5 is a plot of current and voltage vs. time for a bus capacitor and current vs. time for an IGBT electronic switch.

FIG. 5 is a plot of current and voltage vs. time for a bus capacitor and current vs. time for an IGBT electronic switch, showing the time-varying electrical response of such components.

Some examples of other AC to DC conversion systems with current spreading circuits, and other circuits and apparatus that may possibly be utilized or adapted for use in at least one possible embodiment of the present invention may be found in the following U.S. Pat. No. 4,523,266, issued to Nelson, et al. on Jun. 11, 1985; No. 4,090,578, issued to Shinoda et al. on May 23, 1978; No. 5,277,268, issued to Kuwayama et al. on Jan. 11, 1994; No. 4,671,954, issued to Rosman on Aug. 9, 1988; No. 6,111,743, issued to Lavene on Aug. 29, 2000; No. 5,731,948, issued to Yializis et al. on Mar. 24, 1998; and No. 5,450,307, issued to Yasumura on Sep. 12, 1995.

Capacitor Selection

In actual capacitors, the wires and plates have resistance and inductance. The insulator is not perfect and will have leakage resistance. These properties are inherent and can be minimized but not altogether avoided. The equivalent capacitor circuit has a number of crucial properties.

Current is inconsistent with I=C dv/dt.

Current flows even when a DC voltage applied.

Combination of L and C creates resonance, and above the resonant frequency; the device behaves as an inductor.

There is a nonzero power loss.

Based on the resonant frequency Rw, the capacitor's equivalent series resistance ESR has the value:

$$ESR=Rw+1/((\omega 2 RleakC2)).$$

This leads to the industry standard model used by manufacturers, an equivalent series resistance (ESR), an equivalent series inductance (ESL), and a series capacitance (C). ESR is a nonlinear, frequency-dependent impedance (usually specified at 120 Hz).

Dissipation factor (df) is a measure of the quality of the capacitor; it represents the ratio of resistance to reactance.

$$df=R/X=(ESR)*\omega *C$$

This ratio is also called the loss tangent (Tan δ) and therefore is represented as:

$$\text{Tan } \delta =\omega *ESR*C$$

Tan δ is roughly consistent over a substantial frequency range. If given the loss tangent of a particular material, the ESR value can be determined.

$$ESR \approx \tan \delta /\omega C$$

An important parameter for capacitor bank assemblies is the capacitor resonant frequency in comparison with the system switch frequency.

$$Fres=1/(2\pi (ESL*C)^{1/2})$$

Two important values when specifying capacitors are the equivalent series inductances (ESL) and the capacitance (C). From the above discussion, it will be appreciated that the resonant frequency of the capacitor is important. If the switch frequency or harmonics reach resonant frequency, the capacitor bank will look like an inductor and transient voltage spikes will appear. Therefore, capacitors with an ESL specification as low as possible are preferred. A capacitance that provides the maximum voltage change (ΔV) derived from the high frequency switch and current draw is preferred. An example calculation for minimal capacitance is provided below and details the formulas used to select the preferred capacitors. By specifying minimal capacitance, the C value will be lower resulting in an obtainable resonant frequency for the design.

The next factor to consider is the AC ripple current magnitude. Capacitors have only recently been developed that allow extremely high current densities with a comparatively low capacitance value vs. standard electrolytic capacitors. Examples of such capacitors include film capacitors, with which rated ripple currents of 400A can be realized with just 2400 μF capacitance without affecting the AC ripple voltage. Two important capacitor specifications are AC ripple current (Arms) and equivalent series resistance (ESR). These two specifications are related in that a low ESR will enable a capacitor to sustain a higher Arms value. In the later example calculation, the Arms are calculated so the designer may properly specify the capacitor.

In addition to the internal ESR and ESL, the bus structure also is additive to these undesirable components, as discussed previously.

Impedance behavior of the capacitor is an important consideration. When capacitors are used as source interfaces, impedance falls with frequency (1/ωc). With real capacitors, however, impedance falls until resonant frequency is reached. Impedance then rises as ESL begins to dominate. In simple terms, the capacitor becomes an inductor.

With both higher C and higher ESL values, large electrolytic capacitors as have been standard in the art have limited resonant frequencies.

$$F_{res} = 1/(2\pi(ESL*C)^{1/2})$$

In conclusion, by using capacitors with low ESL and ESR, such as metallized film capacitors, resonance is not a problem, and by limiting the amount of capacitance to the minimum capacitance necessary to achieve maximum allowable ripple at full power, the power factor of the fast charger can be enhanced. By selecting such capacitors, switching devices can be protected from voltage transients and a high power factor can be achieved.

An example of a minimal capacitor selection is presented below, for the following design parameters:

The input step-down transformer secondary looks like large inductor to chopper.

36V (18 cell) battery of 935 Ampere-hours rated capacity
2.42V/Cell therefore Vout=43.56V max @400A
106Vrms 3-phase rectified input
Vavg=3VP/3.14=143.2V
Duty Cycle=43.56V/143.2V*100=30.4%
Switch frequency of 15 kHz or a period of 67 μs
Minimum loading 43.56V @30A out Calculations:
The IGBT current is 400A when on and 0A when off.

$$DC := 0.304$$

{Duty cycle factor from specs}

$$Ipk := 400$$

{Load current or peak IGBT current}

$$Iavg := DC \cdot Ipk \text{ float}, 2 \to 1.2 \cdot 10^2$$

{Average supply current from 3 phase transformer}

$$Icap := 400 - Iavg \to 280.$$

{This is the capacitor current during IGBT on time.}

$$dv := 5$$

{Design target for allowed switch voltage ripple}

$$dt := (0.30467 \cdot 10^{-6}) \text{ float}, 2 \to 2.0 \cdot 10^{-5}$$

{The on time of the IGBT for stated application}

$$Ccalc := Icap \cdot \frac{dt}{dv} \text{float}, 2 \to 1.1 \cdot 10^{-3}$$

{Calculated value of capacitance needed}

This is the value needed for C to obtain only a 5V differential on the film capacitors from the high frequency IGBT switch current. This value can be doubled to ensure sufficient capacitance, giving 2200 μF. However, the capacitor should not significantly filter the AC voltage, for power factor considerations. The following calculation shows the effect on the 360 Hz AC voltage:

Where:

$$Iout := 120$$

$$f := 360$$

$$\Delta Vout := \frac{Iout}{(f \cdot Ccalc)} \text{float}, 2 \to 3.0 \cdot 10^2$$

This is much greater than the AC supply ripple voltage and, therefore the capacitor essentially is not affecting the AC 360 Hz ripple voltage. The capacitance needed to affect the AC is an order of magnitude greater. FIG. 4 shows a graph of capacitor voltage, capacitor current, and IGBT current for this design.

Next, calculate the RMS current of the capacitor to ensure enough ripple current capability.

$$Irms := \sqrt{\left[\frac{1}{67 \cdot 10^{-6}} \cdot \left[\int_0^{20 \cdot 10^{-6}} 280^2 dt + \int_{20 \cdot 10^{-6}}^{67 \cdot 10^{-6}} (-120)^2 dt\right]\right]} \to$$

$$\frac{40}{67} \cdot \sqrt{94001} \text{ float}, 4 \to 183.0$$

Because AC voltage is intact, additional RMS current must be calculated.

VAC=19.11 volts
19.11/XC=95.1A
as the total on that current.

Aside from capacitance value, the capacitors must be able to provide this RMS current of 278 amps. If a variety of different voltage batteries are to be charged, the worst case scenario should be used to calculate capacitance parameters.

A last consideration is the internal and stray inductance of the capacitor and bus structure.

$$F_{res} := 30 \cdot 10^3$$

{this is the design target of 2 times the operating frequency}

$$L := \frac{\left[\frac{1}{2 \cdot \pi \cdot F_{res}}\right]^2}{Ccalc} \text{float}, 4 \to 2.558 \cdot 10^{-8}$$

This means that the chosen capacitor and bus structure should have inductance of less than 26 nH, or the capacitor will actually look somewhat inductive to the switch. The lower the inductance value the better, as switching harmonics will also be present. Discrete small snubber circuits with lower inductance will attenuate these components.

In a rectifier scheme employed by various prior art battery chargers, the output of a three-phase rectifier is filtered with large electrolytic capacitors to minimize the ripple voltage resulting from the rectification. This filtering technique itself results in a decreased power factor and higher VA ratings of input supply and other system components.

Figure 6:
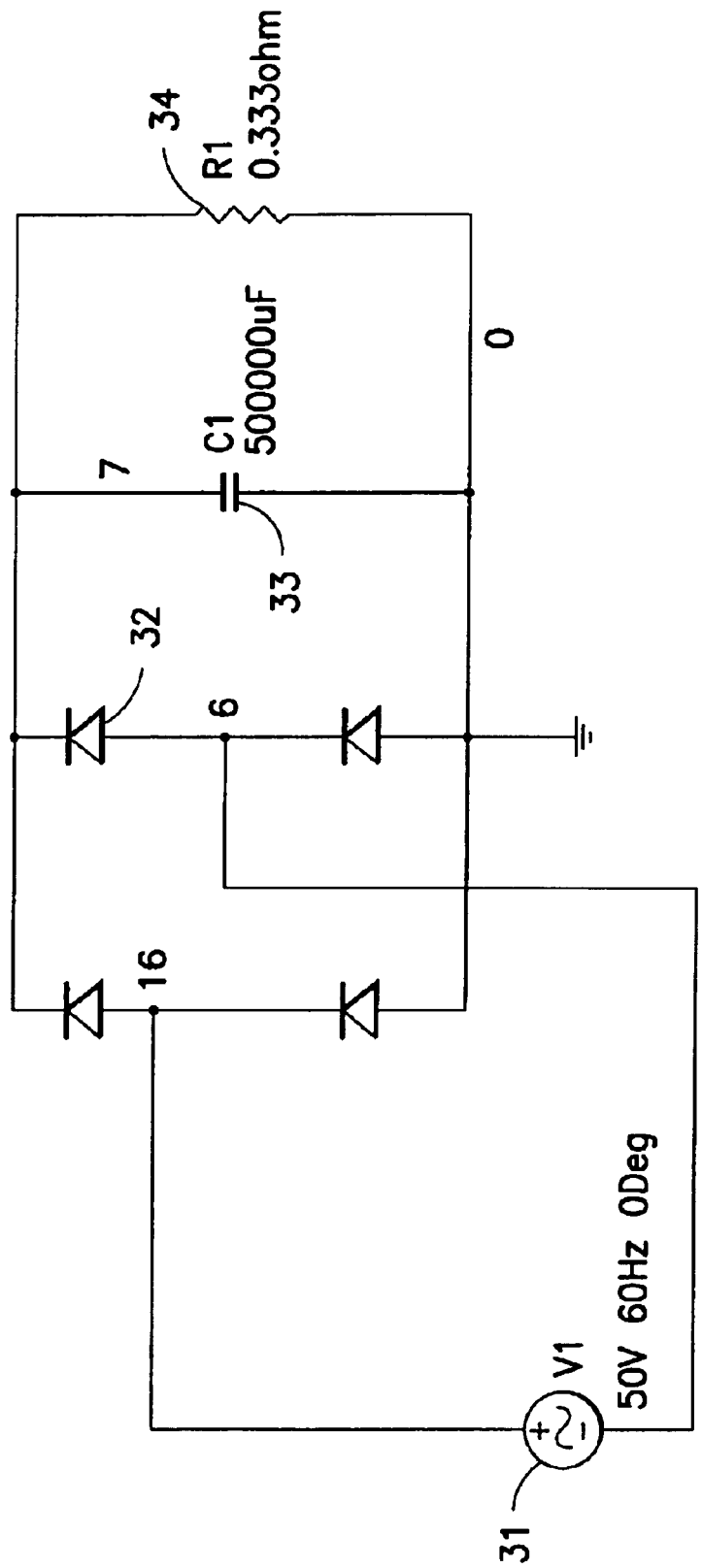
FIG. 6 (PRIOR ART) is an electrical circuit diagram of a prior art rectifier capacitor filter for AC to DC voltage conversion for battery charging.

FIG. 6 (PRIOR ART) shows a simple single-phase application for such rectifier scheme. The circuit consists of an input AC supply 31, a rectifying circuit 32, a capacitor bank 33, and a load resistor 34. This circuit was designed to convert the AC input voltage to a 50V DC voltage with a 5% AC ripple voltage and output current of 150 amps. From this information, the following calculations were made to calculate the amount of capacitance needed in microfarads:

C=Iout/(2f ΔVout); where f=input frequency, Iout=output current, ΔVout=output voltage change. Substituting in the design specs yields:

$$C=150/(2*60*2.5)=500,000 \ \mu F$$

Figure 7:
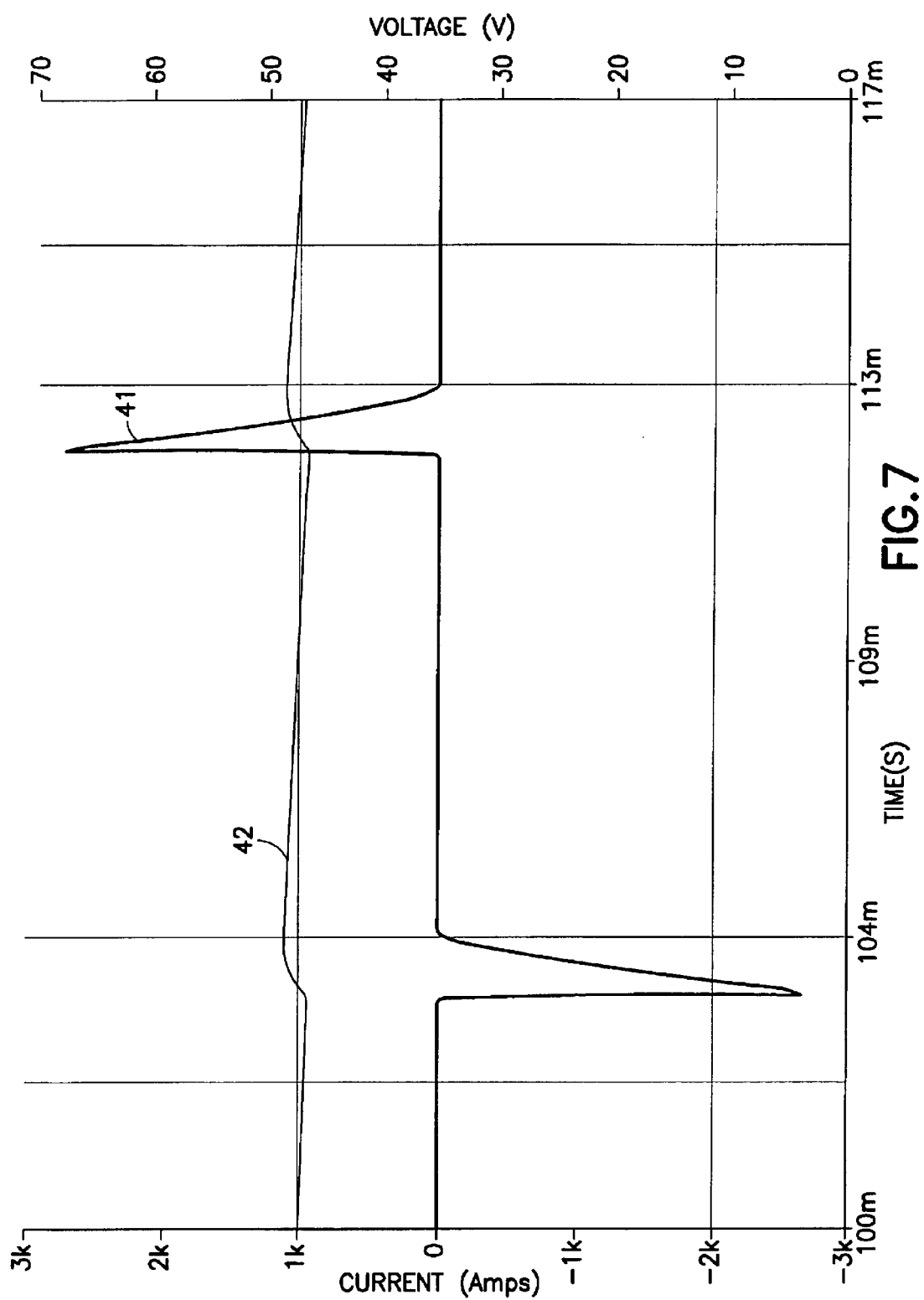
FIG. 7 shows plots of current vs. time for the capacitor supply input current and the resistor load current of the circuit shown in FIG. 6.

FIG. 7 shows a simulation of the circuit in FIG. 6. Note the large surge supply currents 41 drawn near the peak of the input AC waveform. Also note the rectified output voltage 42 with an AC ripple of approximately 2.5V. This design requires a large and bulky bank of capacitors that will preclude a compact, lightweight design. Also note the peak value of over 2500 amps for an output current of 150 amps. This peak current further requires the other components in the circuit and input supply to have higher Volt-Ampere (VA) ratings to handle this surge current. The surge current is a result of a violation of Kirchhoff's Voltage Law (KVL), which states, "The sum of the voltages around a loop must equal zero". With this very high value of capacitance, resonant frequency and bus structure stray inductances impose a limiting frequency for converter operation. Despite the aforementioned violation of KVL and the associated adverse affects, this circuit is widely used in lower frequency converter applications.

FIG. 3 shows an illustrative buck converter circuit useful in the fast chargers of the invention. The FIG. 3 circuit was used to simulate and generate the plots of current and voltage vs. time shown in FIG. 4. The buck converter comprises first electronic switch 51, inductor 52, and second electronic switch 54. The bus capacitor 53 is sized for minimal capacitance. With reference to FIG. 3, FIG. 4 shows plots of voltage vs. time for the PWM switch point output 63 of the switch 51; voltage vs. time for the filtered output bus voltage 61 of the switch 51; and current vs. time for the current 62 through the inductor 52. The PWM is at a 15 kHz rate while the AC ripple voltage is at a 360 Hz rate. Unlike the classic rectifier circuit, the AC ripple voltage is still intact. This minimal filtering allows the full range of the input AC supply to be utilized, thus improving power factor.

Electrolytic capacitors have a typical ripple current handling capability of approximately one ampere per 750 microfarad of capacitance. Film capacitors, for example, can have a typical ripple current handling capability of approximately one ampere per 6.5 microfarad of capacitance. If electrolytic capacitors were used, the amount of capacitance on the bus would be much greater than if film capacitors were used.

Consider, for example, the design of a bus that requires 400 amperes of ripple current capacity. With film technology, four 600 microfarad, 100 ampere capacitors can be designed into the bus, and mounted into a compact bus structure with their relative positions extremely close to the switching elements of the converter. This minimizes the inductance path to the switch and the consequential voltage transients generated by the switching elements. Also, the total capacitance of only 2400 microfarad allows the 360 cycle rectified AC bus voltage to remain largely unfiltered, which in turn enables a high power factor to be achieved.

In contrast, a bus designed with electrolytic capacitors requires approximately 300,000 microfarads of capacitance in order to handle the ripple current requirements. This results in approximately 10–12 large electrolytic capacitors. The bus structure and path inductance between the capacitors and switching elements is much larger. This creates higher voltage transients during switching. Also, the high capacitance (300,000 microfarads) effectively filters the 360 cycle rectified AC bus voltage. This greatly lowers the power factor and create current spikes at the peaks of the input AC voltages (FIG. 7).

The capacitance is advantageously calculated to handle the high frequency switch transient current requirements while minimizing filtering of the low frequency 360 cycle rectified three phase AC line in order to maximize power factor. The calculation can be simplified to the following:

$$I=C \ dv/dt, \text{ therefore}$$

$$C=(\text{duty cycle}*I)/(dv/dt)$$

For example, if the decision is to limit the voltage ripple to 5 Vpp at 10 KHz switching frequency, with a 50% duty cycle and 600A output current, the capacitance calculation is:

$$C=0.5*600/(5V/0.0001)=600 \ uF \text{ total capacitance}$$

This application requires six 1000-microfarad capacitors to reduce voltage ripple to 5 Vpp.

A desirable range of capacitance for various capability requirements is in the 100–5000 microfarad range.

The resonant frequency of the capacitor is an important characteristic for switch operation at or above three kilohertz. A desirable resonant frequency range is 5 KHz–100 Khz.

$$F=1/(2*\text{pie}*\text{sqr}(ESL*C))$$

where $$ESR=DF*Xc=(D*F)/(2*\text{pie}*f*C)$$

In the present invention, the capacitance value is minimized by the use of high current capacitors, e.g., film capacitors, which have a much greater ripple current density than conventional electrolytic capacitors. The capacitance is selected to provide a minimum ripple voltage at the higher IGBT switching frequency and to minimize its effect at the lower 360 Hz AC ripple voltage.

The current handling capability should be such that a minimum number of capacitors are needed to handle the calculated ripple current needed to generate the maximum charge current output of the machine. A desirable range per capacitor is 50–300A in capability. Even 50A is out of the range of most if not all but the very largest electrolytic capacitors.

Metallized film capacitors are commercially available from a wide variety of sources, including, for example, Electronic Concepts (Eatontown, N.J. USA), AVX Corporation (Myrtle Beach, S.C. USA); and ICAR (Milan, Italy).

The number of capacitors should be minimized for reasons of size, cost, and bus inductance that results from a distributed physical location. Therefore a reasonable size for a cylindrical capacitor is 1 to 10 inches long, and 1 to 6 inches in diameter.

High Frequency IGBT Considerations and Bus Structure

Because IGBTs switch with a high change of current with respect to time (di/dt), resonant frequency of capacitors is vitally important (see preceding discussion). The fast switching speeds translate into higher switching frequencies, which translate into smaller components. However, this fast switching speed does require attention to the mechanical structure of conduction paths. Change in currents can be 600 Amps or higher within a few hundred nanoseconds and this creates a very large di/dt. The following formula shows the voltage (VL) across the inductance (L) with respect to this di/dt.

$$VL = L\ di/dt$$

Therefore the design of the conduction paths (referred to as the bus structure), must be such that high inductance (L) is avoided. Note the following formula for self-inductance on a conductor:

$$L = (\mu cond/8\pi + \mu/2\pi \ln(D/R))1$$

The important variable to note is the variable D, which is the distance to the center of the return path. By reducing the distance (D) mechanically, L is decreased. Conversely, the following formula for capacitance is:

$$C = \epsilon A/d$$

In this equation d is the spacing between the conduction plates. By decreasing distance (d) the capacitance (C) increases. This increase in capacitance (C) also serves to decrease the affect of inductance (L) by filtering voltage transients. By decreasing the overall inductance and increasing capacitance, the bus structure voltage transients caused by the high di/dt can be kept at a minimum. Optionally, small resistor-capacitor (RC) snubber circuits can be added to help reduce transients. Usually low inductance resistors and small values of film capacitors are placed locally in the problem areas. Typical values of capacitance and resistor values can be found in vendor application notes and product literature, as well as resistor—capacitor—diode (RCD) type snubbers and typical values.

Figure 8:
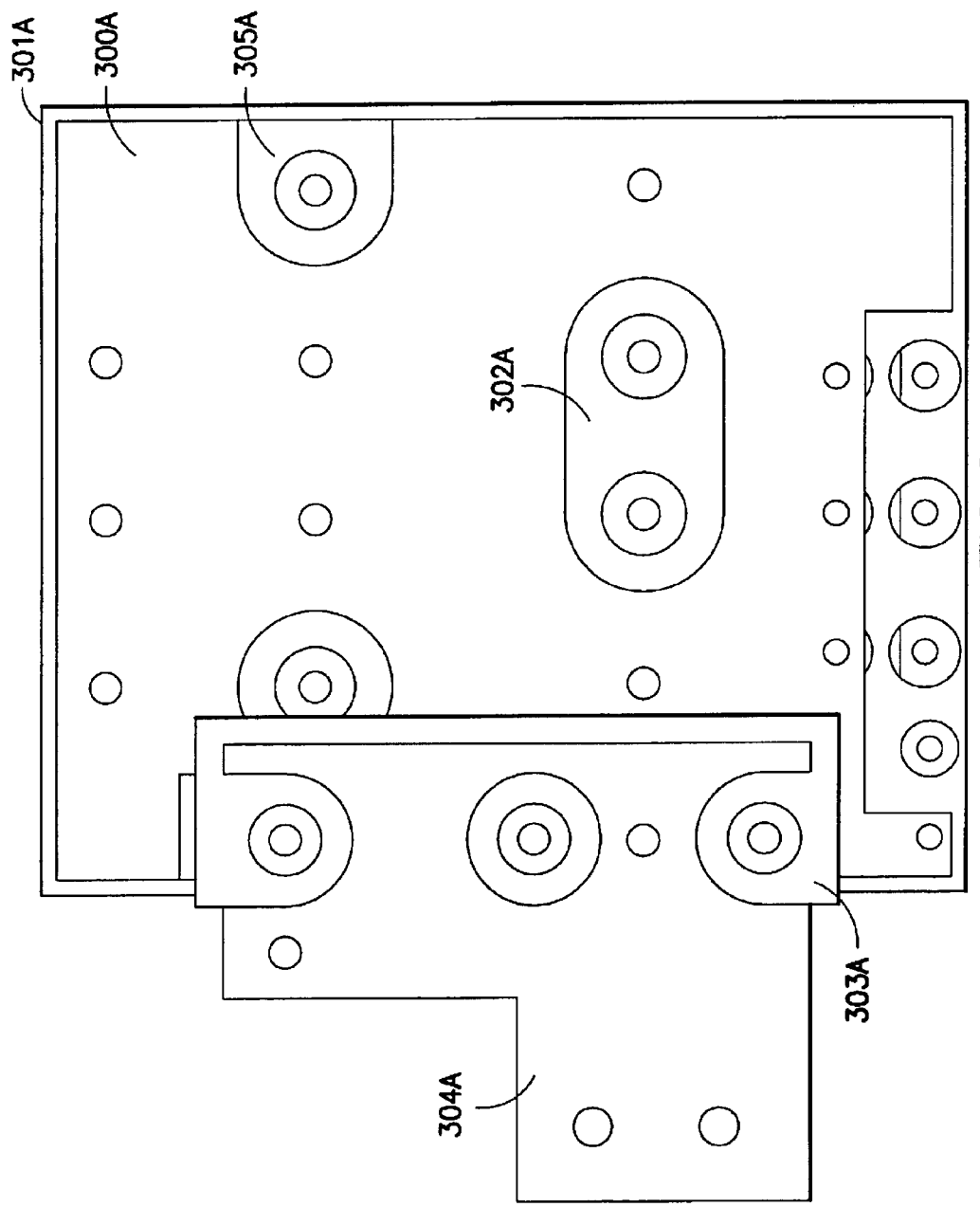
FIG. 8 is a top plan view schematic drawing of a layered bus.
Figure 9:
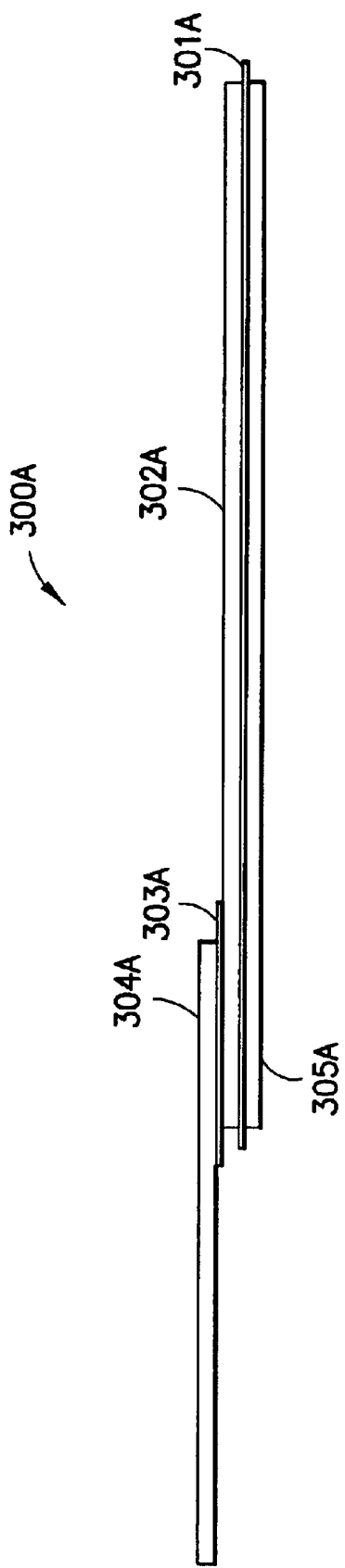
FIG. 9 is a side elevation view schematic drawing of the layered bus of FIG. 8.

FIGS. 8 and 9 shows two views of an exemplary bus design 300A that was created to address this issue. FIG. 8 is a top view of the assembly while FIG. 9 is a side view of the assembly. Layers 301A and 303A are insulators for the three different conduction plates; 305A is the positive bus bar; 302A is the negative bus bar; and 304A is the load bus bar. In this design, the bus bars are eighth-inch-thick copper to handle high currents of 600 Amps or more. The insulating material is a polymer, e.g. Nomex® 410, 30 mils thick. When the semiconductors and connect points are attached, the structure is compressed together to hold the plate-to-plate spacing as shown in FIG. 9. A suitable spacing distance is important to keep the inductance down and maximize the capacitance value of the structure.

Output Filter Requirements

Sizing the output inductor properly is an important aspect of the invention. In general, the requirements for filtering the fast charger output are dictated by the need to minimize heating of the battery being charged. Minimizing ripple current delivered to the battery minimizes undesirable heating. However, the amount of ripple current that the battery can tolerate depends on the type of battery being charged. Typically, flooded lead acid storage batteries are able to tolerate a somewhat "dirty" charging input, e.g., ripple current of up to 10 percent vs. peak current is acceptable. However, sealed lead acid storage batteries require a very well-filtered DC current input for charging; if heating causes off-gassing, an explosion can be the result. However, sealed storage batteries have a number of desirable attributes, such as lack of odor, low maintenance, and the sealed construction eliminates periodic watering, corrosive acid fumes and spills. Therefore, it is an advantage of the invention that the fast charger design is adaptable to these quite different requirements by adjustment of the output filter specifications.

Thermal Management

In addition, thermal management of the batteries is a variable. In many uses, a great deal of demand is placed on the battery. Thus the battery may arrive at the fast charger already quite hot. In the case of sealed batteries, the need to minimize heating is exacerbated. Cooling means such as fans may be deployed to cool the depleted battery.

Battery temperature is an important parameter. Batteries that come in for charging and are at a temperature in excess of 125° F. cannot be effectively fast charged, and must be cooled to suitable temperature. It is important that batteries are not in excess of 115° F. when beginning their fast charge, and preferably the battery temperature will be <100° F. at the inception of fast charging, because there will be a temperature rise of about 15° F. over the 30–90% SOC charge cycle with the fast charger of the invention. If the battery temperature is greater than 130° F., the battery should not be charged at any rate (standard rate or fast rate).

In heavy use applications, where the batteries are being discharged in use at a high rate, heating of the battery may be minimized by deploying a fan on the vehicle or battery cover, blowing over the battery interconnects to continuously remove heat from the battery.

Another thermal management approach is to use copper inserts in the battery posts and cell interconnects. Copper parts have 1/12 the electrical resistance and 12 times the thermal conductivity of parts made from an equivalent mass of lead. Selection of copper parts results in less heat being generated in the battery and more heat being conducted away from the battery. The combination of both fans and copper is extremely effective in minimizing battery heating.

The ability to control charging profile with good precision, by the means of the PWM circuit and switching frequency, as described herein, is an advantage of the fast chargers of the present invention, since a set of process conditions can be defined to provide good thermal management.

The fast charger preferably is configured to measure the battery temperature through the means of a thermistor mounted either in the electrolyte or on a battery post or interconnects. The thermistor is a temperature variable resistance that is read by the charger. The most preferred positioning of the thermistor is immersed in the electrolyte.

In a preferred embodiment, the charger is programmed to adjust the maximum charging voltage, which declines with increasing battery temperature. The charger also uses the battery temperature information to set a sharp linear decline in charging current from full allowable setting to 0, over the temperature swing from 125° F. to 130° F. to prevent overheating of the battery. The charger will then shut off if the temperature exceeds 130° F. These temperatures will vary slightly with battery manufacturer for lead acid batteries.

AC Ripple Voltage Effect on Battery

Figure 10:
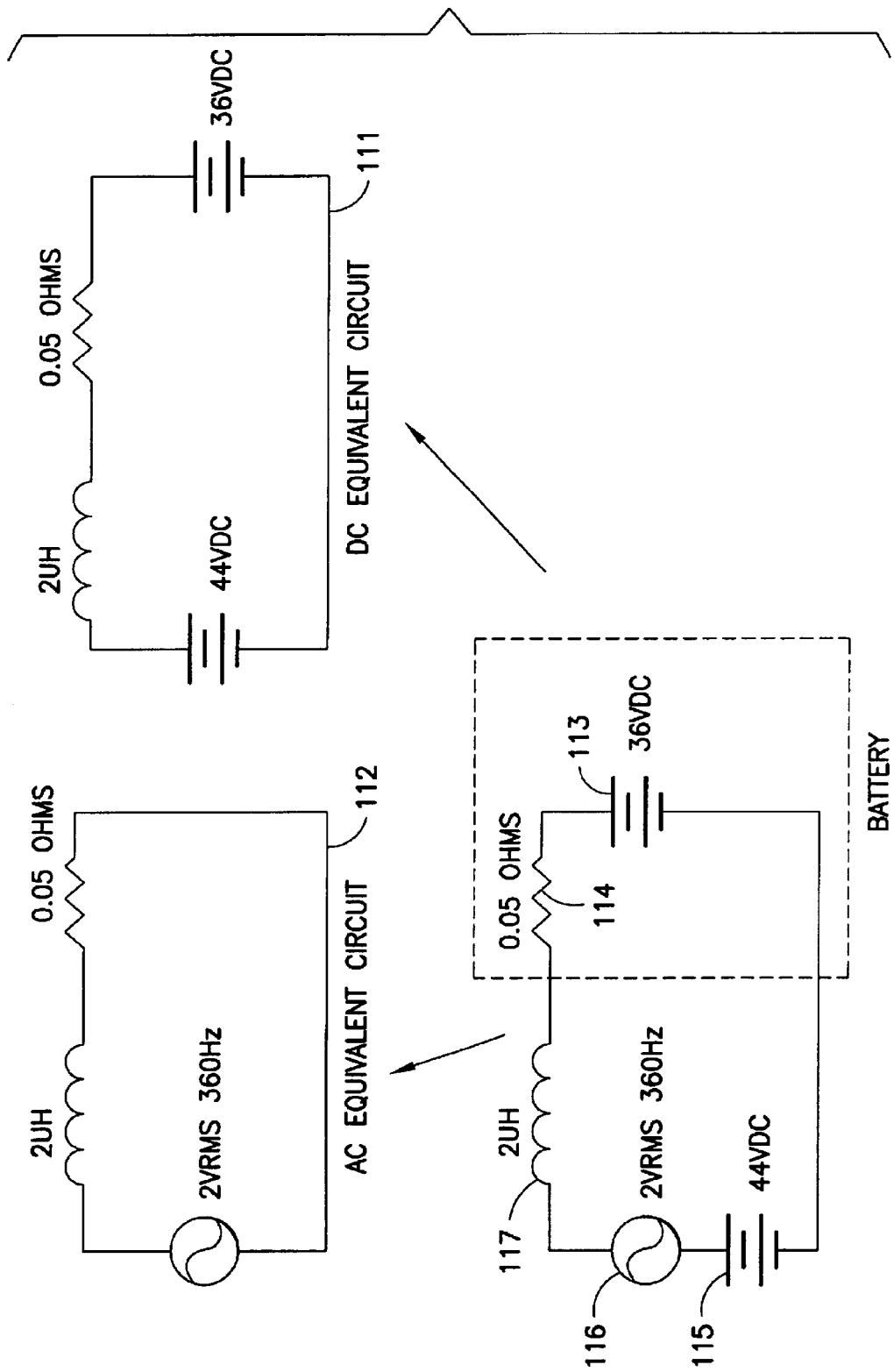
FIG. 10 is a compilation of electrical circuit diagrams, modeling the output of the fast charger of the invention as a DC source, superpositionally deconstructed into its DC and AC equivalents.

Referring to FIG. 10, the output of the fast charger of the invention can be modeled as a DC source 115 in series with an AC source 116 coupled to a battery through a small series inductance 117 (wiring inductance). The battery model consists of a voltage source 113 in series with an internal impedance 114. From FIG. 10 we can use superposition to decompose the circuit into its DC 111 and AC 112 equivalents. The battery DC voltage appears as a short circuit to the AC component. The dissipation of the internal resistance of the battery is the sum of the dissipations from both the AC and DC components on that resistance. In the AC circuit the resistance sees an RMS current of:

$V_{rms}$:2

Res:=0.05

$Z := \sqrt{Res^2 + (2\pi \cdot 360 \cdot 2 \cdot 10^{-6})^2}$ float, $4 \to 5.02010^{-2}$ $I_{rms} := \dfrac{V_{rms}}{Z}$ float, $4 \to 39.84$ This leads to a loss due to the AC component of:

$AC_{pwr} := I_{rms}^2 \cdot 0.05$ float, $4 \to 79.36$

The loss due to the DC component is:

$DC_{pwr} := \dfrac{(44-36)^2}{Res}$ float, $4 \to 1280.$

The additional AC component causes an increase of 5.84% in battery heating.

$Total_{pwr} := AC_{pwr} + DC_{pwr}$ float, $5 \to 1359.4$ $\Delta pwr := \dfrac{AC_{pwr}}{Total_{pwr}} \cdot 100$ float, $4 \to 5.838$ In the fast charger circuits of the invention, the output filter serves as a low pass filter set to limit the AC ripple current to the battery. Because of the minimal capacitance technique, the 360 Hz AC ripple on the bus voltage must be filtered by the output filter, to avoid overheating the battery. In preferred embodiments, this AC component is filtered to less than 5% of maximum current output from high bus to low bus. The following calculations show how to set the output filter to achieve this goal:

Assume an operating frequency of 15 KHz and a duty cycle of 50%, a DC bus voltage of 106V AC RMS three phase 60 Hz and a maximum battery capacity of 930 Ahr. Calculate the following to limit the ripple current to less than 5% of maximum current out.

Find maximum charge amps out from maximum battery capacity:

$Max_{amps} = 930*43/100 = 399.9$ $d_i = 0.05*399.9 = 20$ $VP := 106 \cdot \sqrt{2}$ float, $4 \to 149.9$; this is the peak voltage $V_{min} := VP \cdot \cos\left(\dfrac{\pi}{6}\right)$ float, $4 \to 129.8$ This is the minimum bus voltage that the output filter sees. By limiting the change of current ($d_i$) to less than 5% of the maximum current out, the AC component can be contained to a small value. The following calculations determine the inductance needed:

$\Delta V_{out} := VP - V_{min}$ float, $4 \to 20.1$ $dt_{on} := 33 \cdot 10^{-6}$ $L_{out} := \Delta V_{out} \cdot \dfrac{dt_{on}}{di}$ float, $4 \to 3.317 \cdot 10^{-5}$ The important parameter here is the limitation of the ripple current (di). Ripple current di is preferably kept below an upper limit relative to the size of the batteries being charged, i.e., relative to maximum load current. Key specifications are the AC voltage input differential, the desired upper limit of AC ripple current out, and the operating frequency of the electronic switch. Preferably, AC ripple current will be less than 5% of the maximum load current, and AC voltage ripple is less than 0.5% of the maximum load voltage (fully charged). More preferably, AC ripple current will be less than 2.5% of the maximum load current. The output inductance is preferably adjusted to achieve maximum output AC ripple current less than or equal to about 5% of the maximum load current, and more preferably less than or equal to about 2.5% of the maximum load current. The output inductance is therefore selected as described below.

A bus voltage is selected that allows the buck regulator to operate ON; battery voltages must be less than the bus voltage at all times. To limit battery heating, a maximum ripple current di of 2.5% of the maximum load current is used in the calculation. From maximum battery size, find maximum current out.

$Max_{Iout} = 43 \, Ahr/100$ $di_{desired} := 0.025 \cdot Max_{Iout}$ $dt_{ontime} := 0.5 \dfrac{1}{freq}$ $\Delta V_{bus} := Vbus_{pk} - Vbus_{min}$ The desired output inductance may be calculated based on the calculated $\Delta V_{bus}$:

$L_{desired} := \Delta V_{bus} \cdot \dfrac{dt_{ontime}}{di_{desired}}$

The following thus summarizes one approach to sizing the output filter to accommodate the AC minimal filtering:

Pick appropriate bus voltage to allow usage of all batteries concerned (Bus volts>all battery volts).

Determine maximum current output from battery capacity (e.g., 43A/100 AHR charge rate)

Determine maximum output current ripple allowed by limiting it to 5% of maximum output.

Determine on time for current change from the switch operating frequency (assume 50% on time for purposes of this calculation)

Determine bus differential voltage from Volts peak minus volts peak*cos (30 degrees).

Calculate $L_{desired}$ from the equation set out above.

The larger the output inductance becomes, the lower the percentage ripple current that can be achieved. An output capacitor also helps filter out the AC ripple current to the battery. In sum, limiting the AC output ripple current reduces heating in the battery and optimizes the charge profile.

As stated above, because of the minimal bus capacitance value, the 360 Hz ripple component must be filtered by the output filter. Further, at the end of charge cycles, the output currents reach levels of 50 Amps or less. The inductor must have a sufficient value of inductance to accommodate both these issues. In addition to the value of inductance needed, there is a potential problem of saturation and heating at current levels of 600 Amps or more. To prevent saturation, magnetic core selection becomes the primary focus. In preferred embodiments, an open-ended laminated steel I-core, or other high frequency choke of appropriate material and design, is used as the output inductor, to help eliminate saturation problems. Saturation causes a loss of inductance that causes large current spikes in the converter. The amount of saturation dictates the magnitude of these currents and could lead to semiconductor failure if excessive.

Lastly, if the proper wire size is not sufficient, excessive heating will arise due to $I^2R$ losses. Four separate redundant turns of copper wire were used to accommodate the design target of 600 Amps in our design.

An exemplary calculation for selection of output inductance follows, based on design parameters:

$$Vin_{min}:=130$$

$$Don:=0.304$$

{IGBT on duty cycle}

$$Doff:=0.696$$

{Diode on duty cycle}

$$Vin_{max}:=150$$

$$f:=15 \cdot 10^3$$

$$Vout:=43.56$$

$$t_{on} := \left(Don \cdot \frac{1}{f}\right) \text{float}, 4 \to 2.027 \cdot 10^{-5}$$

$$Iout_{min}:=30$$

$$Iout_{max}:=400$$

$$toff := Doff \cdot \frac{1}{f} \text{ float}, 4 \to 4.640 \cdot 10^{-5}$$

$$\Delta Vout:=1$$

Light load conditions with the maximum bus voltage is the worst case scenario, Vinmax and Ioutmin.

In order to maintain continuous mode of operation:

$$\Delta i_L := Iout_{min} \cdot 2 \to 60$$

$$L := \frac{t_{on} \cdot (Vin_{max} - Vout)}{\Delta i_L} \text{float}, 3 \to 3.60 \cdot 10^{-5}$$

This L is the minimum inductance required to maintain continuous mode.

To find capacitance, use Vinmax, Ioutmax and choose inductor value of 70 µH.

$$L:=70 \cdot 10^{-6}$$

$$\Delta i_L := (Vin_{max} - Vout) \cdot \frac{t_{on}}{L} \text{float}, 3 \to 30.8$$

$$\Delta Q := \frac{1}{2} \cdot \frac{1}{2 \cdot f} \cdot \frac{\Delta i_L}{2} \text{float}, 4 \to 2.567 \cdot 10^{-4}$$

$$Cout := \frac{\Delta Q}{\Delta Vout} \text{float}, 4 \to 2.567 \cdot 10^{-4}$$

In addition, the selected capacitor must handle the ripple current.

$$Irip_{out} := \Delta i_L \cdot \frac{\sqrt{3}}{3} \text{float}, 3 \to 17.8$$

{RMS ripple current capacitor must handle}

Preferably, a film capacitor that can handle 18 amps RMS ripple current is employed. Since the actual load is a battery, this value can be reduced due the characteristics of the load. In addition, different battery voltages are to be charged. Therefore, the worst case scenario must be used for these calculations to arrive at desired values.

Control Techniques

In a first embodiment, the pulse width modulation used to provide the output power is itself modulated in response to the 360 Hz rectified 3-phase AC input waveform. As the ripple from the 360 Hz rides largely unfiltered on the DC bus, the PWM duty cycle is synchronously varied in proportion and accordance with the AC ripple voltage. As the AC voltage increases, the PWM is decreased in order to accommodate the higher input voltage and is correspondingly increased when the AC voltage decreases in the 360 Hz DC bus ripple sinusoidal waveform. This is accomplished by continuously monitoring the output or input voltage ripple to the controller and adjusting the drive PWM on a pulse-by-pulse basis. As the voltage increases on the DC output of the converter, the PWM duty cycle is reduced and as the voltage decreases on the DC output the PWM duty cycle is increased. This effectively removes the 360 Hz AC ripple component on the DC bus input from the voltage output of the converter and provides a constant DC voltage at that output.

Figure 11:
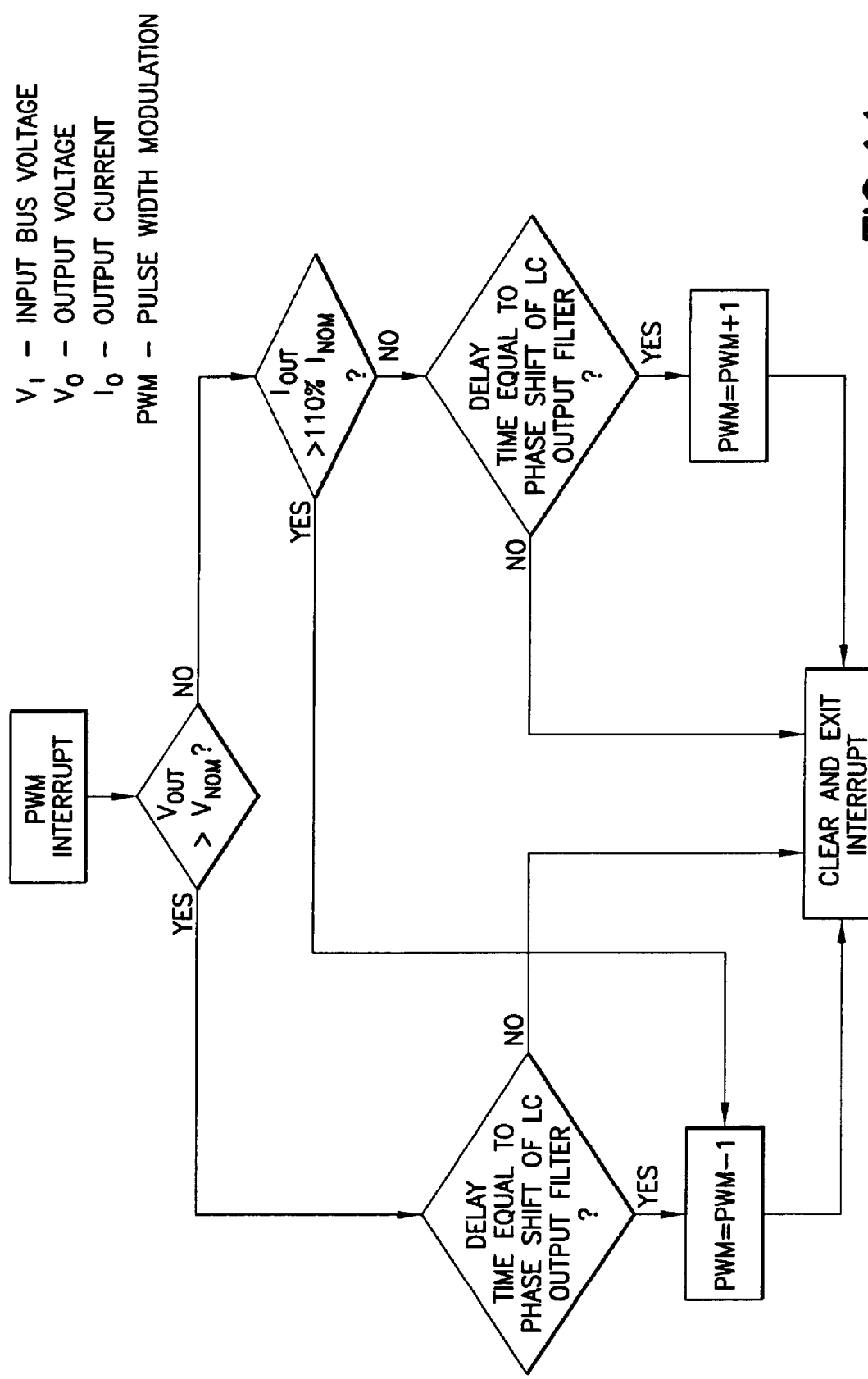
FIG. 11 is a flow chart illustrating a first control technique for the fast charger of the invention.

FIG. 11 is a flow chart illustrating a first control technique for the fast charger of the invention, wherein $V_I$ is input bus voltage, $V_O$ is output voltage, $I_O$ is output current, and PWM is pulse width modulation (PWM). In respect of the PWM interrupt input, it is determined whether $V_{out} > V_{in}$. If the determination is affirmative, a determination is made of whether the delay time is equal to the phase shift of the LC output filter. If the response is in the affirmative, then the PWM value is decremented by 1 and the interrupt then is cleared and exited. If the determination is negative, then the interrupt is cleared and exited.

If $V_{out}$ is not greater than $V_{in}$, then a determination is made of whether $I_{out}$ is greater than $110\% \times I_{nom}$. If the determination is affirmative, then the PWM value is decremented by 1 and the interrupt then is cleared and exited. If the determination is negative, then the interrupt is cleared and exited.

If, however, $I_{out}$ is not greater than $110\% \times I_{nom}$, then the determination is made of whether the delay time is equal to the phase shift of the LC output filter. If the response is in the affirmative, then the PWM value is incremented by 1 and the interrupt then is cleared and exited. If the determination is negative, then the interrupt is cleared and exited.

In a second embodiment, a 15 kHz rate every pulse triggers an interrupt service routine (ISR). In this routine, the output voltage, VOUT, is read. If VOUT is too high the PWM is decremented by 1 and the ISR is terminated. If VOUT is at or below VOUTNOM desired the current is then measured. If the current is above 125% Imax the program immediately decrements the PWM and exits the ISR. If the current is below or equal to 125% of INOM the PWM Ramp delay is examined and if equal to zero the ramp delay count is reloaded and the PWM is decremented by one before exiting the ISR. If the ramp delay is not equal to zero, the ramp delay is decremented and the ISR exited. If the current is below a desired level the ramp is delayed and the ramp delay count must be zeroed before the PWM can be incremented. If the current is as desired, the ISR is exited immediately and no change in the PWM count is made.

Figure 12:
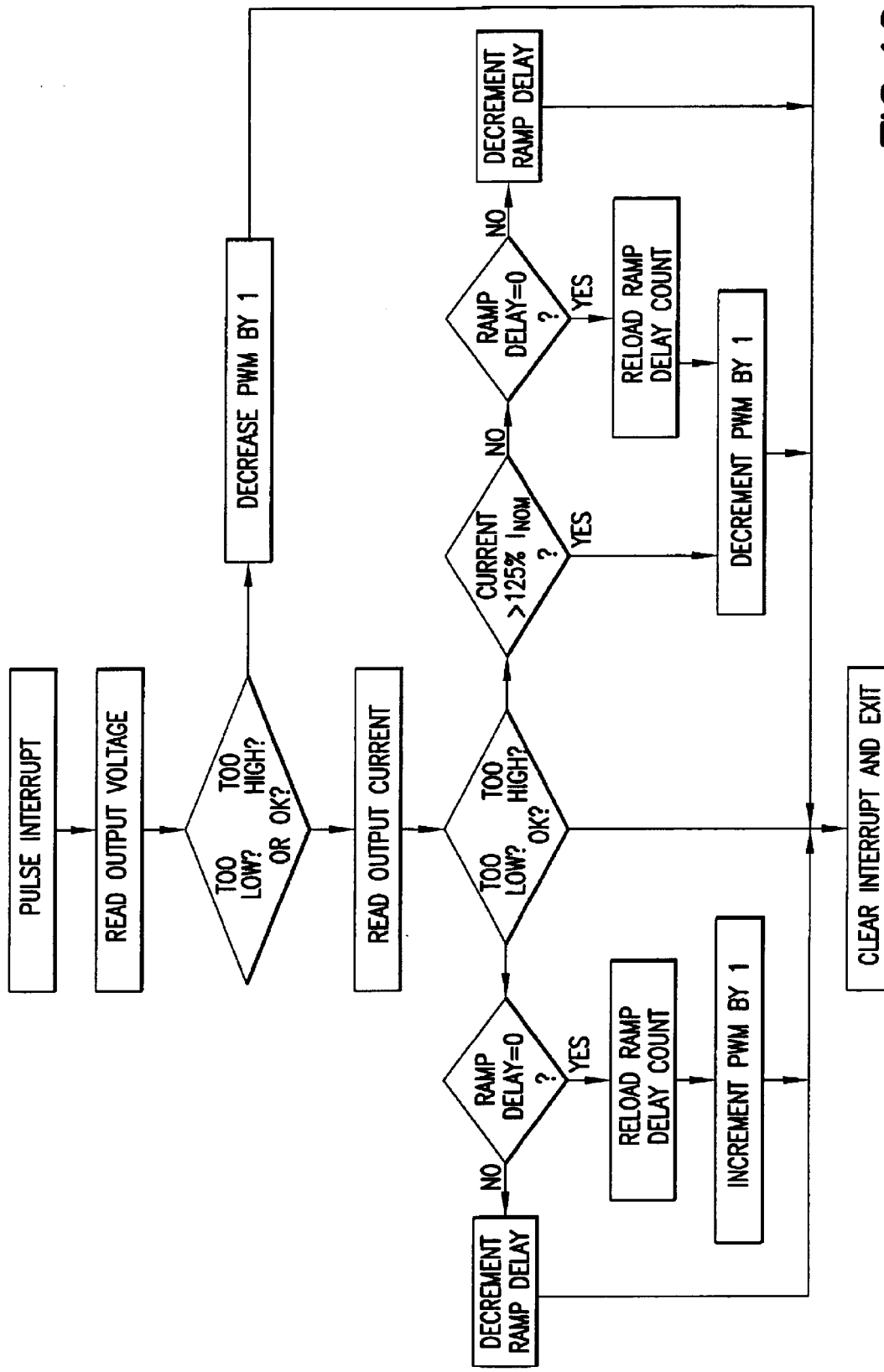
FIG. 12 is a flow chart illustrating a second control technique for the fast charger of the invention.

FIG. 12 is a flow chart illustrating a second control technique for the fast charger of the invention, and FIG. 13 (A–D) is a software listing for the second control technique shown in FIG. 12.

As shown in FIG. 12, the pulse interrupt input generates a feed output voltage. If this voltage is too high, then the PWM is decremented by 1, and the interrupt is cleared and exited. If the voltage is too low or is at a suitable level, then the output current is read.

A determination then is made on whether output current is too low, too high, or at an acceptable level.

If the output current is at an acceptable level, then the interrupt is cleared and exited. If the output current is too low, then a determination is made of whether the ramp delay is zero.

If the determination is affirmative, then the ramp delay count is reloaded and PWM is incremented before clearing the interrupt and exiting. If the ramp delay is non-zero, then the ramp delay is decremented before clearing the interrupt and exiting.

If the output current is too high, then it is determined whether current is >125% of $I_{NOM}$. If yes, then PWM is decremented by 1 before clearing the interrupt and exiting. If no, then a determination is made of whether ramp delay has a zero or a non-zero value. If the ramp delay has non-zero value, then the ramp delay is decremented, before clearing the interrupt and exiting. If the ramp delay has a zero value, then the ramp delay count is reloaded, and PWM is decremented by 1, before clearing the interrupt and exiting.

In a third embodiment, the output voltage and current are continuously monitored and prevented from exceeding desired values while at the same time allowing the passing of the 360 Hz AC ripple current and voltage, created by the input rectification process, by the use of one or both of the following techniques. The voltage and current values are filtered in an analog circuit which averages their value over the 360 Hz rectified input cycle and prevents control reaction to small variations within this 2.77 mS time frame. The PWM output circuit in the microprocessor is prevented from reacting to minor variations in the output voltage and current by numerical methods and/or limiting the adjustment frequency of its control response.

Figure 14B:
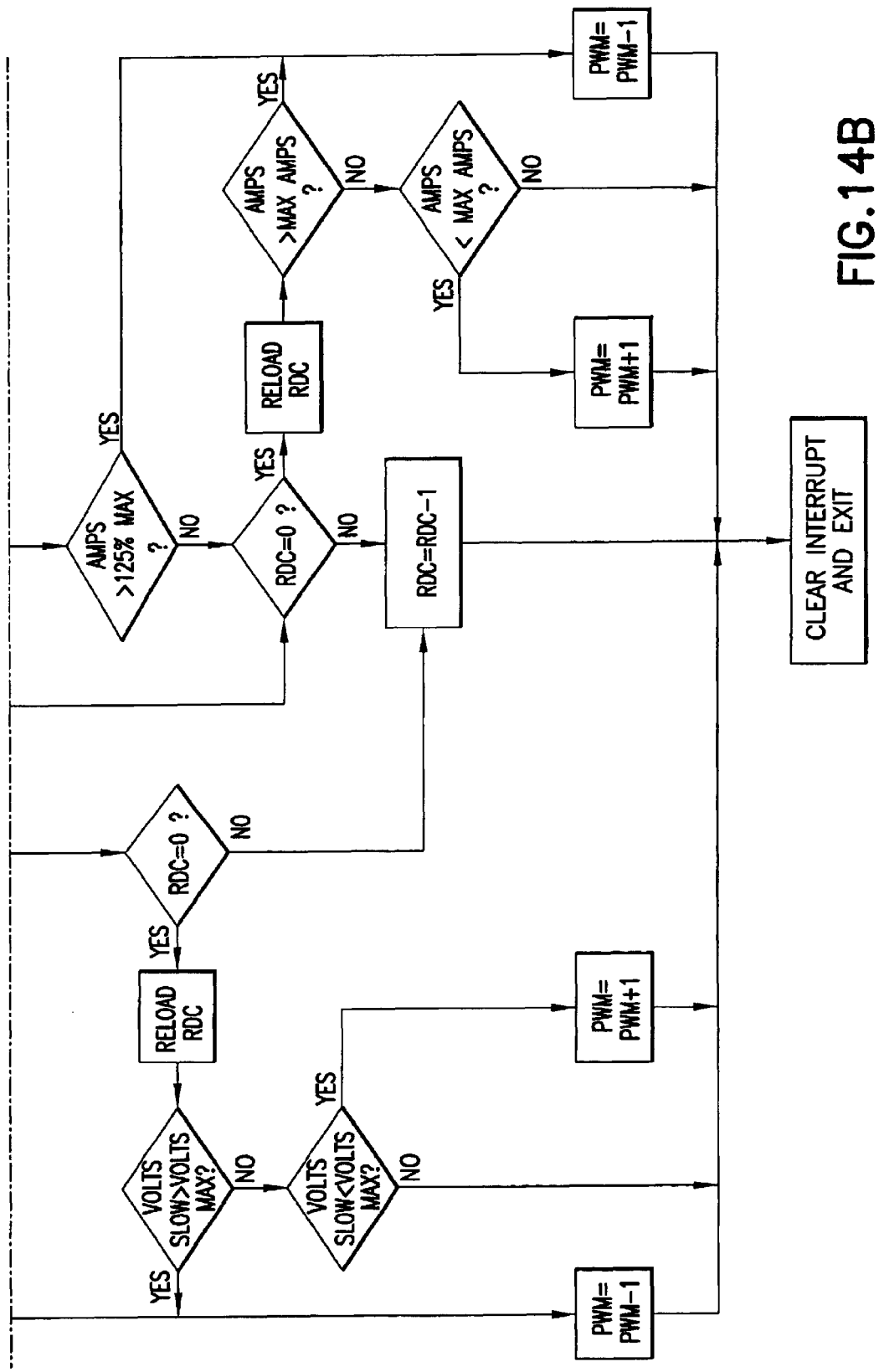
FIG. 14 (A–B) is a flow chart illustrating a third control technique for the fast charger of the invention.

FIG. 14 (A–B) is a flow chart illustrating a third control technique for the fast charger of the invention, and FIG. 15 (A–D) is a software listing for the third control technique shown in FIG. 14 (A–B).

As shown in the drawing of FIG. 14 (A–B), *RDC is ramp delay count, CC is constant current, CV is constant voltage, PWM is pulse width modulation count, and volts slow denotes that the output voltage is filtered to remove 360 Hertz AC component.

In this embodiment, it is first determined if the system is in CV mode. If yes, the CV controller is actuated, and a determination is made of whether the current (amps) is greater than maximum amps. If no, it is determined if volts slow is greater than 1.125% of Vmax. If yes, the PWM is decremented by one and cleared and exited. If volts slow is not greater than 1.125% of Vmax, then the ramp delay count is examined to see whether it is zero or not. If it is zero, then the RDC is reloaded, and determination is made of whether volts slow is greater than volts max.

If the volts slow are greater than volts max, then the PWM is decremented by 1 and before clearance and exiting. If the volts slow are less than volts max, then the PWM is incremented by 1 before clearance and exiting. If the slow volts are less than volts max, then the interrupt is cleared and exited.

If RDC in the prior step is non-zero, then RDC is decremented by 1 before clearance and exiting.

If in the prior step, amps>max amps, then RDC is tested to determined whether it is zero or non-zero. If it is not zero, then RDC is decremented by 1 before clearance and exiting.

If the system is not in a constant voltage mode, then determination of whether the system is in equalize mode is made. If yes, the constant voltage control is actuated. If the system is not in the equalize mode, then the constant current mode is actuated. Thereafter, a slow volts>volts max determination is made. If affirmative, the power signal will be sent to the CV control again. If slow volts are not greater than volts maximum, a determination is made of whether amps are >125% of the maximum—if so, then PWM is ready to be decremented by 1 prior to clearing the interrupt and exiting.

If amps are not greater than 125% of maximum, then a determination is made of whether RDC is zero or non-zero. If RDC is non-zero, then RDC is decremented by 1 prior to clearing the interrupt and exiting. If RDC is zero, then RDC is reloaded, and a determination is made of whether amps are greater than max amps. If yes, the PWM is decremented by 1 prior to clearing and exiting the interrupt. If no, then a determination is made of whether amps<max amps; if yes, the PWM is incremented by 1 prior to clearing and exiting the interrupt, and if no, then the interrupt is cleared and exits.

Block and Schematic Diagrams of Illustrative Process Embodiment

Figure 16:
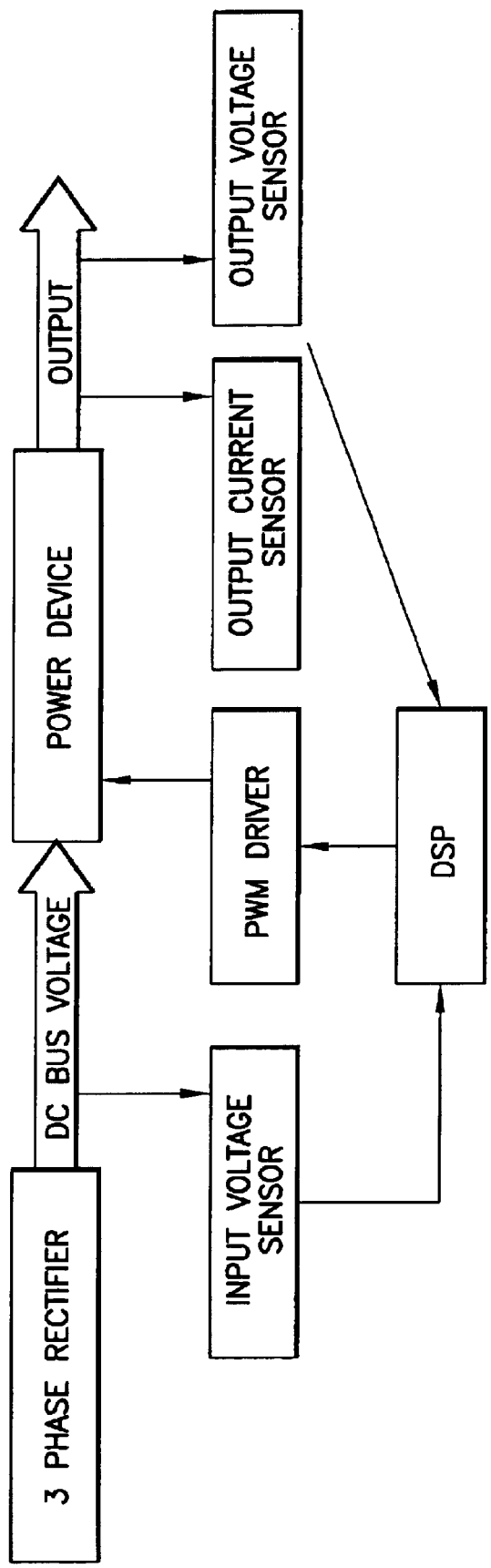
FIG. 16 is a simplified block diagram illustrating the fast charging method of the invention.

FIG. 16 is a simplified block diagram of a fast charger arrangement according to one embodiment of the invention.

As illustrated, the 3-phase rectifier produces a DC bus voltage that is sensed by the input voltage sensor, which in turn responsively and correlatively generates a sensed input voltage signal, which is passed to the digital signal processor (DSP). The digital signal processor may be of any suitable type, including a programmable general purpose digital computer, a microprocessor unit, a computational module, or other device or unit for processing the signals inputted thereto, including the sensed voltage input signal, and responsively and correlatively generating a control signal or signals for the purpose of modulating the operation of the fast charger apparatus.

The DC bus voltage is transmitted to the power device, which responsively and correlatively generates an output. The output is sensed by a sensing assembly including an output current sensor and an output voltage sensor, which respond to correspondingly generate output sensing signal(s) that are transmitted to the DSP.

The DSP receives the input and output sensing signals and produces a control signal that is transmitted to the pulse width modulation driver (PWM Driver) to actuate it. The PWM Driver in response generates a signal that is transmitted to the power device to provide an output of the desired character.

Figure 17:
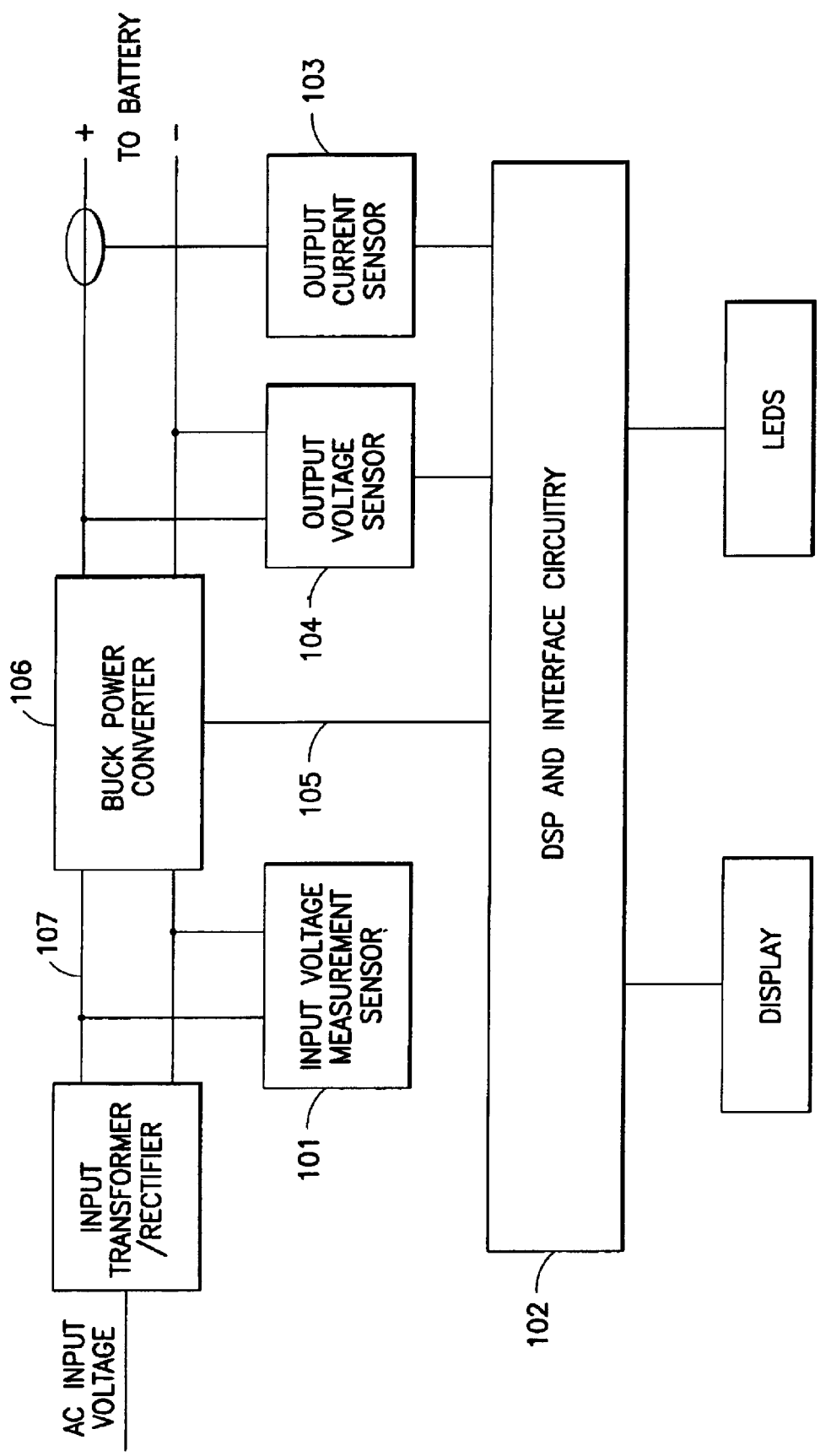
FIG. 17 is a general schematic electrical circuit diagram for a buck power converter system according to one embodiment of the invention.

FIG. 17 is a corresponding electrical circuit diagram of a buck regulator-based fast charger for high capacity batteries, according to one embodiment of the invention. The digital signal processor and associated interface circuitry 102 (DSP AND INTERFACE CIRCUITRY) are shown with the input voltage sensor 101 (INPUT VOLTAGE MEASUREMENT SENSOR) coupled to the lines 107 interconnecting the input transformer/rectifier unit (INPUT TRANSFORMER/RECTIFIER) and buck power converter 106 (BUCK POWER CONVERTER). The input transformer/rectifier unit receives an AC input voltage, as shown. The buck power converter 106 produces a modulated output that is transmitted by the line 108 to the high capacity battery (not shown in FIG. 17) for fast charging thereof.

The DSP and associated interface circuitry 102 receives an input voltage sensing signal from input voltage sensor 101, and responsively and correlatively generates an output signal that is transmitted in line 105 to the buck power converter for control thereof.

Concurrently, the output voltage and current in lines 108 interconnecting the buck power converter 106 and the battery (not shown in FIG. 17) are sensed by output voltage sensor 104 (OUTPUT VOLTAGE SENSOR) and output current sensor 103 (OUTPUT CURRENT SENSOR), respectively, and sensors 103 and 104 responsively and correlatively generate sensing signals that are transmitted to the DSP and interface circuitry 102, for modulation of the control signal passed in line 105 to the buck power converter 106.

The DSP and interface circuitry 102 may be arranged for providing an output indicative of the state of charge (SOC), rate of charging, or other output indicia or parameter, via a display (DISPLAY) and/or an LED output (LED'S).

In one embodiment, the DSP and interface circuitry 102 are arranged to provide an output that is in a form of a "gas tank" type display, showing the state of charge of the battery during the charging operation. This state of charge display may comprise a series of illuminatable elements, e.g., vertically elongate elements of rectangular shape, or alternatively, elements of square shape, that are horizontally arrayed between two bracketing indicia, "E" for "empty" and "F" for "full" at opposite ends of the horizontal array.

The horizontally extending array of illuminatable elements is coupled with the DSP and interface circuitry 102 so that the elements are sequentially and cumulatively energized to emit illumination, beginning from a state of charge of 0% (at the "E" indicium) in which no elements are illuminated, to a 100% state of charge in which all elements of the array are lit up (from the "E" indicium to the "F" indicium). As the state of charge progressively increases during the fast charging operation, the proportion of lit display elements progressively increases from left (at "E") to the right (at "F"), to visually display by such analog luminative output the relative level of charging, during charge-up to 100% SOC condition of the battery.

It will be appreciated that the "E" and "F" indicia described above may be replaced, or augmented, with other indicia, such as "0%", "Dead", "Empty", "Uncharged", or the like, at the left-hand ("E") end of the horizontally extended display, and "100%", "Live", "Full", "Charged Up", or the like, at the right-hand ("F") end of the horizontally extended display, the arrangement in all cases providing a simple visually discernible indicator of the SOC of the battery being subjected to charging by the fast charger unit, analogous to a familiar fuel gauge in a vehicle or a craft, such as an automobile, boat, airplane, or the like.

By providing such a seemingly familiar "gas tank type gauge," the operator of the fast battery charger can see the relative progress of the charging operation at a glance, and derive a sense of the relative amount of time remaining until the battery is fully charged. This gas tank type gauge may be deployed on a face of a cabinet in which the fast charger components are arranged for operation.

In the operation of the FIG. 17 fast charger system, voltage is inputted to the input voltage measurement sensor, producing a signal to the DSP and interface circuitry 102, and the output current sensor 103 and output voltage sensor 104 provide input to the DSP and interface circuitry 102, producing a buck power converter adjustment signal transmitted to the buck power converter in line 105. As the voltages and current vary from the desired reference values, the DSP and interface circuitry 102 varies the pulse width modulator driver software in the DSP and interface circuitry 102 such that the output voltage is increased if the output voltage sensor indicates a decreased voltage and/or the input sensor indicates a decreased voltage. If the voltages increase the opposite phenomenon takes place. Similarly, the output current sensor will affect the output current and voltage software in the DSP and interface circuitry 102 to modify the operation of the pulse width modulator driver software to adjust the operation of the pulse width modulator device to compensate for the changes in output current. The exact number of microseconds each pulse is varied can be determined by limited experimentation to provide a response to any voltage and/or current change that does not destabilize the output voltage yet provides fast response to any such change.

By way of specific example, if the output voltage is desired to be changed, then the width of each of the pulses will be increased or decreased to compensate for the desired changes in the output voltage and current. Thus, if additional output voltage is required the pulses will be increased in width and conversely if a lower voltage is required the output pulses will be decreased in width. In this way, the output voltage can be maintained by varying the energy provided by each pulse.

In one embodiment of the invention, preferably, the each pulse is increased by the same number of microseconds to increase the output voltage and reduced by the same number of microseconds upon the output voltage being decreased. In an embodiment of the invention, because the software is driven by a clock circuit the increase and decrease can be the variation of the pulse width by the desired number of clock pulses. Other solutions for varying the pulse widths can be provided in alternate embodiments of the invention while still maintaining the basic concepts of the invention.

Figure 18:
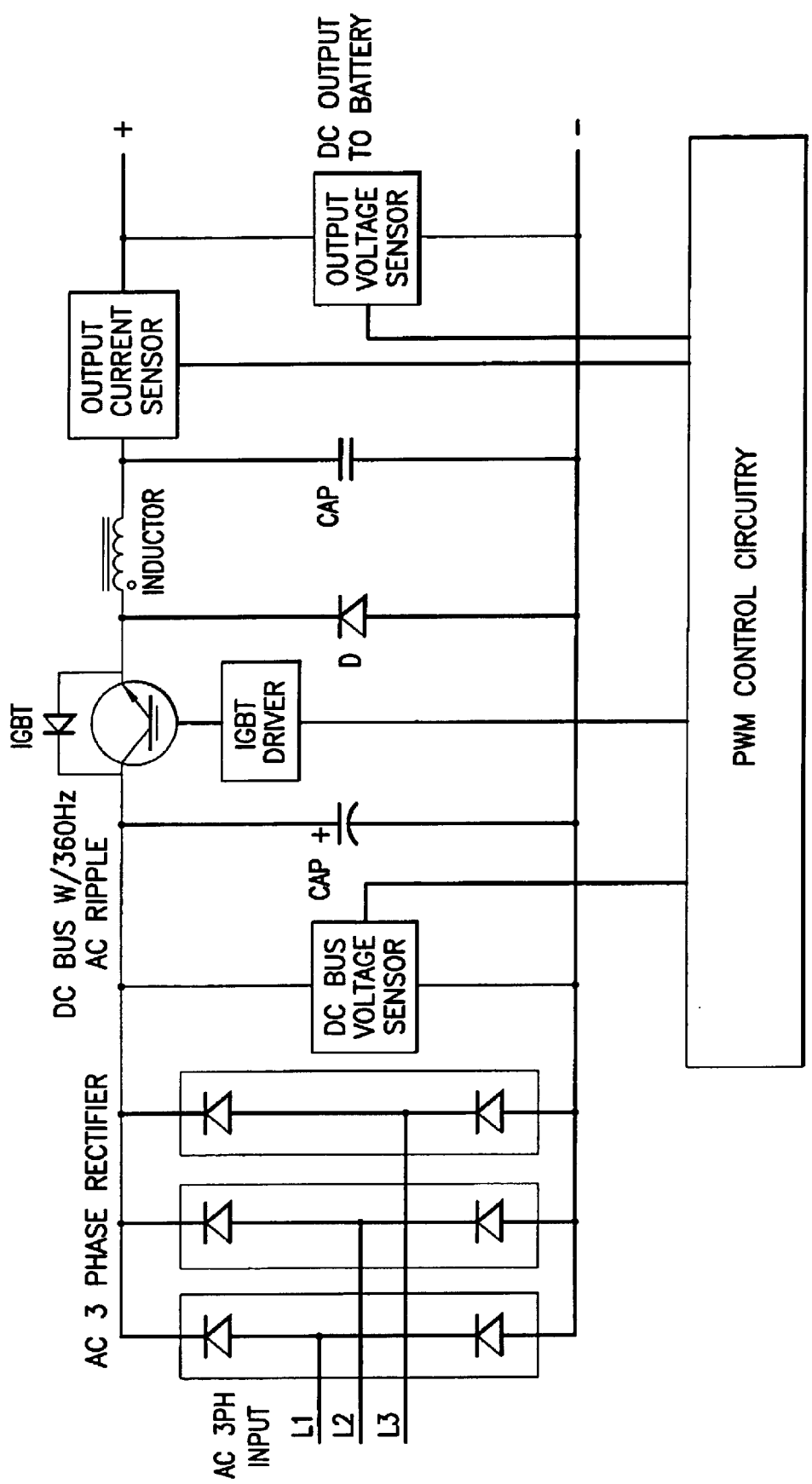
FIG. 18 is an electrical circuit diagram of a buck regulator-based fast charger for high capacity batteries, according to another embodiment of the invention.

FIG. 18 is an electrical circuit diagram of a buck regulator-based fast charger for high capacity batteries, according to another embodiment of the invention. As illustrated, an AC three-phase input in lines L1, L2 and L3 is introduced to the battery charger system, to the AC three-phase rectifier, which produces a DC current on the bus with a 360 Hertz AC ripple. The DC bus voltage sensor provides a voltage sensing signal output to the pulse width modulation (PWM) control circuitry.

The rectified power signal then passes to the IGBT device that is coupled in operative relationship to a high-frequency switching IGBT driver coupled to the PWM control circuitry. The power output from the IGBT device then passes through the portion of the charger circuit including the flywheel diode (D), inductor (INDUCTOR) and capacitor (CAP), and is presented to the battery for charging thereof The output voltage and current are monitored by current and voltage sensors as shown, and the sensed current and voltage are employed to actuate the PWM control circuitry to modulate the IGBT driver to control the switching pulse width of the IGBT device.

As was mentioned above, the ability to control charging profile with good precision, by the means of the PWM circuit and pulse width modulation as described in this section, is an advantage of the fast chargers of the present invention, since a set of process conditions can be defined to provide good thermal management. For many applications, an "IVI profile" is a desirable charging algorithm, as known in the art, since it can charge the battery to a high SOC with very little heating. An example of a typical IVI profile involves charging the battery at constant current up to about 50% of its capacity, at constant voltage until the battery reaches the charge rate of about 5A/100 Ahrs of capacity at about 90% SOC, and then at constant current from 90% to 100% SOC where the battery reached its rated Ahrs capacity. Such a profile is useful for many batteries used in industrial applications, e.g., flooded lead acid storage batteries. It is a particular advantage of the fast charger of the invention that the charging profile can be controlled over a wide range by the instruction set of the DSP. Thus major variations in charging profile can be effected by software modifications rather than by hardware changes. Tight control of the charging profile can be maintained for charging sealed batteries, or custom charging profiles can be implemented that are adapted to the battery type.

A useful example of the control techniques of the invention can be implemented in the situation where the fast charger is used in an environment that is not provided with high amperage service. While the fast charger is capable of providing current to the battery at very high current, it can also operate with limitations on power draw that might be imposed by older electrical service, for example, in a factory that had never used fast charging and where service was already provided to charging stations or other outlets with, e.g., 30 Amp capability. The output voltage sensor and output current sensor provide information that is used to control the input current. Based on the output current and voltage, the output power is calculated, and multiplied by a factor that compensates for the approximate efficiency and power factor. This compensated output power value is compared to a not-to-be-exceeded maximum value to prevent current draw in excess of 30 amperes. If the calculated output value exceeds this maximum, then the pulse width of switching controlled by the PWM is reduced. If the value is less than the maximum, then the PWM is controlled by the usual constraints of voltage and current during the charge cycle. Thus the rate of charging can be maximized within the constraints of the facility.

While the present invention may in various useful embodiments thereof use conventional pulse width modulation (PWM) techniques to effect power conversion in a buck regulator topology, it will be appreciated that buck converter fast chargers in accordance with the invention can be built with resonant, quasi-resonant or multi-resonant circuits in order to take advantage of soft switching techniques. These techniques can minimize heat and stress on the switching elements by operating under zero voltage switching (ZVS) or zero current switching (ZCS) conditions. It is to be recognized, however, that these techniques and their associated conditions are more complex and are susceptible to problems due to load variation, component tolerances, wiring layout, parasitic inductance and capacitance. In another modification within the scope of the invention, the flywheel diode can be disposed in parallel arrangement with a switching device to provide synchronous operation and thereby improve efficiency of the fast charger.

Power Factor

An especially advantageous attribute of the fast chargers of the invention is an improved power factor, especially by comparison with prior art silicon-controlled-rectifier (SCR) and ferro-resonant chargers. Power factors can be calculated by known methods, as illustrated by the following exemplary calculations.

The power factor for an SCR-based charger is calculated as follows. A conduction angle is assigned:

$$Cond_{angle} := \frac{\pi}{3}$$

$$degrees := 180 \cdot \frac{Cond_{angle}}{\pi} \text{ float}, 4 \to 60.$$

$$Angle := Cond_{angle} - \frac{\pi}{2} \text{float}, 4 \to -.5238$$

Assume normalized values of 1V peak single phase AC in and 1Ω resistive load:

$$I_{avg} := \frac{1}{2\pi}\left(\int_{-\frac{\pi}{2}}^{Angle} 2\cos(x)dx\right) \text{float}, 4 \to .1591$$

This is the average value for the desired conduction angle.

$$I_{rms} := \sqrt{\frac{1}{2\pi} \cdot \int_{-\frac{\pi}{2}}^{Angle} 2(\cos(x))^2\, dx} \quad \text{float}, 5 \to .31257$$

This represents the RMS current value for the desired conduction angle.

RMS value for input voltage is:

$$Vin := \sqrt{\frac{1}{2\pi} \cdot \int_{-\frac{\pi}{2}}^{\frac{\pi}{2}} 2 \cdot (\cos(\theta))^2\, d\theta} \quad \text{float}, 5 \to .70710$$

Iin:=$I_{rms}$

Pin$_{rms}$:=Iin·Vin float, 4→0.2210

This is the apparent power into the circuit. The average or real power of the load (ideal resistor) is determined. Because of normalized values, these are equivalent.

Vout$_{avg}$:=$I_{avg}$

From average value notation and using conduction value as the limit:

$$Pout_{avg} := \frac{1}{2\pi} \cdot \int_{-\frac{\pi}{2}}^{Angle} 2 \cdot (\cos(\theta))^2\, d\theta \text{float}, 4 \to 9.77610^{-2}$$

$$PF := \frac{Pout_{avg}}{Pin_{rms}} \text{float}, 4 \to .4424$$

This is the power factor with a 60-degree conduction angle. Also note in this ideal circuit, conduction angle dramatically affects power factor.

The power factor for a ferro-resonant charger is calculated as follows.

The output of the ferro-resonant is rectified and then supplied to the battery load. This in essence is similar to the classic rectifier circuit except that the load is a battery and not a capacitor bank. Modeling a battery and then applying a rectified AC voltage is one technique for making an approximate determination of the general power factor range. An actual battery contains a series resistance, a series inductance, a voltage source, and a parallel capacitance. Much like the SCR, the ferro-resonant does suffer from conduction angle due to its output rectification. The following example illustrates this possible conduction angle problem:

Assume a 36V battery with 18 cells, the maximum charging voltage is:

$$Max_{batv} := 18 \cdot 2.42 \text{ float}, 4 \rightarrow 43.56$$

This sets the upper charging voltage required while the lowest charging voltage is roughly:

$$Min_{batv} = 18 \cdot 2 \text{ float}, 4 \rightarrow 36.$$

The ferro charger must cover this range of output voltage to effectively charge the battery. If the max voltage is set to 43.56V then the minimum voltage out of the ferro charger will be:

$$Ferro_{Vmin} := \cos\left(\frac{\pi}{6}\right) \cdot Max_{batv} \text{float}, 4 \rightarrow 37.72$$

This indicates the rectified ferro output voltage will vary by:

$$ferro_{\Delta v} := Max_{batv} - Ferro_{Vmin} \text{ float}, 4 \rightarrow 5.84$$

The resonant winding of the ferro will provide adjustment for the peak voltage output from the charger, but the differential voltage will always be there. Thus, depending on where the peak voltage is adjusted by resonant winding loading, the minimum output voltage will be a factor cos (π/6) lower. If the output voltage is adjusted for maximum conduction, AC ripple current and surge currents can result. This can cause power factor problems much like a classic rectifier does. Because of this, the ferro does suffer somewhat from a conduction angle problem. Loading the resonant winding is the approach employed to adjust the output voltage to the battery. This also limits the adjustment range available.

Figure 19:
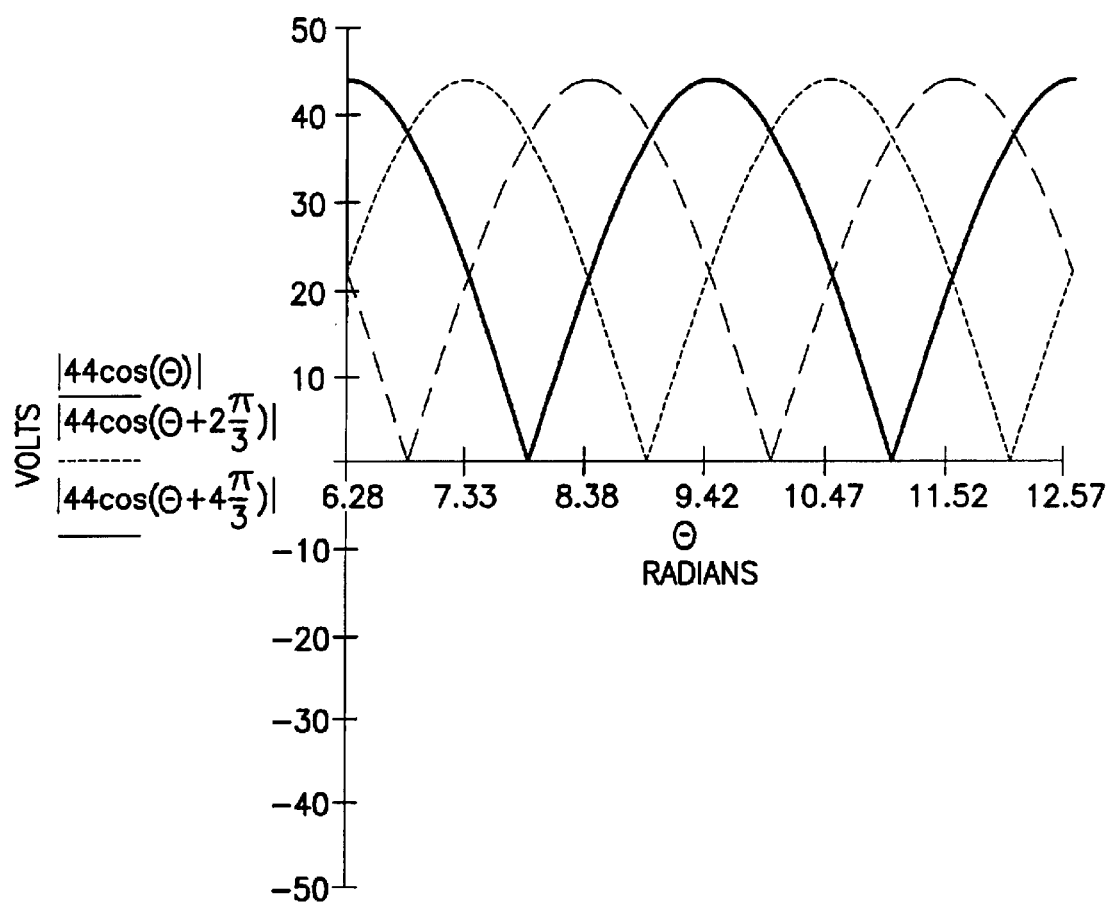
FIG. 19 is a plot of voltage as a function of time for an illustrative ferro-resonant charger output.

FIG. 19 is a plot of voltage as a function of time for an illustrative ferro-resonant charger output.

The power factor for a high frequency buck-regulator based charger is calculated as follows.

Assuming a normalized circuit with a current source of 1 Amp DC and a single phase AC source of 1 Volt peak. In essence, the DC output current appears as a 1 to −1 Amp square wave in phase with the input voltage. Calculating as before:

$$V_{inrms} := \frac{1}{\sqrt{2}}$$

RMS value of the current square wave is:

$$I_{inrms} = 1$$

$$P_{inapp} := I_{inrms} \cdot V_{inrms} \text{ float}, 5 \rightarrow 0.70710$$

This represents the apparent power input.

$$V_{outavg} := \frac{2}{\pi} \cdot 1 \text{ float}, 4 \rightarrow .6366$$

With normalized values, this also represents the average power out.

$$P_{outavg} = V_{outavg} \cdot 1$$

$$PF_{buck} := \frac{P_{outavg}}{P_{inapp}} \text{ float}, 4 \rightarrow .9003$$

This value is approximately the same despite changes in load current or output voltage. Unlike the SCR, which must change its conduction angle to accommodate different load voltages and then suffers a very poor power factor. Note that in both cases the power factor is slightly better with three phase sources. It is easier to analyze using the single-phase case.

System Considerations

In the environments where the charger is used, simplicity of operation and maintenance are very important. The fast charger for high capacity batteries is compact, and is advantageously constructed in modules and is provided with visual indicators that display the progress of the charging operation.

Figure 20:
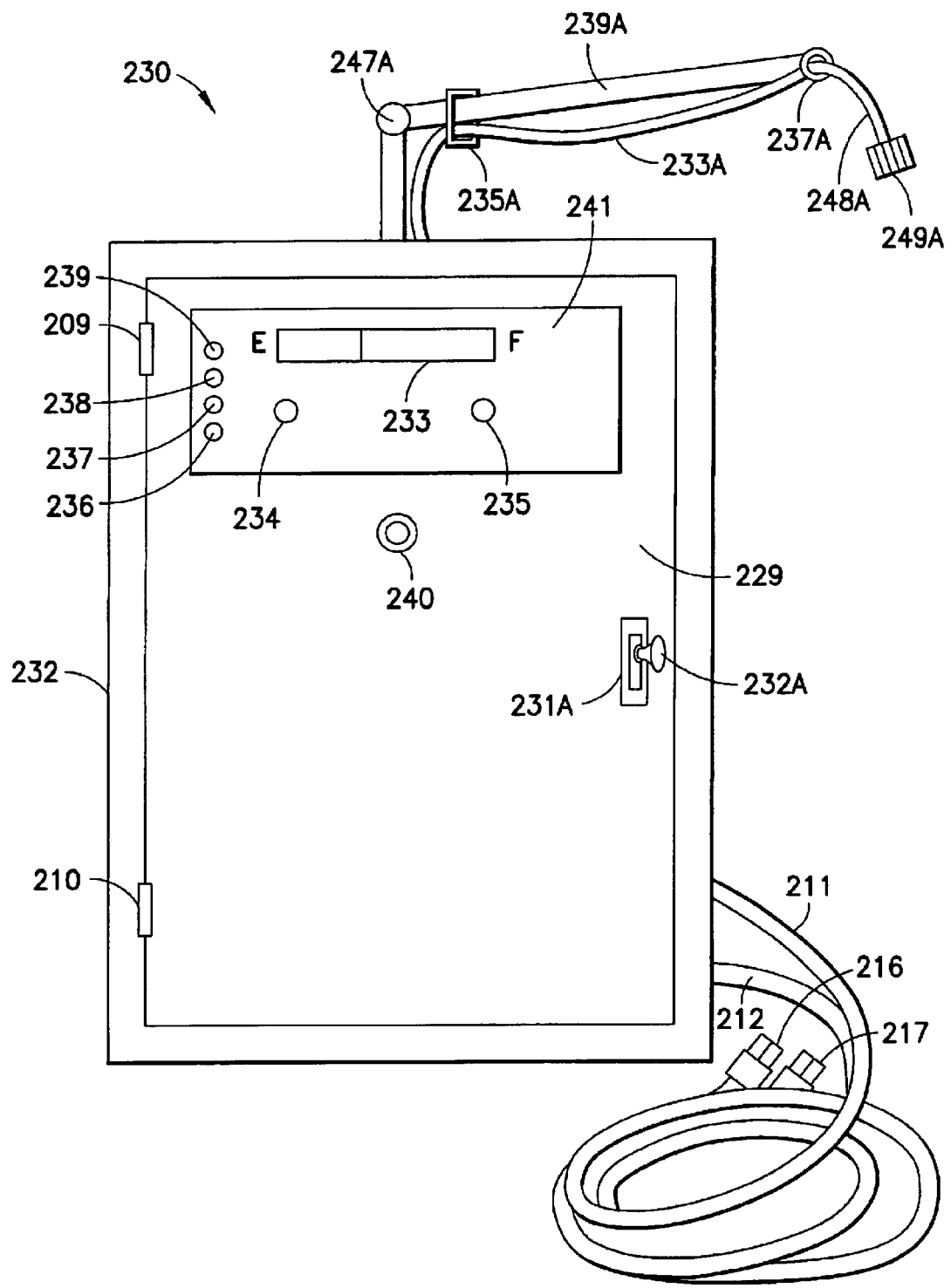
FIG. 20 is an exterior front-view schematic drawing of the fast charger showing interior control, fuse, and power modules.

FIG. 20 is a front-view schematic drawing of a fast charger 230 according to one embodiment of the invention comprising a unitary housing 232 having a door 229 mounted on hinges 209 and 210 thereon, and openable thereby to access the interior componentry in the housing. In the view shown, the cabinet door 229 is closed. As a safety feature, the door 229 can only be opened by unlocking with key 231A and engaging an interior electrical disconnect switch by means of the handle 232A. The control module 241 is mounted in the door. Display 233 receives input from the output current and voltage sensors by means of the DSP (interior, not shown) and displays battery SOC graphically, as well as any needed error messages. Operation is controlled by "start" and "stop" switches 234 and 235, and the indicator lights 236 ("COMPLETE"), 237 ("FIN/EQ"), 238 ("CHARGE"), and 239 ("OFF") provide quick information to the operator. If any emergency situation occurs, the operator can disconnect power to the control panel by hitting the emergency cut-off switch 240.

The control module in such embodiment is advantageously disposed in an interior metal box, since switching high power at high frequencies generates electromagnetic interference (EMI), as the IGBT does within the fast charger. The digital signal processor (DSP) of the charger needs to be protected from excessive EMI, and for such purpose can be protected in an interior metal box. The display electronics also need shielding from EMI, and the control panel module accommodates that function as well, by disposing the control module in an interior metal box. This approach also enables an elegant structure that additionally facilitates simple maintenance of the control module.

At the lower right-hand sidewall of the fast charger 230, extending exteriorly from the housing 232, are two pairs of cables 211 and 212, terminating in battery terminal couplings 216 and 217, respectively. The positioning of the cable pairs 211 and 212 permits the cables to be readily attached to the terminals of the battery being charged, at an elevation that is consistent with the position of the battery during the charging operation, i.e., near the floor.

As a further specific modification as regards the cables associated with the charging unit, the cable may be mounted on the cabinet in a retractable form, being maintained in close proximity to the housing 232 while not in use, and with a free end 248A terminating at a battery coupling 249A, as shown in the drawing. The cable is supported along its main length 233A by support brackets 235A and 237A on motive arm 239A including a pivot joint 247A, so that the free end may be selectively grasped and pulled away from the housing for use in connection with a battery to be charged. The motive arm 239A may be spring-loaded, provided with a tensioning reel (e.g., of a type commercially available from Reelcraft Industries, Inc. 2842 E, Business 30 Columbia City, Ind. 46725 USA), or otherwise provided with biasing means to maintain it in close position to the charger housing when not in use. Subsequent to battery charging, the cable may be uncoupled from the battery, and allowed to retract or otherwise be repositioned in close proximity to the housing 232, in the manner of gasoline dispensing hoses that are retractably maintained in proximity to a gas pump housing when not in use. Although such retractable hose feature is commonly used in the retail gasoline industry, it has not been previously appreciated or implemented for cables of battery chargers, and such retractable cabling arrangement therefore embodies an additional feature that may be employed in the fabrication of battery chargers according to the present invention.

The retractable cable can be arranged on a stand that mounts the charger up off the ground, where the forks of a fork-lift cannot impale it, and where it will not encounter flood conditions. Mounting the cable overhead by such arrangement has additional ergonomic advantage.

In another embodiment, two tensioning reels could be mounted to an inverted "L" bracket affixed to the side of the charger and the cable mid-sections would be attached to the tensioning reels, to allow a simple retractable cable fixture.

The retractable cable system should be effective to efficiently retract the heavy cable without "snap-back" since uncontrolled fast movement of the cable may cause damage and/or injury. A pulley with counterweight is a simple system that avoids allowing the cables to drag on the ground where a truck could run over them—standard rate chargers do not have or need any such retraction system. Instead, the user typically simply leaves the cable on top of the charger stand when the charging operation is completed.

In this respect, it is to be noted that retractable cabling has not been employed for battery chargers previously known in the art, which have utilized cables of much lesser weight and much smaller diameter than the cables employed in the fast chargers of the present invention. The cabling required in the fast chargers of the present invention includes heavy and large diameter cables, in consequence of the high current, high rate charging effected by the charger of the invention. Retraction of such large and bulky cables in the practice of the present invention thus removes an obstacle on the work floor relative to other arrangements in which cables reside on a floor area, where they can restrict access and movement, and reduce the floor area available for normal operations.

Figure 21:
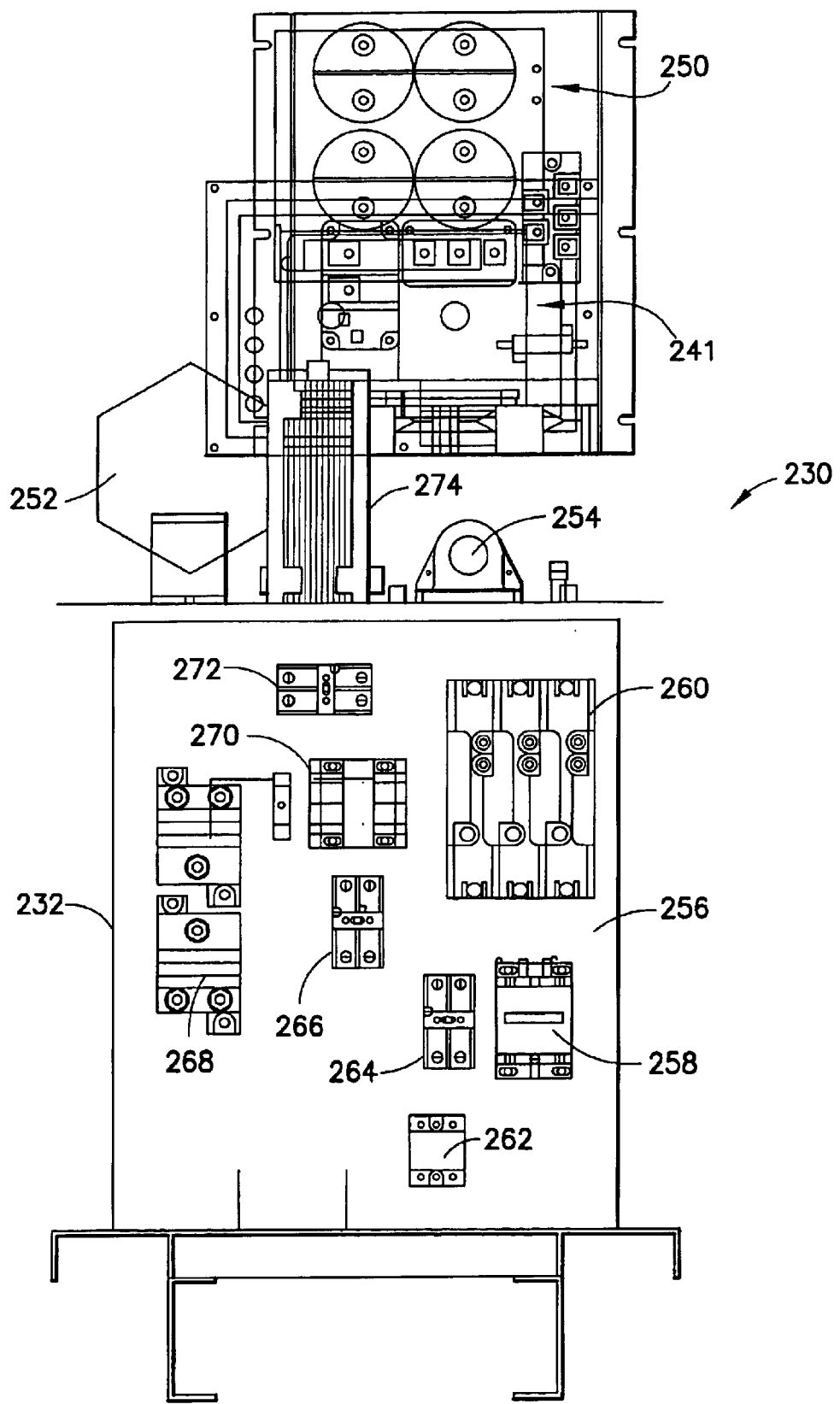
FIG. 21 is an interior front-view schematic drawing of the fast charger of FIG. 20.

FIG. 21 is an interior front-view schematic drawing of the fast charger of FIG. 20 with the cabinet door open to show control, fuse, and power modules.

The charger 230 includes within housing 232 a power module 250 and control panel 241, as well as output inductor 252, cable pass-through 254 for a Hall effect current sensor, and fuse panel 256. The unit also includes an output capacitor 274. The fuse panel 256 has mounted thereon 3-phase contactor 258, 3-phase input fuses 260, control panel interface (solid state relay) 262, fuses 264 for contactor coil, fuses 266 for the control transformer, output fuses 268 to the battery, step-down control transformer 270, which supplies power to the control panel, and heat sink cooling fan fuses 272. Power to the controller and solid-state contactor relay are disconnected by the emergency switch, which will turn off the unit.

It is a significant feature that when the door of the charger is open, the input power is disconnected by uncoupling of a power connection coupling cable extending from the door of the charger housing to the rear part thereof. In this manner, the power to the charger is definitively "off" when the door is open, and the charger can only be powered when the door is shut. This is a fail-safe feature of the charger in a preferred embodiment, to ensure safety of operating and maintenance personnel who are exposed to the interior componentry in the use or maintenance of the charger.

Figure 22:
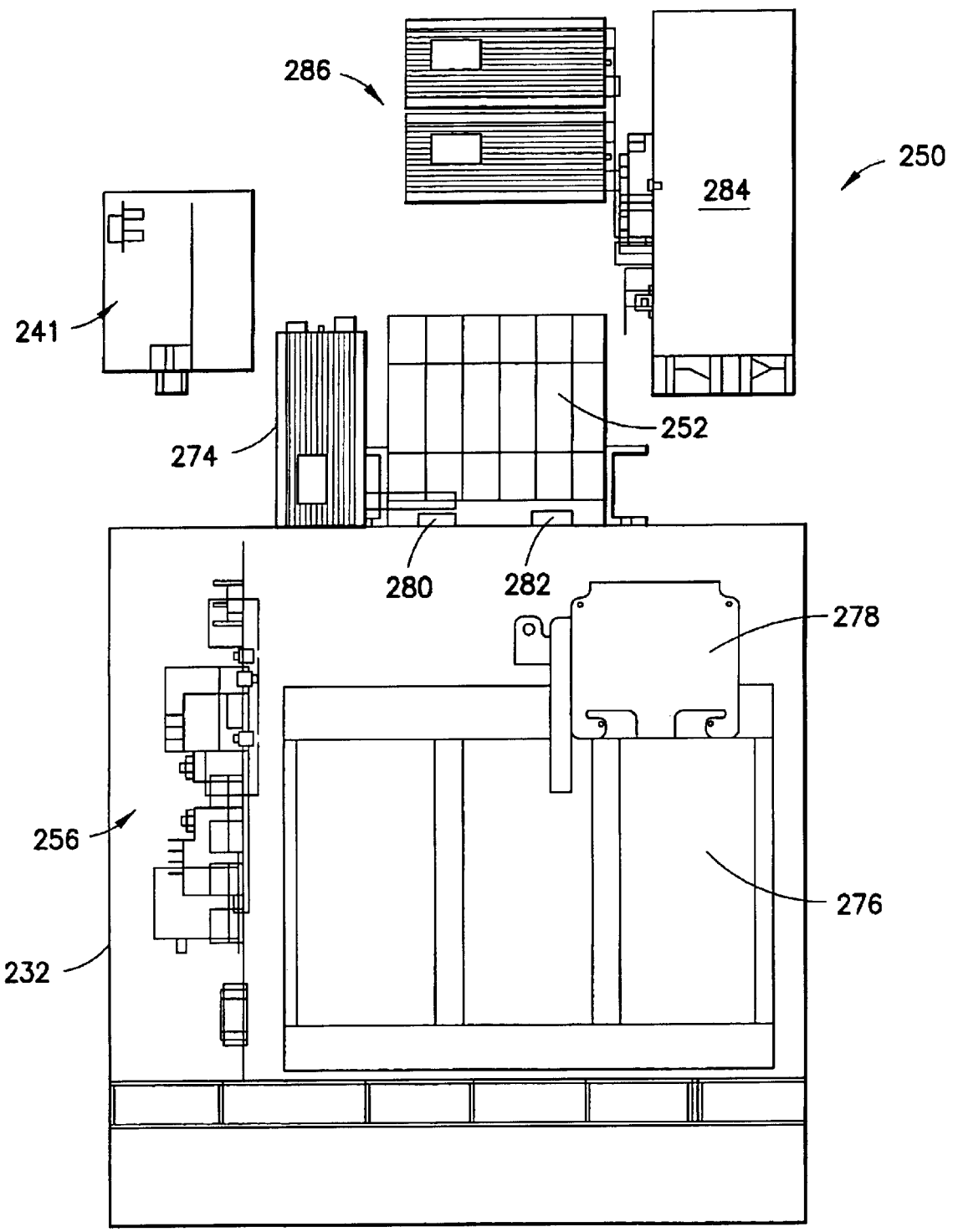
FIG. 22 is an interior side-view schematic drawing of the fast charger of FIGS. 20–21.

FIG. 22 is an interior side-view schematic drawing of the fast charger of FIGS. 20–21, wherein all corresponding parts and features are correspondingly numbered for ease of reference. The housing 232 contains therein the fuse panel 256. Rearwardly of the fuse panel 256 is arranged a transformer 276 which is coupled with the 3-phase contactor and the power panel 250. The control panel 241 is located vertically above the fuse panel 256.

The charger shown in FIG. 22 also includes with the housing the heat sink 284, capacitors 286, output capacitor 274, output inductor ("choke") 252, coupled with capacitor 274 to form an output LC filter, and disconnect switch 278 (which has a mechanical linkage to the handle on the front skin. The power panel 250 includes the IGBT, the flywheel, the bus structure and a rectifier, as components previously described herein.

The charger further comprises output voltage sensor 280 and input voltage sensor 282, as part of a feedback arrangement for modulating the power that is received from the dedicated line source, e.g., a three-phase power service.

Figure 23:
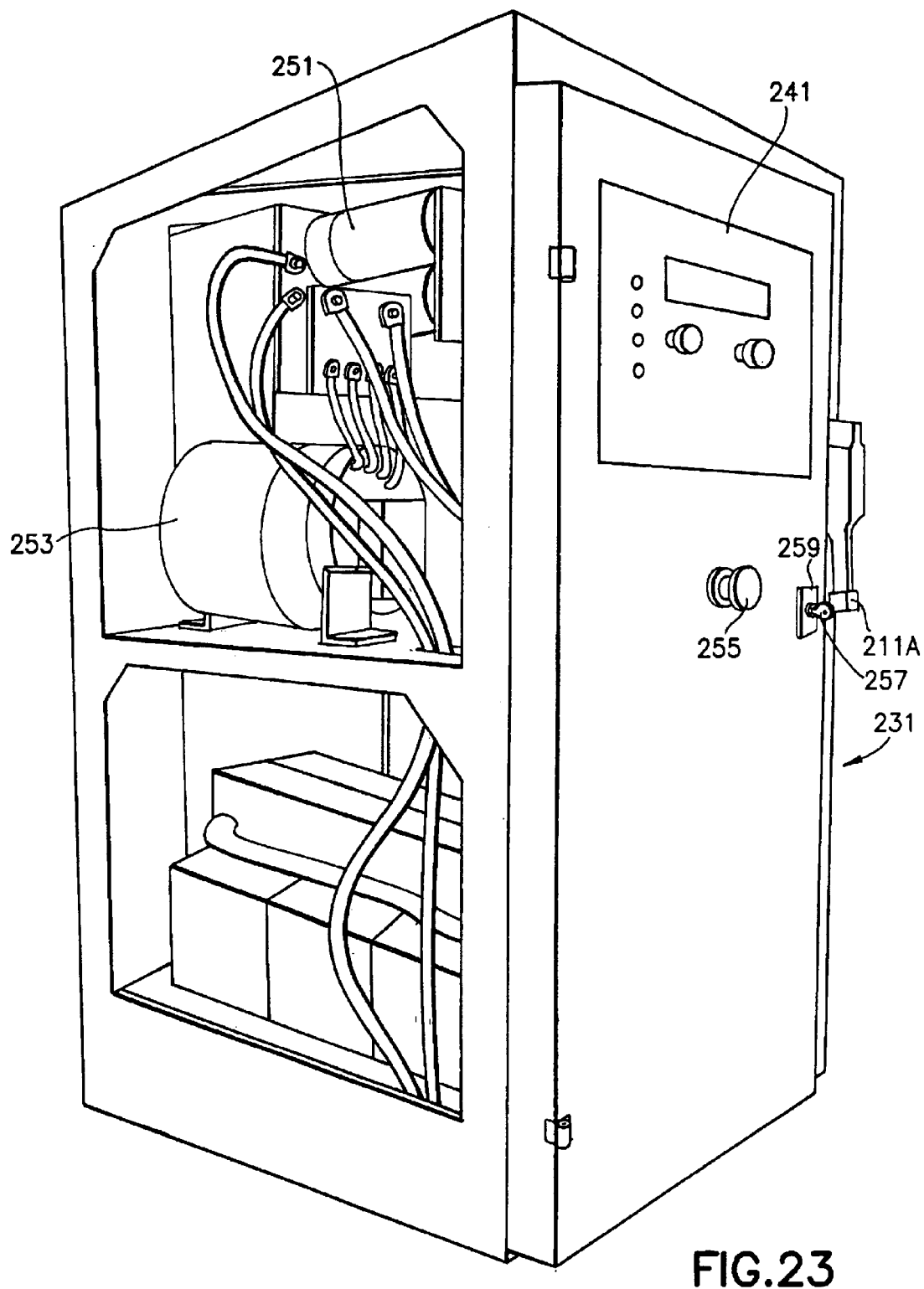
FIG. 23 is a partial side perspective view of a fast charger of the invention for charging a single high capacity battery, showing the interior power module.

FIG. 23 is a partial side view three-dimensional schematic drawing of a fast charger 231 of the invention for charging a single high capacity battery, showing the interior power module. The charger unit includes display 241, power uncoupling switch 255, handle 211A, lock 259 and key 257, at the front face of the housing, and in the view shown, wherein the left-hand side panel has been removed, the output inductor 253 and the power module capacitors 251.

Figure 24:
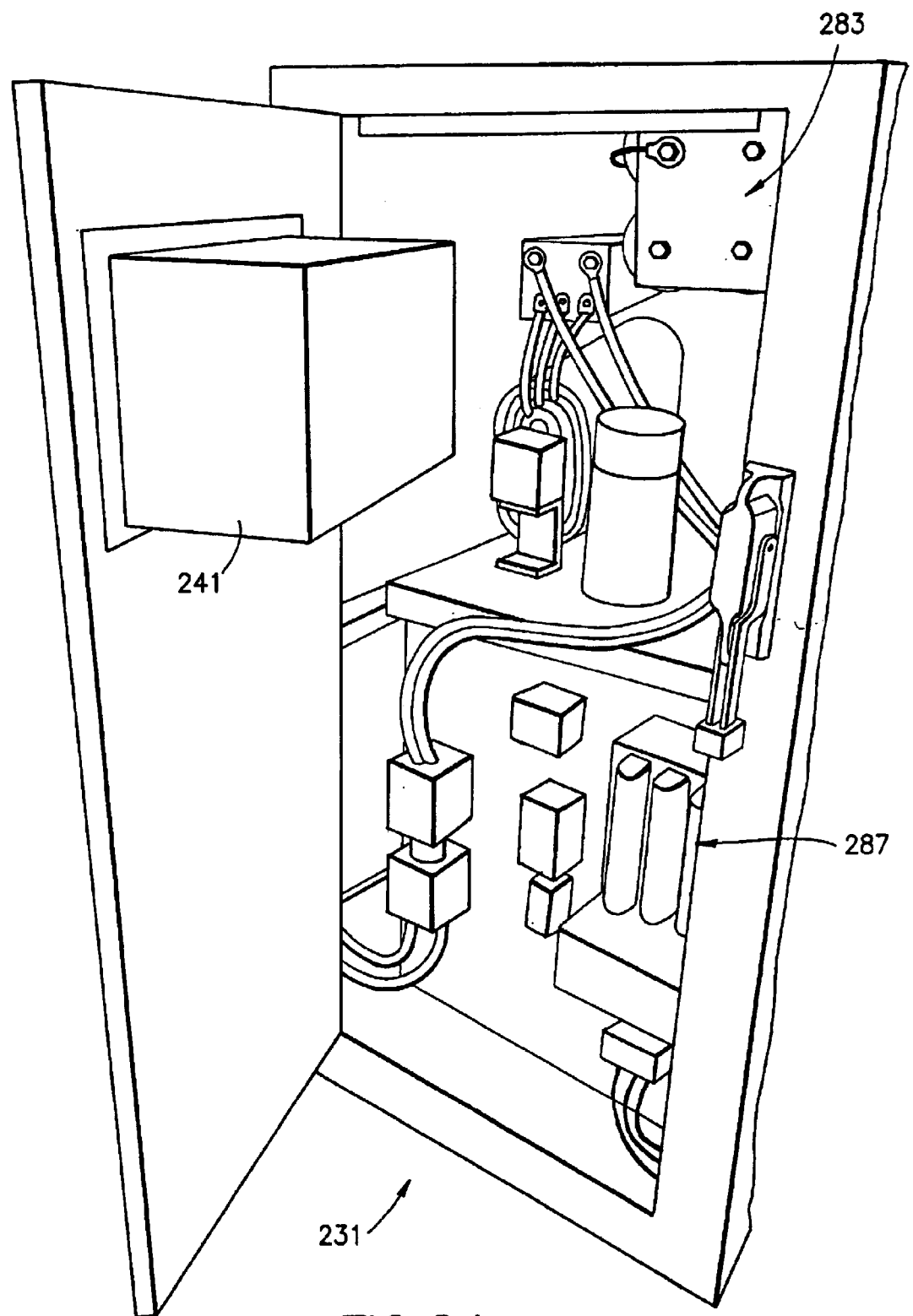
FIG. 24 is a front perspective view of the fast charger of FIG. 23 showing interior control, fuse, and power modules.

FIG. 24 is a front-view three-dimensional schematic drawing of the fast charger 231 of FIG. 23 showing interior control 241, fuse 287, and power 283 module.

Figure 25:
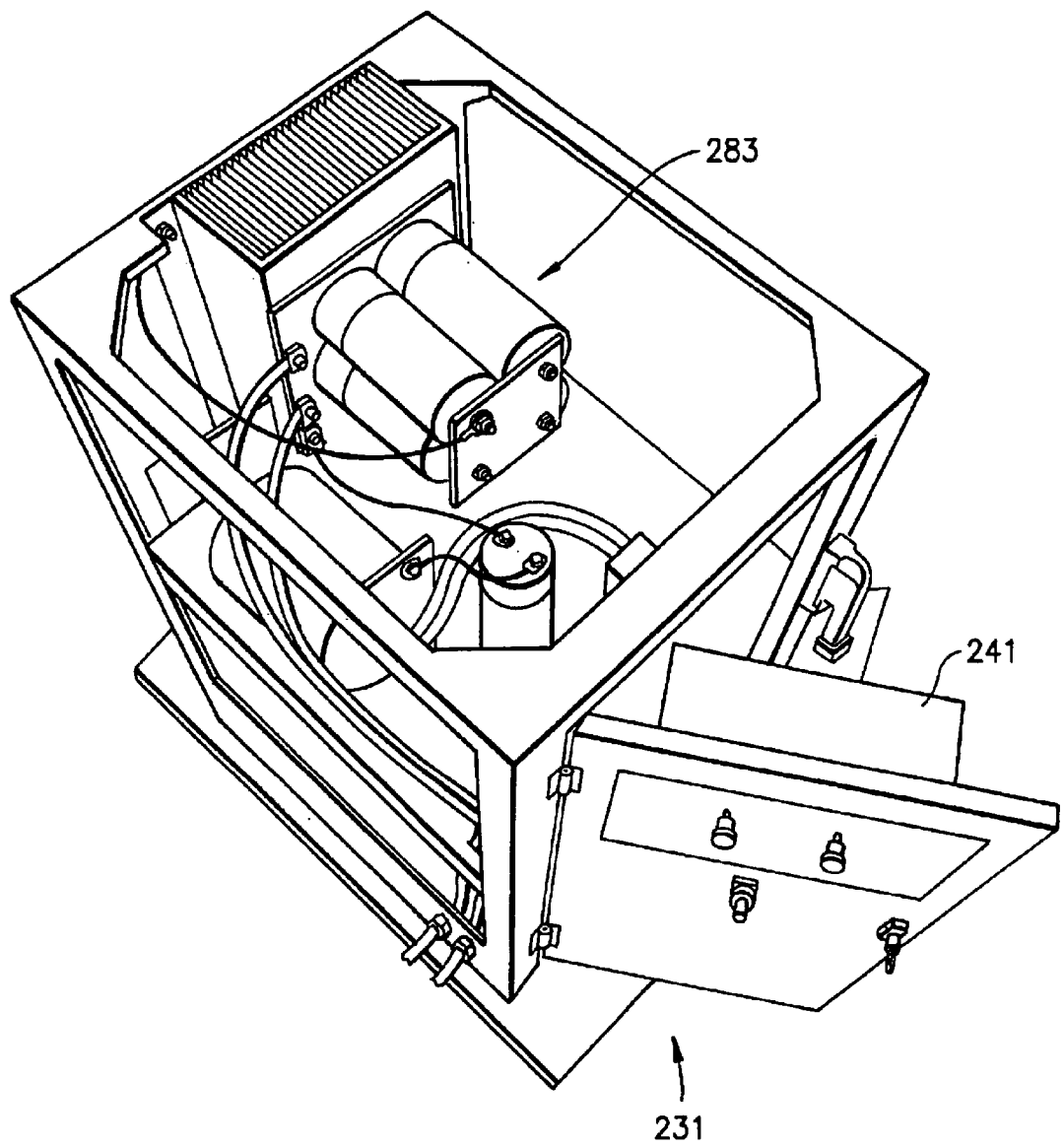
FIG. 25 is a top perspective view of the fast charger of FIG. 23 showing the interior power and control modules.

FIG. 25 is a top-view three-dimensional schematic drawing of the fast charger 231 of FIG. 23 showing the interior power 283 and control 241 modules.

Figure 26:
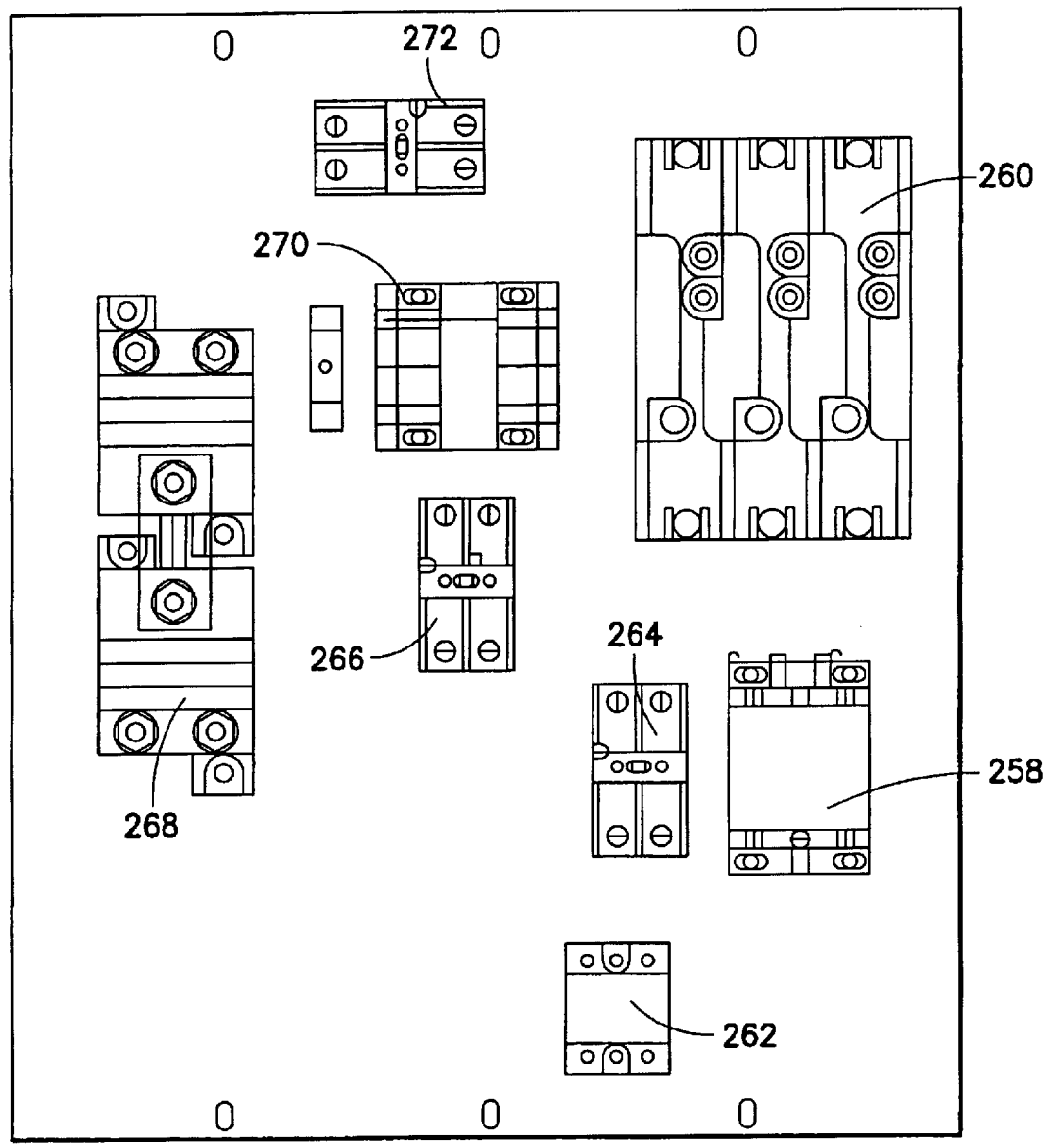
FIG. 26 is a schematic drawing of the fuse module of the fast charger of FIG. 23.

FIG. 26 is a schematic drawing of the fuse module of the fast charger 231 of FIG. 23, wherein all fuse assemblies are numbered correspondingly to the same elements shown in FIG. 21.

Figure 27:
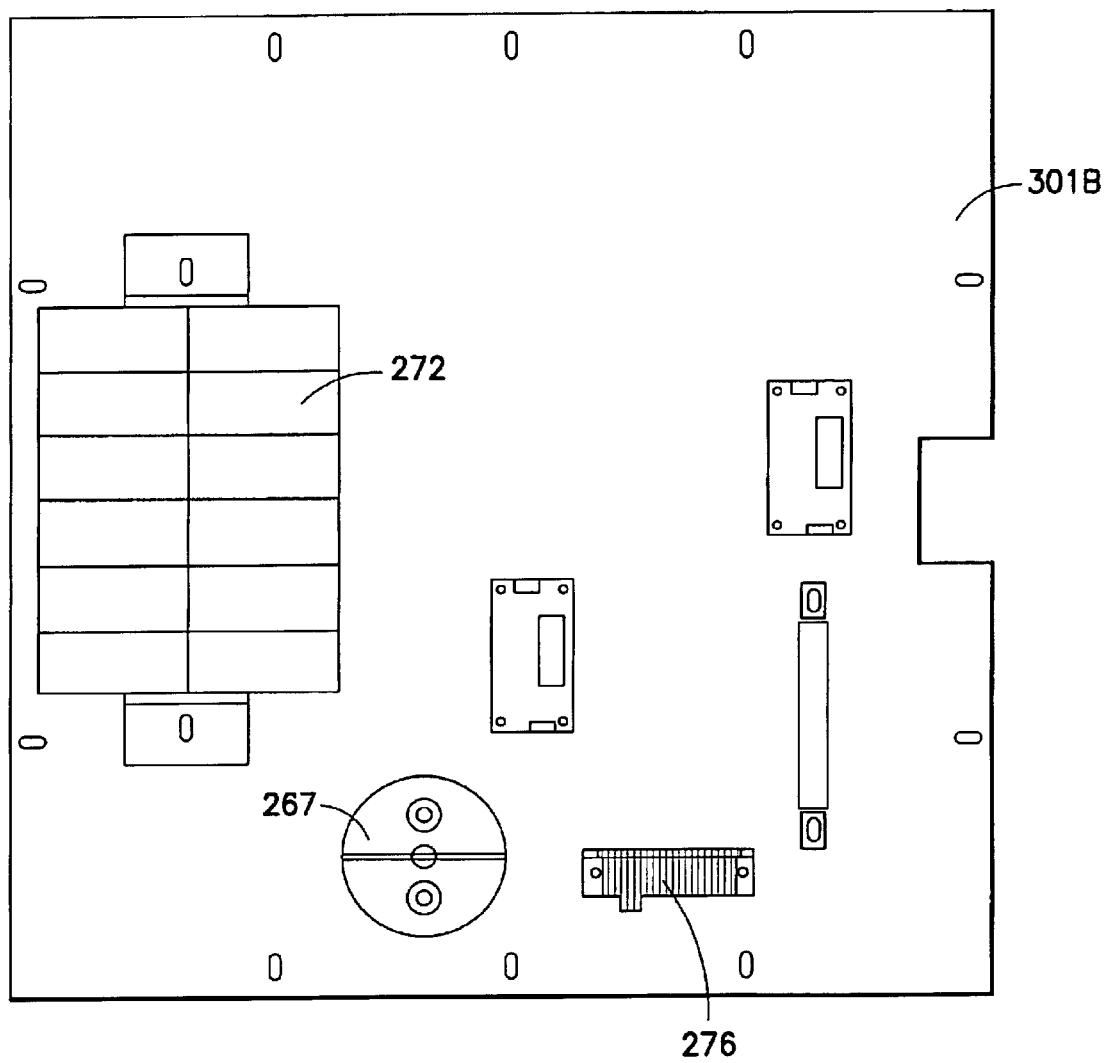
FIG. 27 is a schematic drawing of the midplane panel of the fast charger of FIG. 23.

FIG. 27 is a schematic drawing of the midplane panel 301B of the fast charger 231 of FIG. 23, including Hall effect sensor 276, inductor 272 and capacitor 267.

Figure 28:
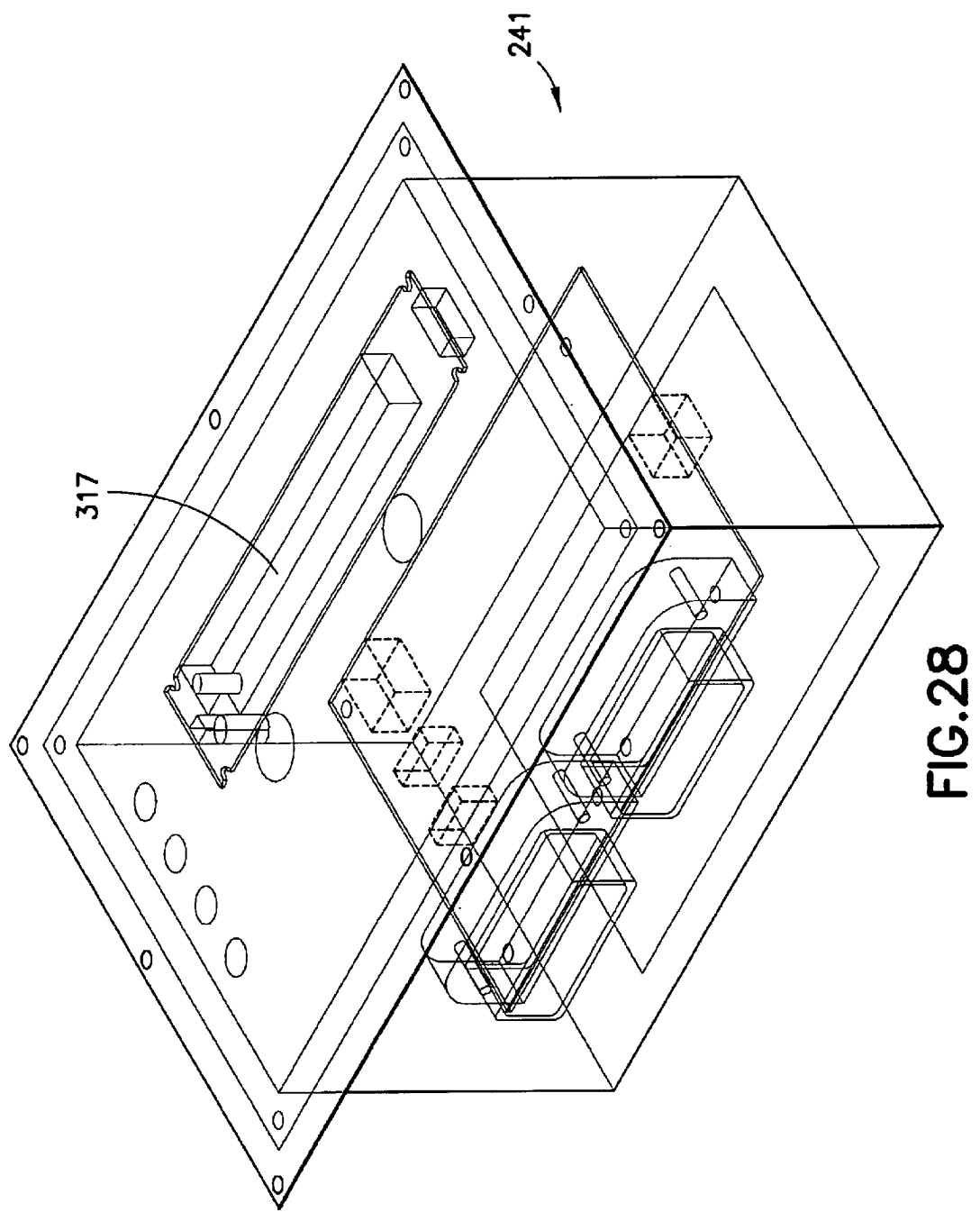
FIG. 28 is a three-dimensional schematic drawing of the control panel of the fast charger of FIG. 23.

FIG. 28 is a three dimensional schematic drawing of the control panel 241 of the fast charger 231 of FIG. 23, showing the elongate display 317 (see also FIG. 20).

Figure 29:
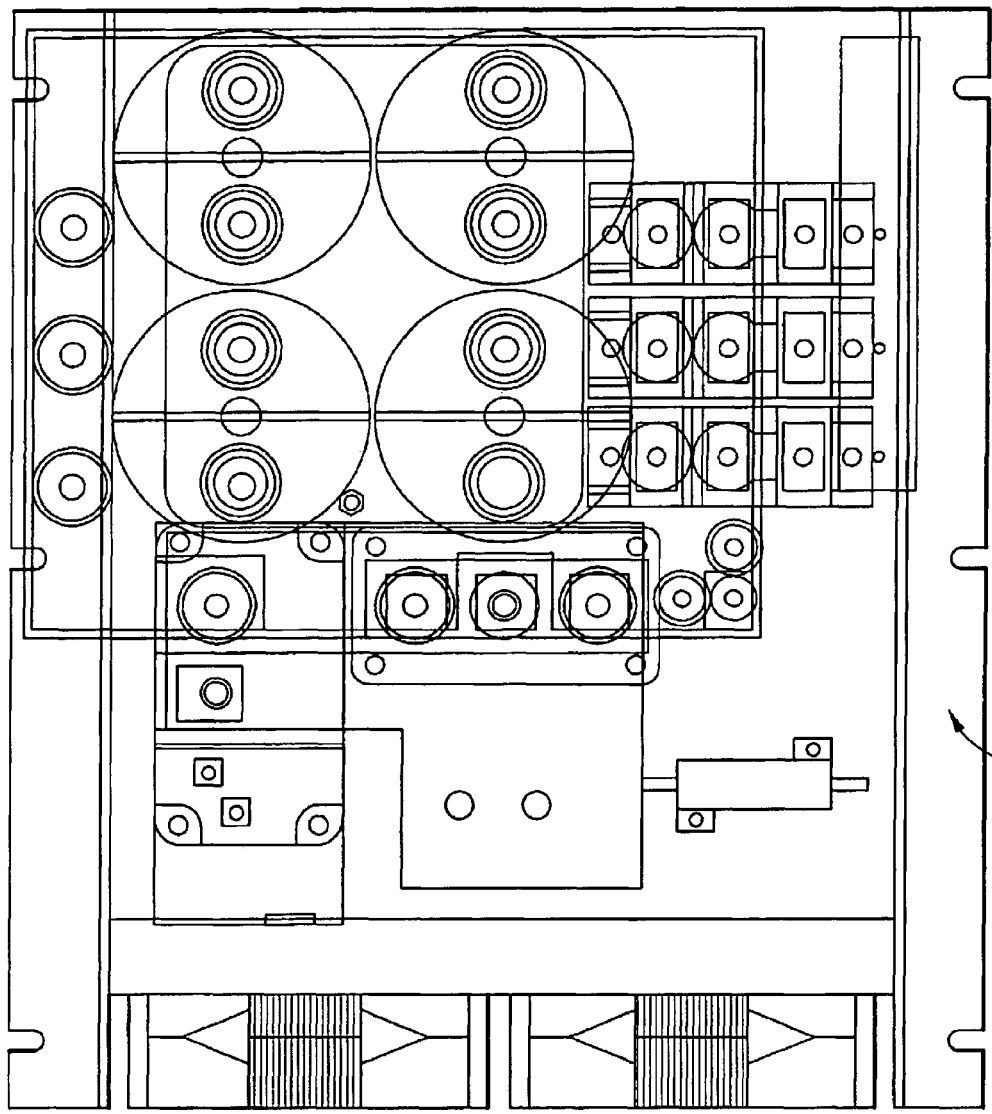
FIG. 29 is a top view schematic drawing of the power panel of the fast charger of FIG. 23.
Figure 30A:
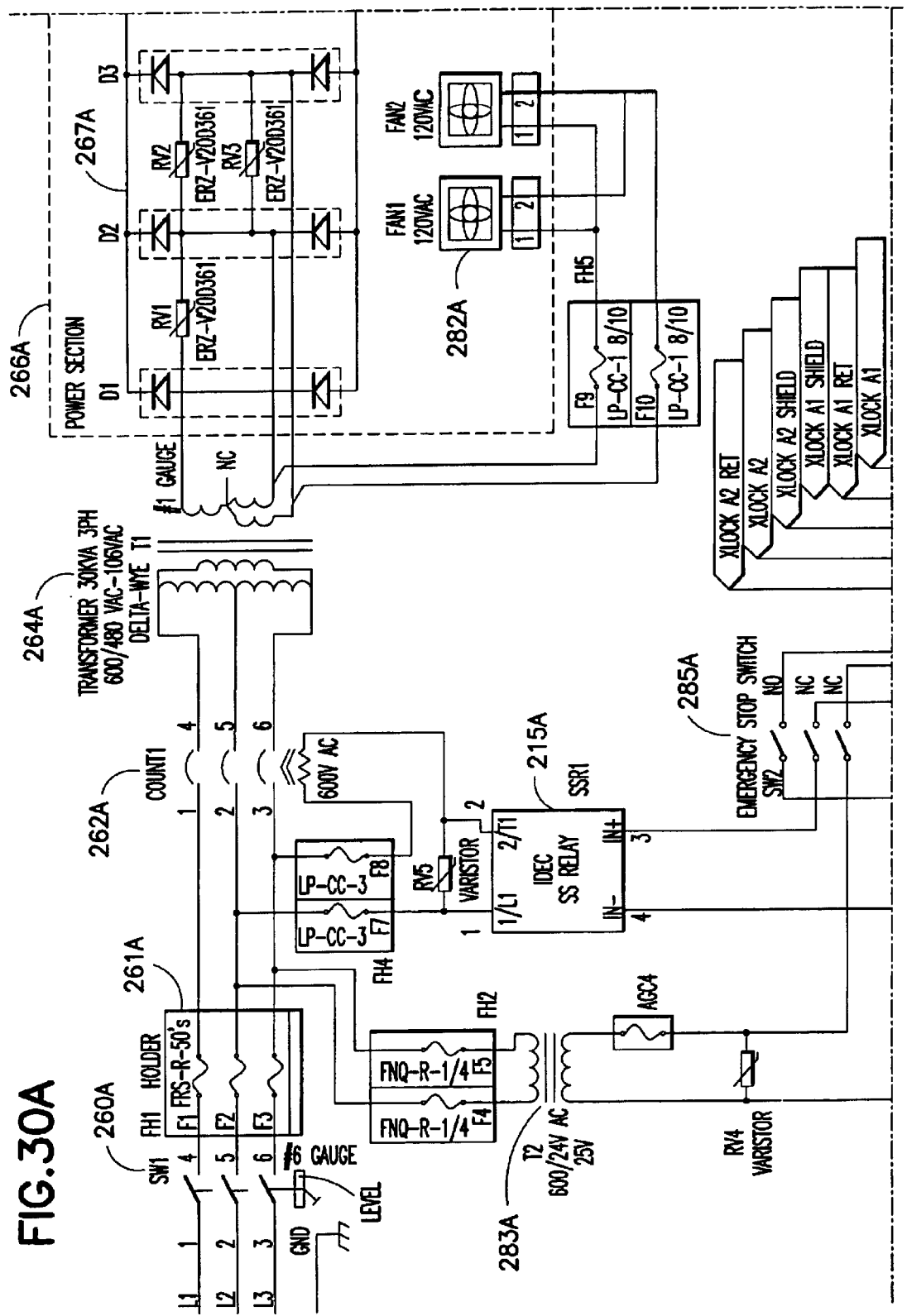
FIG. 30 (A–E) is a block diagram of a fast charger of the invention for charging a single high capacity battery, as described in Example 1.
Figure 30B:
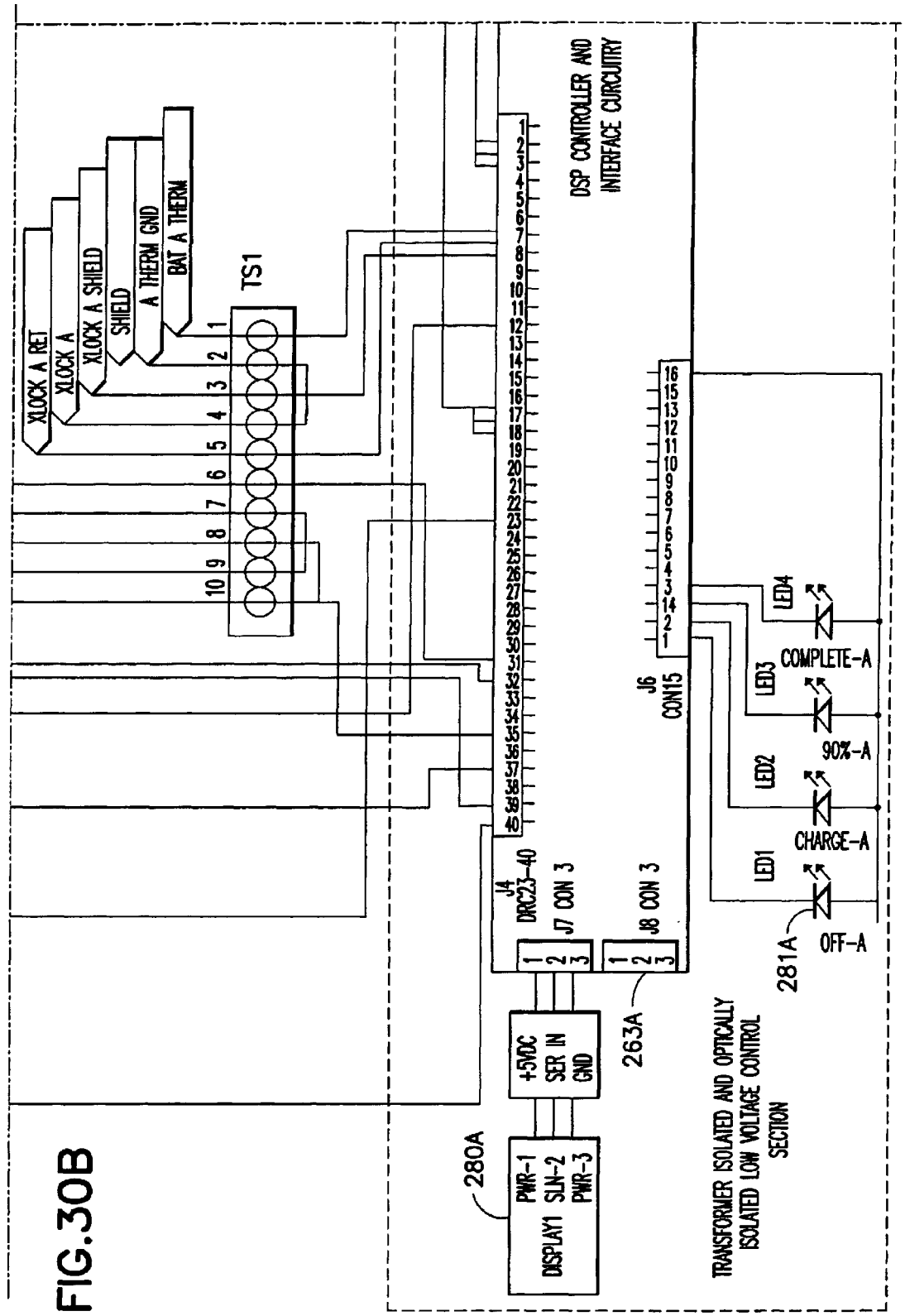
Figure 30C:
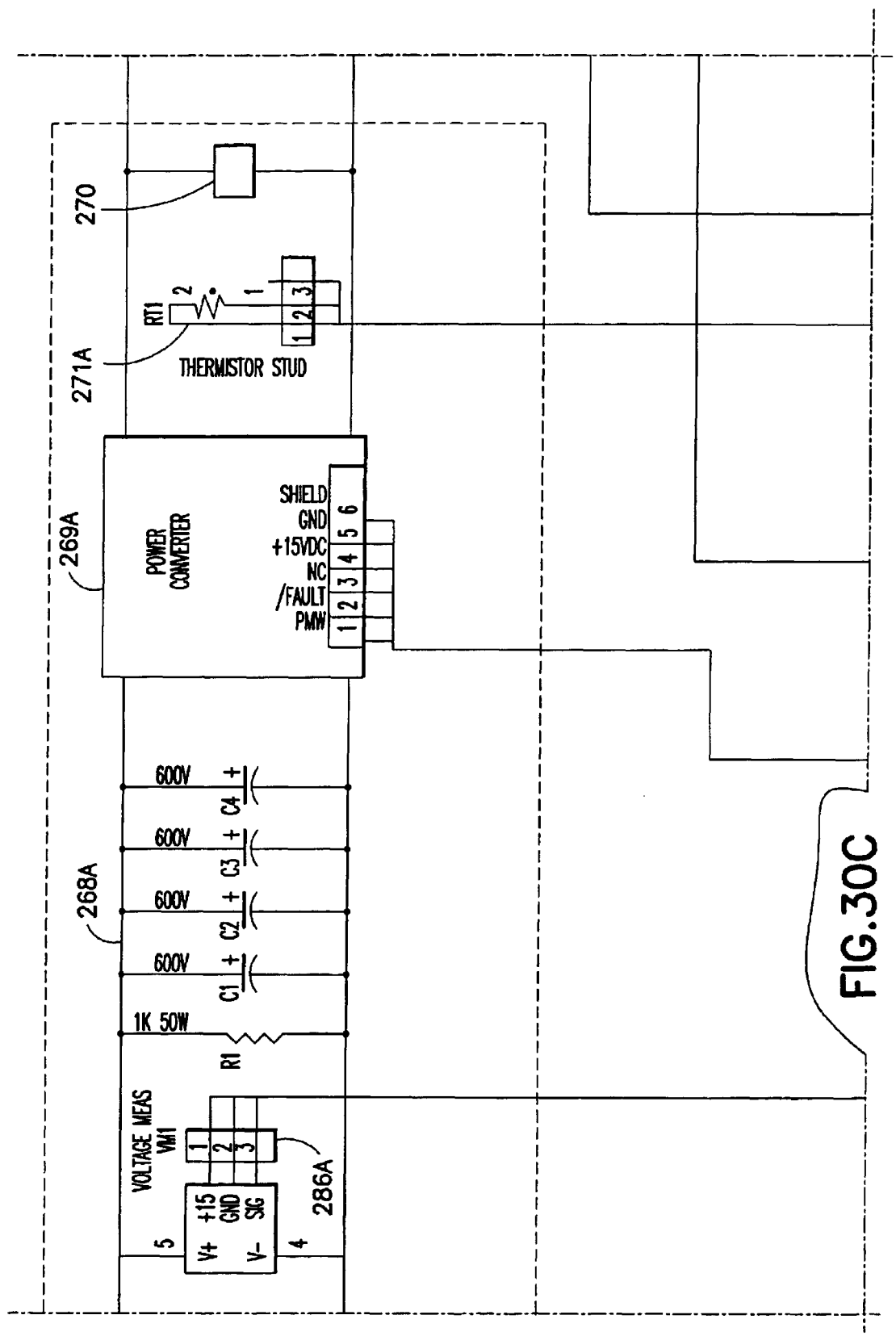
Figure 30E:
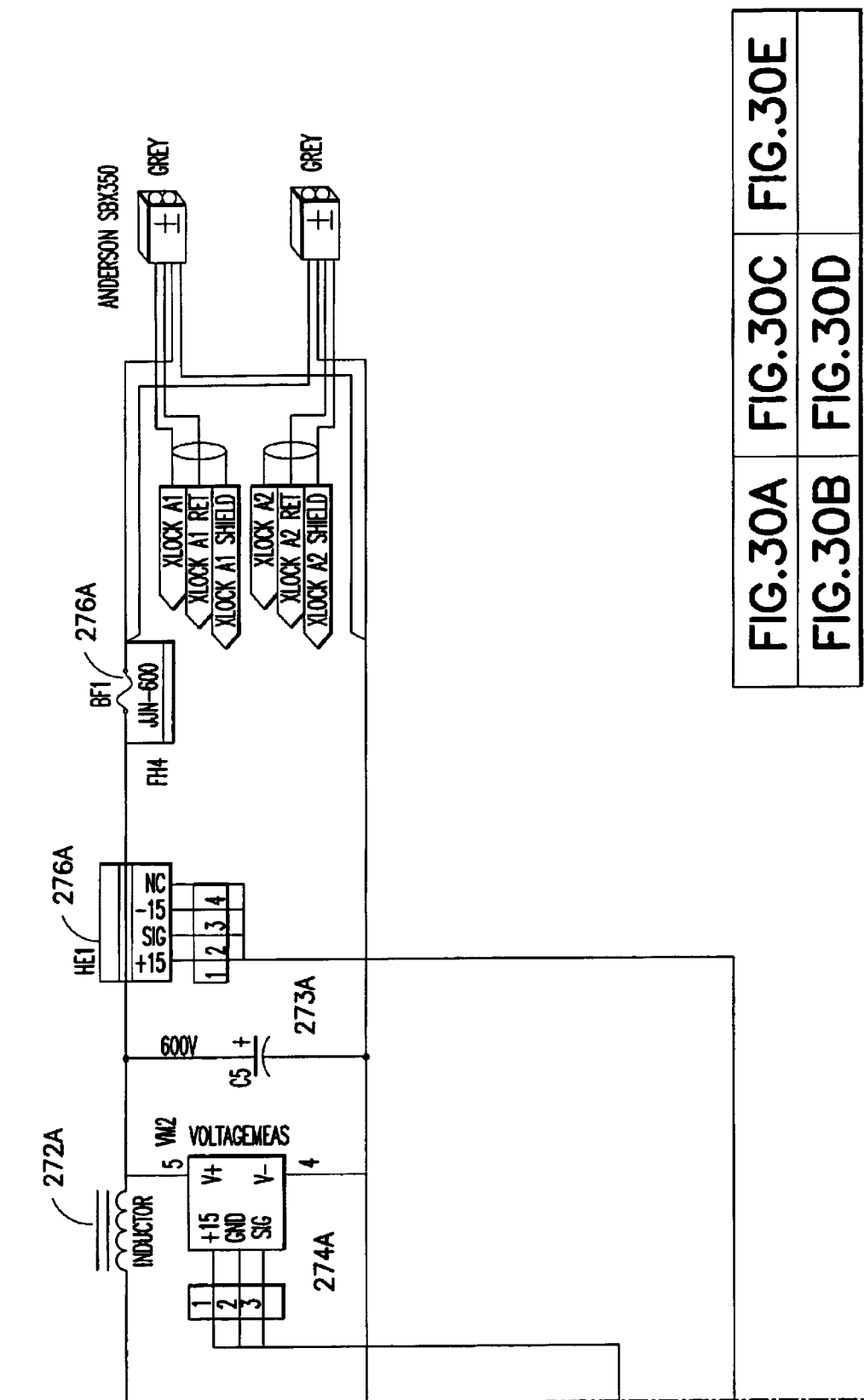
Figure 31A:
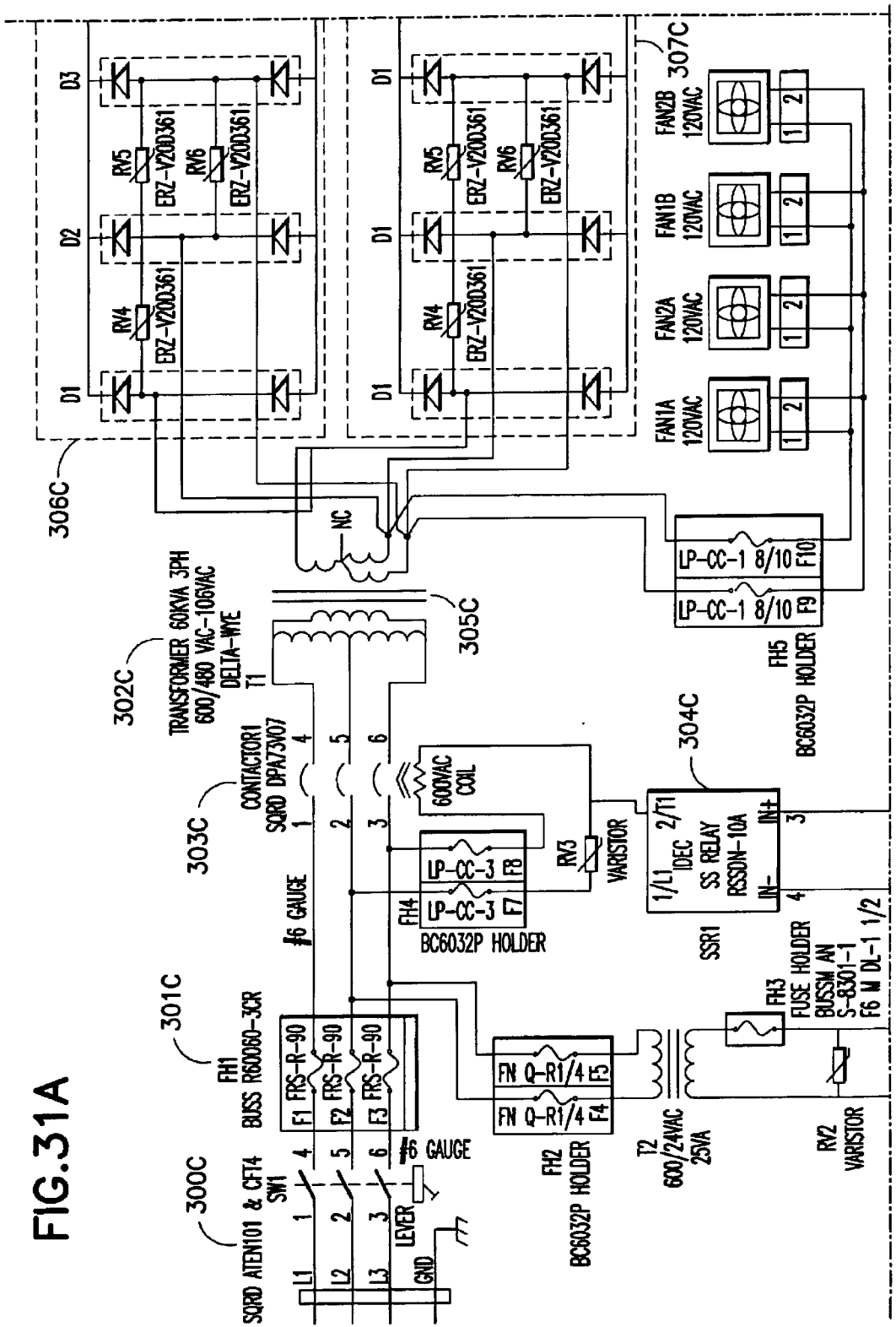
FIG. 31 (A–E) is a block diagram of a fast charger of the invention for charging two high capacity batteries in tandem, as described in Example 2.
Figure 31B:
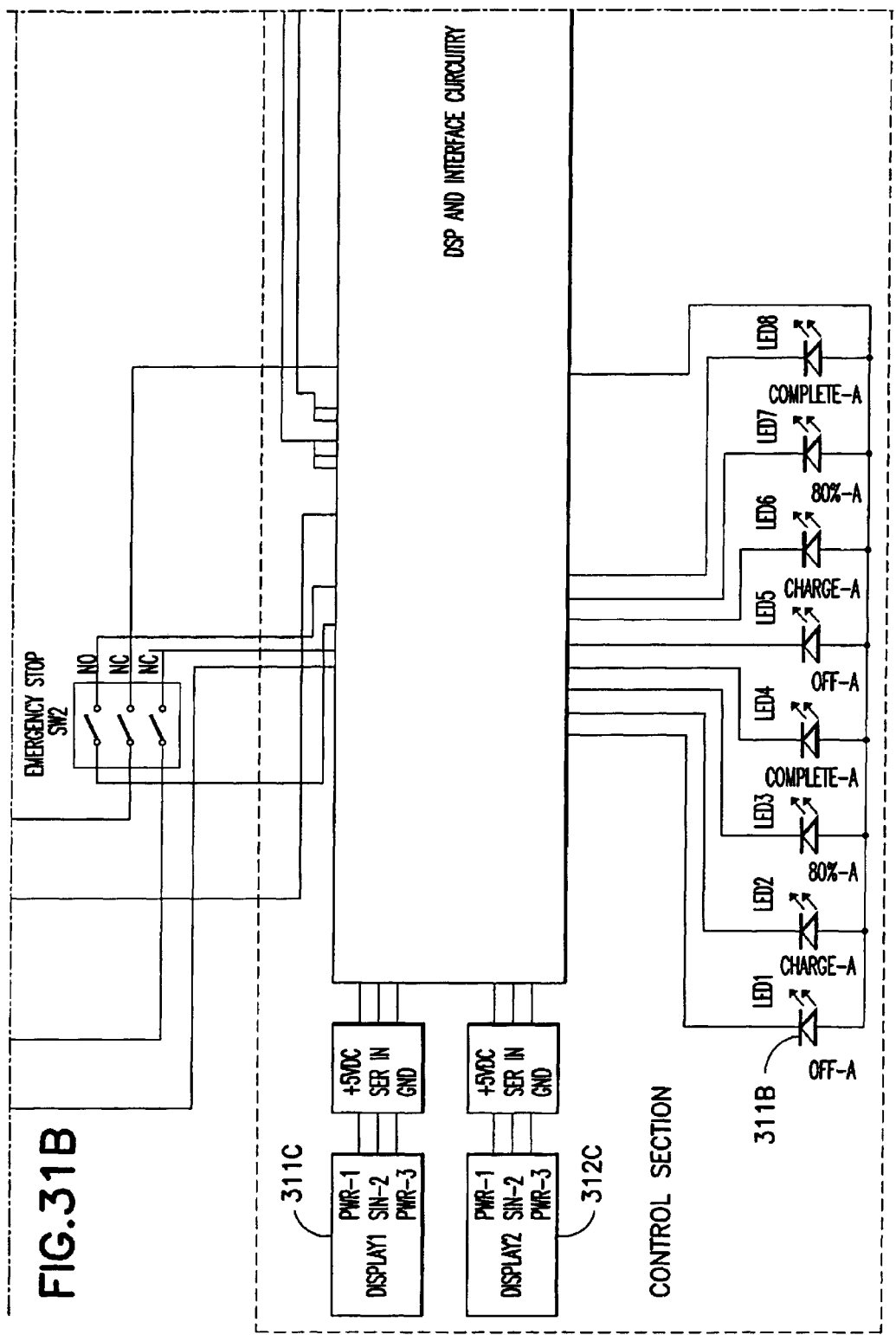
Figure 31C:
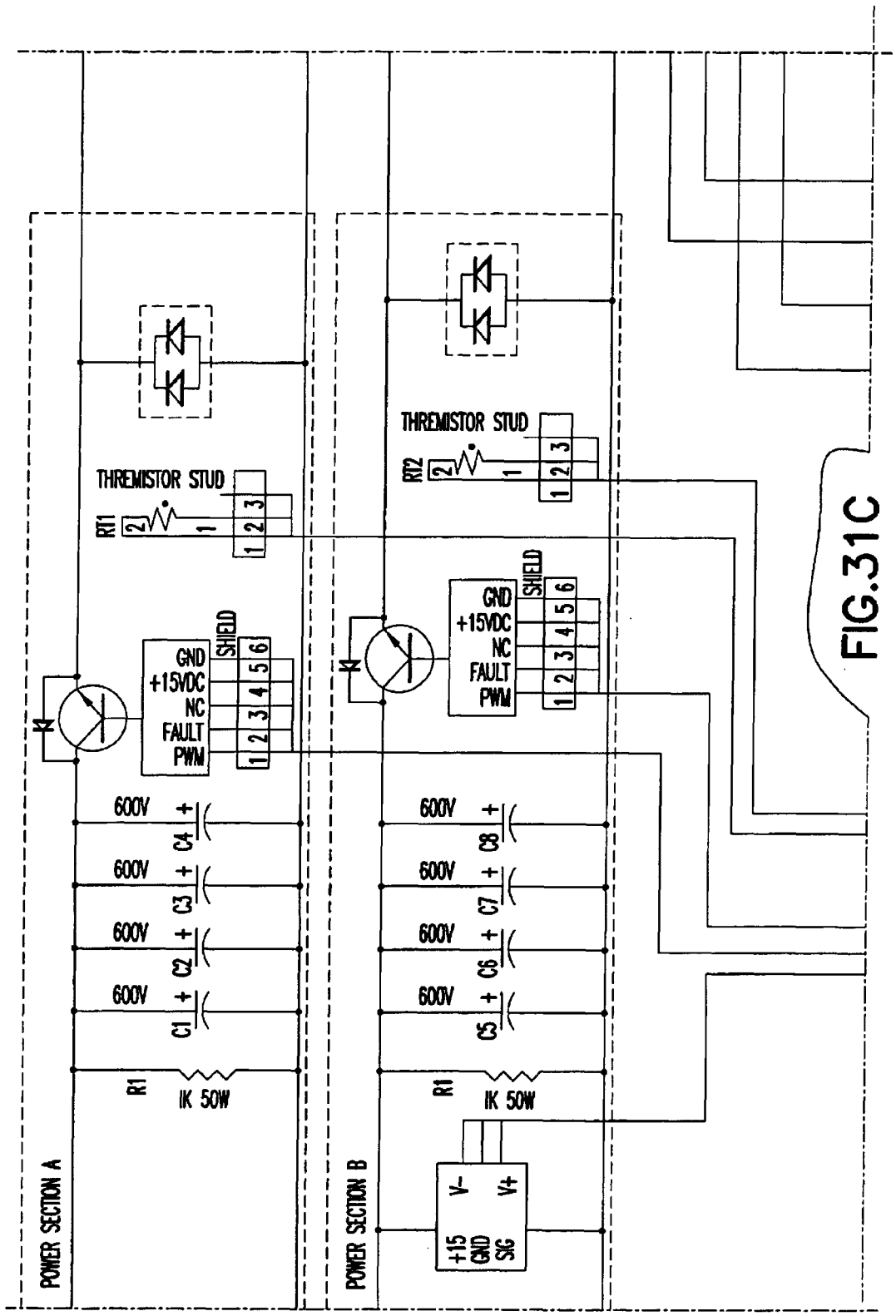
Figure 31D:
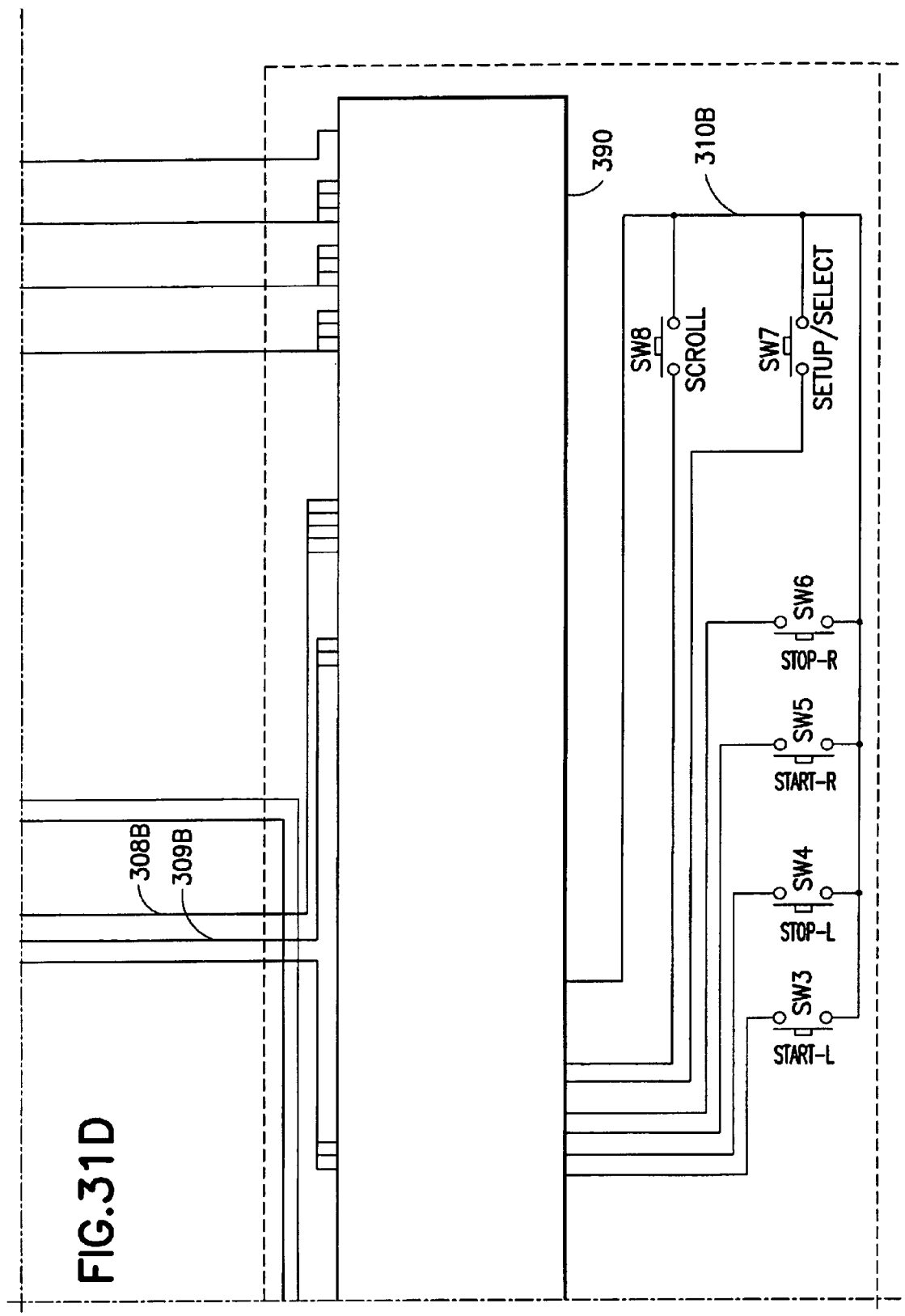
Figure 31E:
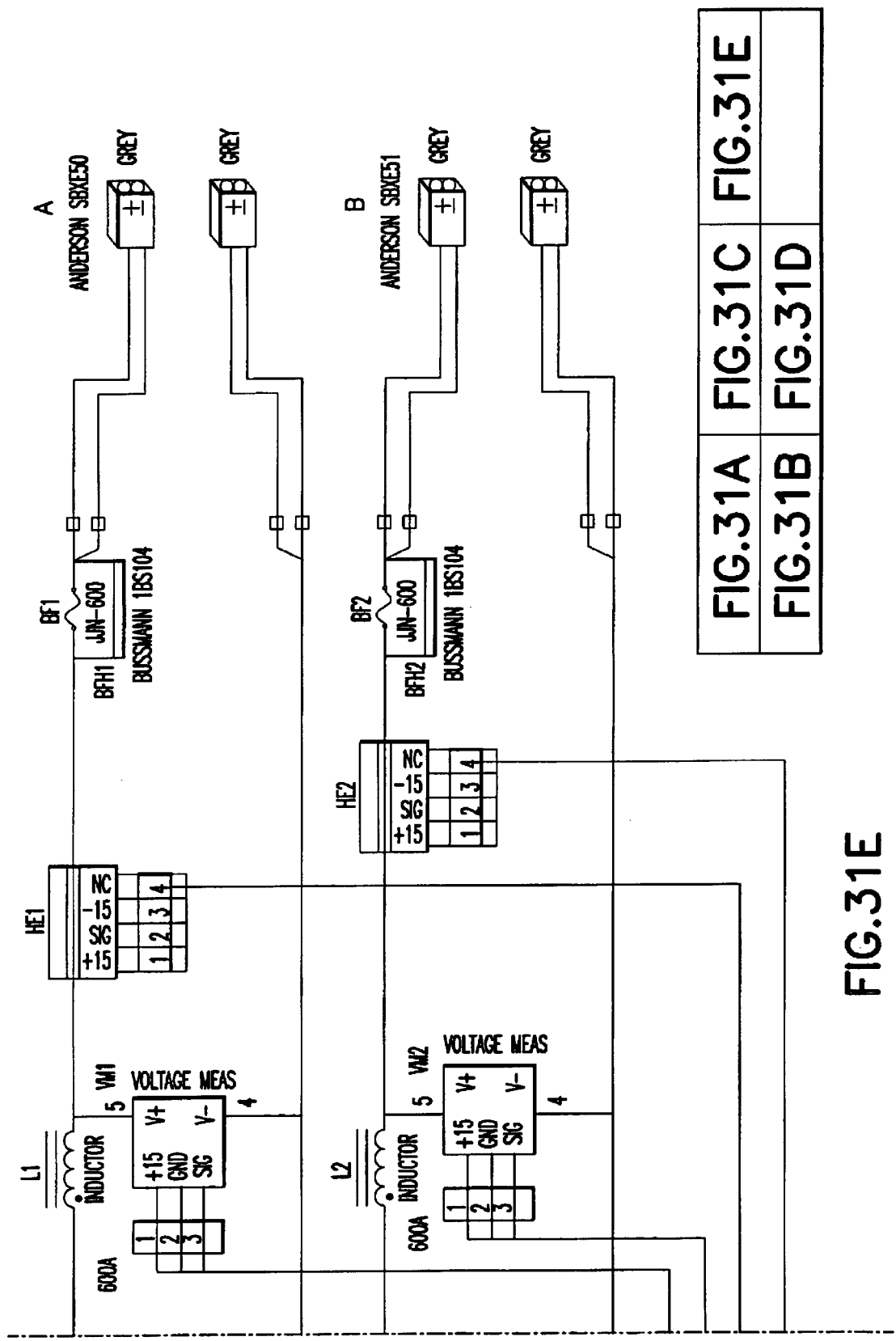

FIG. 29 is a top view schematic drawing of the power module 283 of the fast charger 231 of FIG. 23.

Modifying the Fast Charger Parameters

The digital signal processor (DSP)-driven pulse width modulation (PWM) control method provides a versatile yet straightforward control of the charging properties, allowing a single fast charger to be adjusted to adapt for:

different battery voltages;
different battery capacities (Ampere-hours);
different maximal rates of charging (Amperes);
different charging algorithms;
allowable set times for finishing and equalizing the battery charging.

The fast charger is adapted to these different constraints by allowing a user to adjust parameters of the DSP, e.g., by reprogramming the DSP; selecting among pre-programmed and stored instruction sets; adjusting DSP registers; and so forth. The DSP implements instructions that are related to the charging rate by adjusting the pulse width of the first electronic switch.

One embodiment of the fast charger includes a simplified set of set-up switches for effecting some or all of these adaptations. The adjustments are facilitated by a menu system that uses the display to present (a) choices for variables to be adjusted that the operator can scroll through and select; and (b) values for those variables that the operator can adjust within preset safe ranges and select.

Access to the set-up switches may be restricted by any suitable means (key, swipe card, etc.) to limit the number of individuals who may make changes. For example, the set-up switches may be keyed and accessed through a panel on the cabinet.

An exemplary fast charger for high capacity lead acid storage batteries is provided with means for adjusting the fast charging process, which are described below to illustrate some of the adjustments that can be made; other schemes can be set up in similar ways.

The exemplary fast charger is provided with two set-up switches that can be accessed within the cabinet door by means of a key lock system. The set-up switches drive a menu of choices that appear on a display on the front of the cabinet door. For simplicity, the display is the same one that is used to display the charging gauge as described earlier, e.g., an ASCI-character-controlled display. An additional display or displays can be incorporated if desired. The first set-up switch is a scroll switch for scrolling through options available for selection; and the second switch is a select switch for selecting the desired option. The switches allow the operator to scroll through different menus, select options, and change values within preset ranges.

The exemplary fast charge set-up switches allow the user to navigate by scrolling through a starting main menu of seven choices: (1) battery parameter set-up; (2) finish and equalize battery charge; (3) set time and date; (4) delayed start; (5) thermistor interlock (yes/no); (6) calibration factor; and (7) exit.

(1) Battery Parameter Set-Up

After entering this menu, the user selects battery voltages that the fast charger is expected to encounter, and for each battery voltage selects battery capacity (Ampere-hours) and maximum rate of charge ("max amps out"), i.e., the maximal current that is allowed to be delivered to the battery during charging (chargers are set up with minimum Ampere-hours and minimum max amps out before they leave the factory). The battery capacity and maximal charge rate are functions of the battery construction and chemistry, e.g., additives, presence of mixing, etc., and can vary among battery manufacturers. The menu presents a selection of battery voltages from a pre-defined list that the user scroll among. In this example, a fast charger for high capacity flooded lead acid storage batteries, the preset battery voltages are 12, 24, 36, 48, 72, and 80 volts, representing arrays of 6, 12, 18, 24, 36, and 40 cells. For each battery voltage, the user may select the battery capacity in Ampere-hours by scrolling through a "change value" menu that loops within a range that was preselected by the charger manufacturer, e.g., 200 to 1500 Ampere-hours. Next, the user likewise selects the maximum allowable charging rate, by changing values within limits that are preset to represent a safe charging rate, again through a "change value" menu that loops within a preselected range, e.g., 100 Amperes to 500 Amperes. The maximal charging rate is related to battery voltage inputted earlier; a menu presenting a preset range for maximum amps out is accessed for each battery voltage. For lead acid storage batteries, 2.40 volts per cell at 86 degrees Fahrenheit is the "gassing voltage" below which the charger should be operated. Gassing voltage is dependent on battery chemistry and temperature.

(2) Finish and Equalize

The "finish and equalize" (fin/eq) menu allows the manager to set the time of day and the days when the battery charging process can be finished and equalized. Finishing is the process of charging from 90% to 100% SOC by applying a low current, e.g., about 3–5 Amperes per 100 Ahr capacity. Equalizing in our embodiment is the process of lightly over-charging the battery by applying a constant voltage, e.g., about 2.42 volts per cell, to even out the cell voltages and drive recombination of residual oxidized product. These steps are associated with some unavoidable out-gassing, and typically are not performed during an active shift, but rather during an off-shift or over a weekend or holiday. Equalization is typically recommended at least once per week.

(3) Time and Date Set

The manager sets time and date.

(4) Delayed Start

Allows time and date information to turn charger on and off automatically and enter the finish and equalize mode during convenient times such as off-shifts.

(5) Thermistor or Interlock

The manager can select (yes/no) based on whether the charger has a thermistor connected to sense battery temperature or simply a connector interlock. This wiring connection regardless of function, is used for sensing battery disconnect under load. This allows the charger to shut down to prevent arcing under this condition.

(6) Calibration Factor

An independent measurement of battery voltage is made and compared with the battery voltage that is measured by the output voltage sensor of the fast charger. The calibration factor compensates all the accumulated error throughout the measurement from, e.g., the output voltage sensor, conditioning circuitry on the DSP interface board, op-amps and filters, analog-to-digital conversion error on the DSP. Voltage at the battery may differ from voltage at the output filter (at output voltage sensor) by up to, e.g. −3% to +3%, but is typically less, e.g., +/−2%, and more preferably +/−1%. The calibration factor therefore adjusts for error introduced in the conversion of analog to digital input as well as losses and measurement error and allows the output voltage measurement to be reasonably accurate, e.g., within about 50 millivolts.

(7) Exit

Leave the setup program and return to normal program; adjustments have been completed.

In other embodiments, additional or different control functions can be included in the menu-driven set-up. For example, more than one charging algorithm can be stored in the DSP, e.g., a standard I-V-I profile for open batteries such as the flooded lead acid storage batteries, a custom profile for charging closed batteries such as sealed lead acid storage batteries, and yet a different profile suitable for charging batteries of a different electrochemistry and voltage, e.g. NiCd or NiMH storage batteries.

Operation After Setup

The capability to set the battery capacity and the maximum rate of charging for each battery voltage that the charger will see enables efficient use of the fast charge to charge as rapidly as is safely allowable. In addition, flexible use of the charger with batteries of varying voltages is enabled; for example, at this time it is not uncommon to see 48-volt and 36-volt batteries in the same location, with more than one truck or lift assigned to each charger, and some combinations of equipment requiring different battery sizes will probably always occur. Furthermore, setting the battery capacity renders the battery gauge accurate, so that the operator has good information on the battery SOC. By contrast, other chargers often require the operator to insert a separate battery-monitoring device ("BMID") into the battery to be charged in order to determine its identity, and therefore require additional costs and complication.

After the battery parameters are set, the fast charger is ready to be used in "opportunity charging" mode where the operator connects the battery to the charger during all breaks and lunch-hours, so that the battery operates at a relatively high SOC during most of its usage. Upon connection, the fast charger's output voltage sensor measures the voltage of the battery and the fast charger charges the battery after identifying its voltage at the set maximum current throughout the constant current cycle. When the battery voltage reaches its maximum value, the fast charger switches over to a constant voltage regime, and current is decreased to maintain the constant voltage as the battery SOC increases. When the current declines to a preset low value, e.g., 5 Amperes per 100 Ahrs of battery capacity, and if the time is in the allowed time slot, the charger enters the "finish" mode and delivers a constant current of a low value, e.g. 3–5 Amperes per 100 amp-hours, for a time that is calculated to bring the battery to 100% SOC. For example, if a 1000 Ampere-hour 36 volt battery is charged during the constant voltage phase at 43.5 volt until it reaches 90% SOC, 800 AHR (usable)×0.9=720 AHR, implying that the battery can accept an additional 80 AHR, or about 100 AHR adjusted for losses due to out-gassing and wasted energy (self heating etc.).

If an unrecognized voltage or mismatched capacity battery is connected, the system described above ensures that the battery is handled safely. If a smaller capacity battery than is programmed into the ampere hour capacity setting for that voltage is connected, the SOC indicator ("fuel gauge") would be somewhat inaccurate and it will charge at a higher rate for a short period than would be usually chosen, but it would quickly cut back current as the maximum voltage is reached. If a larger capacity battery than is programmed into the ampere-hour capacity setting for that voltage is connected, it will be charged more slowly than need be. If a battery is connected to the charger and it is read as having a voltage in a range that hasn't been preset, the fast charger "trickle charges" (100 amps or 50 amps etc., as preset) the battery until it reaches a voltage that is recognized. If it is not recognized within a preset time (e.g. 1 hour), the charger will turn itself OFF. Some batteries arrive for charging in a "deeply discharged" state, i.e., discharged to below 20% SOC. After being trickle charged for a short time, its voltage rises and the battery is recognized as, for example, a 36 volt battery. For the example of lead acid storage batteries, preferably the battery is at or above 2 volts per cell before fast charging is initiated. In the industrial environment, it is not uncommon for batteries to be trickle-charged for a minute or a few minutes, and this is acceptable in the context of opportunity charging.

The example above is intended to illustrate the scope and flexibility of control possible with the DSP. By analogy, charging algorithms, variables, and preferred charging rates can straightforwardly be derived for other battery types, e.g., NiCad, Ni hydride, NiMH batteries, etc.

Charger for Multiple Batteries

A charger that can charge more than one battery at a time can be constructed by deploying a unitary charger with one heat sink per battery being charged (for ease of maintenance);

an output filter for each battery charge port;

an output voltage and current sensors for each battery charge port;

an output cable set for each battery charge port;

one fuse for each battery charge port; and a display and set of controls for each battery charge port.

Therefore, the charger's two charging ports can share many common parts, while sizing common parts larger to handle increased duty. The maximum charging rate and battery capacity can be set separately for each battery charging port, since measurements of battery voltage are input from the output sensors for each battery separately. The upper limit on the number of batteries that can be charged by one such fast charger is set by the available electrical service and the power factor of the charger. For an electrical service of 100 Amps at 480V AC:

$$IRMS = 100 * \text{square root of } 3 = 173A$$

$$\text{Apparent Power} = 480 * 173 = 83 KVA$$

$$\text{Output Power} = 0.88 * 0.87 * 83 KVA = 63.5 KW$$

(Efficiency and power factor calculated in)

This is the available output power that the charger could deliver. The amount of charge stations can be calculated from this number and the power needed for each battery.

The aspects and features of the invention are more fully shown by the following non-limiting examples.

EXAMPLES

Example 1

Fast Charger for Charging a Single High Capacity Battery

FIG. 30 (A–E) is a block diagram of a fast charger of the invention for charging a single high capacity, flooded lead-acid storage battery. Three-phase power is brought in through a Square D 60-ampere disconnect switch 260A and Bussmann 50-ampere input fusing 261A into a contactor 262A which is switched by a DSP controller 263A through a solid state relay 265A to apply power to the transformer 264A for charging. This three-phase step down transformer 264A, which converts the input 480 VAC to 106 VAC, is rated for a continuous 30 kVA with a temperature rise of only 80 degrees Celsius. The output of the three-phase transformer is wired to the power converter section 266A. The power converter section includes the following components:

Rectifier 267A

Filter section 268A

An IGBT high frequency controlled switch 269A

A freewheeling diode 270A

Sandwiched bus structure

Temperature sensing thermistor 271A

Heat sink

The rectifier section 267A comprises three dual diode modules configured as a three-phase rectifier. Each diode is rated for 240 Amps continuous at a temperature of 95 degrees Celsius. The blocking voltage of each diode is 1600V and the thermal impedance is 0.17° C./W. A preferred rectifier diode for such purpose is Sanrex part number DD240KB160. The rectifiers convert the three-phase 106V AC to an average of 143V with a 360 Hz AC component and supply this to the bus structure.

The filter section 268A comprises four film capacitors that are 600 μf each forming a total 2400 μf bus capacitance and a preferred film capacitor for such purpose is Roederstien part number GMKC600-600 IBRX. Each capacitor has a rating of 100 Arms to allow a total of 400 Arms bus ripple current capacity. The internal inductance of each capacitor is typically 50 nH and always less than 150 nH. This constitutes a total ESL for the bus capacitance of 12.5 nH or less and a maximum of 37.5 nH. The bus structure adds to the rest of the total inductance.

The IGBT PWM controlled switch 269A is in the Power Converter Module, and couples to the bus structure. The preferred device is a trench gate IGBT (Powerex CM600HU-12F, commercially available from POWEREX Inc., 200 Hills Street, Youngwood, Pa. 15697–1800, E-mail address, www.pwrx.com) having a rated VCES of 600V and a continuous 600 Amps at 25° C. current rating. It has a total of 12.2 mj of switching losses at 600 Amps on a 300 VDC bus. The thermal impedance is 0.08° C./W junction to sink and it has an on-state voltage of 1.6V at 600 Amps. This switch is PWM controlled to achieve an average voltage to supply to the output filter.

The IGBT employed in the invention can be of any suitable type. IGBT devices useful in the invention include, in addition to the POWEREX device mentioned above, IGBT devices commercially available from: Eupec, 1050 Rt. 22, Lebanon, N.J., 08833 USA, email address www.eupec.com; Fuji Semiconductor, 2532 Highlander Way, Carrollton, Tex. 75006 USA, email address www.fujisemiconductor.com; Semikron International, P.O. Box 82 02 51, D-90253 Nurnberg, Germany, email address www.semikron.com.

The freewheeling diode 270 conducts the stored energy in the output filters choke during the off time of the IGBT. The preferred part is a Powerex RM300CA-9W fast recovery welder diode module (commercially available from POWEREX Inc., 200 Hills Street, Youngwood, Pa. 15697–1800, E-mail address, www.pwrx.com). It is a dual diode package with a common cathode and each diode can carry 300 Amps continuous at 114° C. This provides a total of 600 Amps continuous capability in our circuit. The typical on state voltage at 600 Amps for the module is 1V. The reverse recovery time is 0.5 μs and the reverse recovery charge is 50 μC. It has a peak blocking voltage of 450V and a thermal impedance of 0.074° C./W. The low on state voltage and good thermal impedance make it an effective selection for this application.

The flywheel diode when used as a switching element in the invention can be of any suitable type. Flywheel diode devices useful in the invention include, in addition to the POWEREX device mentioned above, diode devices commercially available from: Eupec, 1050 Rt. 22, Lebanon, N.J., 08833 USA, email address www.eupec.com; Fuji Semiconductor, 2532 Highlander Way, Carrollton, Tex. 75006 USA, email address www.fujisemiconductor.com; Semikron International, P.O. Box 82 02 51, D-90253 Nurnberg, Germany, email address www.semikron.com.

The sandwiched bus structure interconnects all of the power converter components. It was constructed with eighth inch copper punched sheets and 30 mil thick Nomex® 410 poly(meta-phenyleneisophthalamide) (E. I. du Pont de Nemours and Company, Wilmington, Del.). The spacing between conducting copper sheets was provided by the Nomex® 410 insulator, and more generally can advantageously be in a range of from about 15 to about 100 mils as determined by the insulative material thickness. The contribution of the stray inductance was best found through measurement of the overshoot voltage of the switching waveform across the Freewheeling diode at a known current. From these measured values of overshoot voltage, time of voltage change (dt), and the change of current (di) calculate the value of bus inductance (Lbus) by:

$$Lbus = Vmeasured * dt/di$$

From measured data Vmeasured is 100V, dt is 200 ns, and di is 500A yielding a Lbus of 30 nH. From the resonant frequency formula, this calculates a resonant frequency of 18.76 KHz.

The temperature sensor 271A mounts to the heat sink in close proximity to the power semiconductors and senses the temperature of the heat sink. The semiconductor junction temperatures are calculated from thermal impedances. The preferred device is a BetaTherm part number 5K3D148 negative temperature coefficient (NTC) thermistor with a room temperature of 5 k ohms. At a temperature of 95° C. the resistance of the thermistor decreases to 394 ohms. From the temperature versus resistance data of the thermistor, the controller knows what the temperature of the semiconductors is. Preferably, the temperature trip point for an over temperature is 95° C. allowing for some heat spreading thermal impedances.

The last critical component is the heat sink, which may be of suitable type, e.g., a heat sink such as R-Theta part number DFC305T19A37AH118BXX. The heat sink serves as the cooling mechanism for the power semiconductors. It is constructed of hollow aluminum fins pressed into a half-inch thick aluminum base plate with two 100 cubic feet per minute fans that blow along the fins for forced air-cooling.

The power converters output couples to the output filter section consisting of a series inductor 272A and an output capacitor filter 273A.

The inductor is 130 μH 600A continuous laminated steel I core. A preferred output choke inductor element for such purpose is a Laconia Magnetics LMI-3499 (commercially available from Laconia Magnetics, P.O. Box 1457, Prescott Hill Road, Laconia, N.H. 03247. The output choke may be of any suitable type. Alternative output choke devices are readily commercially available and include those available from TRENCO, 2550 Brookpark Road, Cleveland, Ohio, 44134 USA.

A suitable capacitor for such purpose is Roederstien part number GMKC600-600 IBRX with a rating of 100 Arms. This filter is sized to filter out the AC components generated by the IGBT switching converter and the AC ripple voltage from the minimal capacitance technique on the input. The smaller the AC component of the output is, the less heating that will occur in the battery being charged and the output Hall Effect sensor. In this design, the output AC component is kept to below 5% of the total output.

The DC output and input bus voltage of the charger is monitored with voltage sensors 274A and 286A. The arrangement may employ an Agilent 7800A isolation amplifier with linear amplifier circuits to scale the output to the DSP and interface circuitry 263A. This sensor also provides isolation and filtering to protect sensitive electronic control circuits such on the digital signal processor (DSP) based control board. If isolation is not desired for cost reasons, a simple resistor divider can be used in place of the isolation amplifier.

A LEM Hall Effect sensor 276A, which may for example comprise an HTA-400-S/SP2 current transducer (commercially available from LEM U.S.A., Inc., 6643 West Mill Road, Milwaukee, Wis. 53218 USA, email address www.lem.com), monitors the output DC current of the charger. One key specification to consider is that the product of the AC RMS ripple current amperage and frequency of that same ripple current cannot exceed 400 k. Excessive heating will result in the magnetic core of the Hall Effect sensor if this specification is exceeded. The Hall effect sensor provides a fast current measurement with a 3 $\mu$s response time. Unlike current shunts found inline with the output current, a Hall Effect is isolated from the current being measured and therefore does not affect load efficiency. The overall accuracy is plus or minus one percent and a gain variation of 0.05% of reading per degree Celsius.

The Hall Effect sensor may be of any suitable type, including for example the aforementioned HTA400-S/SP2 current transducer (LEM U.S.A., Inc., 6643 West Mill Road, Milwaukee, Wis. 53218 USA, email address www.lem.com), as well as Hall Effect transducers commercially available from F. W. Bell Products, 6120 Hanging Moss Road, Orlando, Fla. 32807, USA, email address www.sypris.com.

The circuit has a 600 amp fuse 284A for final circuit protection at the charger output before external connection to the battery. A preferred fuse assembly for such purpose is a Bussmann fuse# JJN-600 with a Bussmann fuse holder, part#1BS104.

There is a large red emergency stop switch 285A on the charger, which interrupts both control power and the solid-state relay contactor coil circuit. This provides an instant off control ability in the event of an emergency.

The DSP controller 263A is a control board developed specifically for battery charging. It includes a Texas Instruments TMS320LF2406 digital signal processor (DSP), which incorporates flash memory and a time processor unit for PWM generation. It reads the information sent back from the various sensors and makes the appropriate changes to the PWM signal and then sends it to the IGBT switch 277. The control includes other operator inputs such as switches for starting, stopping 278A, and changing set up parameters 279A. Its other outputs include a two line large character vacuum fluorescent alphanumeric display 280A as for example a display commercially available from Noritake as Model# CU20029SCPB-T20A, and different colored light emitting diodes (LEDs) 281A for charger status indication of STOP (red), CHARGING (amber), FIN/EQ (yellow), and COMPLETE (green). Power is supplied to the DSP controller and all peripheral circuitry by a 24V AC 50 VA control transformer 283A, which may for example comprise a Hammond Transformer (Model# SL50AG).

Example 2

Fast Charger for Charging Two High Capacity Batteries

FIG. 31 (A–E) is a block diagram of a fast charger of the invention for simultaneously charging two high capacity batteries. The circuit is similar to the single fast charger in Example 1. The input switchgear, fusing and transformer, are sized to accommodate two batteries; other components are present in duplicate. Because the chargers share important parts in common, maintenance is simplified.

In the dual fast charger of FIG. 31 (A–E), three-phase power is brought in through a larger Square D 100 ampere disconnect switch 300C and Bussmann 90A input fusing 301C into a higher capacity Square D 75A contactor 303C. The three-phase step down transformer 305C, which converts the input 480/600 VAC to 106 VAC, is rated for continuous 60 kVA with a temperature rise of only 80 degrees Celsius. The output of the three-phase transformer is electrically connected to two power converter sections 306C and 307C. The power converter sections and output filter sections comprise the same elements as described for the single fast charger of Example 1, except now there are two of them.

The DSP controller reads the information sent back from sensors in both chargers, makes the appropriate changes to the respective PWM signals and then sends it in lines 308C and 309C to the proper IGBT switches 402 and 400, respectively. The charger control panel is arranged left and right as charger "A" and "B" respectively. The control includes switch inputs for starting and stopping both "A" and "B" sides 310B. Its other outputs include displays 311C and 312C and two rows of different colored light emitting diodes (LEDs) 311B for charger status indication for both "A" and "B" sides. The parts are the same found as in the single fast charger, just the display panel is enlarged and arranged to accommodate two sides for control of both chargers.

Example 3

Fast Charger with Controlled Current Draw

A controlled power charger can be constructed and arranged so that it will never draw more than 30 amperes from the three-phase 480 or 600V AC line. This feature is very important in many industrial installations. Thirty ampere (30A) three-phase service, 480 or 600V AC, is presently in place for many of the existing chargers as well as to welding/service plugs found throughout typical manufacturing plants. The cost to run new 60 ampere or 100 ampere service is extremely prohibitive. It must often be done during third shift or weekend downtime, often with union labor, at overtime or 2×standard wage rates. The convenience and cost savings in being able to use existing service is a great advantage. All other types of fast chargers heretofore known require in excess of 40 amperes from the line. Such current draw requirements of the known types of fast chargers therefore would require new electrical service for all installations where 30A service is presently employed. The fast charger of the present invention overcomes such limitation of the prior art, and thereby achieves a significant advance in the field of the invention.

In a fast charger fabricated in accordance with the present invention, input current is controlled by monitoring the output current and voltage, calculating the output power, and multiplying by a factor that compensates for the approximate efficiency and power factor. This value is compared to a not-to-be-exceeded maximum value to prevent current draw in excess of 30 amperes. If the value exceeds this maximum, then the PWM is reduced. If the value is less than the maximum, then the PWM is controlled by the usual constraints of voltage and current during the charge cycle.

The following equations and appertaining algorithmic procedure, including software code for effectuating same, illustrate this aspect of the invention.

Equation:

Is ((AMPS1*VOLTS1)/16<17136)?

If yes, *PWM=PWM*-1
If no, no action by this algorithm
Code Example for Power Output Limitation:

```
;**** Limit output to 20 KW *********************
SPM    0           ;Set product shift mode to 0
LDP    #AMPS 1     ;Set data pointer to Amps 1
LT     AMPS 1      ;Load Amps value into TREG
LDP    #VOLTS 1    ;Set data pointer to Volts 1
MPY    VOLTS 1     ;Multiply Together
PAC                ;Move value to Accumulator
RPT    #3          ;Repeat next command 4 times (1 + #)
SFR                ;Shift right 4 times to divide by 16, scale value to
                    <65,536
SUB    #17136      ;Subtract from maximum allowable value
BCND   DEC_        ;If > Max number then DEC PWM Immediately
       PWM1, GT    ************
```

The components disclosed in the various publications, disclosed or incorporated by reference herein, may be used in the embodiments of the present invention, as well as equivalents thereof. The appended drawings in their entirety, including all dimensions, proportions and/or shapes in at least one embodiment of the invention, are accurate and are hereby included by reference into this specification. All, or substantially all, of the components and methods of the various embodiments may be used with at least one embodiment or all of the embodiments described herein. It will be appreciated, for example, that the fast charger of the present invention may be embodied in full-bridge configurations, such as with the provision of an IGBT full bridge power converter arrangement. The details of the various illustrative embodiments disclosed herein may be further varied and modified within the skill of the art based on the disclosure herein. All patents, patent applications, publications and websites identified herein are hereby incorporated by reference as if set forth in their entirety herein. All of the references and documents, cited in any of the documents cited herein, are hereby incorporated by reference as if set forth in their entirety herein. All of the documents cited herein, referred to in the immediately preceding sentence, include all of the patents, patent applications, publications, and websites cited anywhere in the present application.

The details in the patents, patent applications and publications may be considered to be incorporable, at applicant's option, into the claims during prosecution as further limitations in the claims to patentably distinguish any amended claims from any applied prior art. The invention as described hereinabove in the context of the preferred embodiments is not to be taken as limited to all of the provided details thereof, since modifications and variations thereof may be made without departing from the spirit and scope of the invention.

What is claimed is:

1. A fast charger for high capacity batteries, comprising:
   an input power conditioner including an AC input rectifier yielding rectified input, and a film capacitor coupled with the AC input rectifier, wherein the film capacitor operates at frequency above about 2 kilohertz;
   a power converter including a buck regulator coupled with the input power conditioner to receive rectified input therefrom, and including switching componentry operating at frequency above about 2 kilohertz, producing a power output; and
   an inductive filter coupled in power output-receiving relationship to said power converter, to produce a filtered fast charging power output.

2. The fast charger of claim 1, wherein said filtered fast charging power output is at voltage in a range of from about 12 to about 300 volts.

3. The fast charger of claim 1, wherein said filtered fast charging power output has a AC ripple current of less than about 5% of maximum load current when said fast charger is coupled to a high capacity battery.

4. The fast charger of claim 1, wherein said filtered fast charging power output has a AC ripple current of less than about 2.5% of maximum load current when said fast charger is coupled to a high capacity battery.

5. The fast charger of claim 1, wherein said filtered fast charging power output has a voltage AC ripple of less than about 0.5% of maximum load voltage when said fast charger is coupled to a high capacity battery.

6. The fast charger of claim 1, having a charging rate of less than 1.5 hours for at least 80% SOC when said fast charger is coupled to a high capacity battery having 100 Ampere-hours capacity at 30% SOC.

7. The fast charger of claim 1, wherein said switching componentry comprises an insulated gate bipolar transistor (IGBT).

8. The fast charger of claim 1, wherein said switching componentry comprises a trench-gate insulated gate bipolar transistor (IGBT).

9. The fast charger of claim 1, wherein said switching componentry comprises a Metal Oxide Semiconductor Field Effect Transistor (MOSFET).

10. The fast charger of claim 1, wherein said switching componentry comprises a flywheel diode.

11. The fast charger of claim 1, wherein said switching componentry comprises a switch operating at a switching frequency in a range of from about 2 kilohertz to about 50 kilohertz and a switching voltage in a range of from about 100 to about 1400 volts.

12. The fast charger of claim 1, wherein said switching componentry comprises a switch operating at a switching frequency in a range of from about 2 kilohertz to about 50 kilohertz and a switching voltage in a range of from about 100 to about 1400 volts, with pulsed current in a range of from about 150 to about 2000 amperes.

13. The fast charger of claim 11, wherein said switching componentry comprises a bipolar transistor.

14. The fast charger of claim 1, wherein said switching componentry comprises an insulated gate bipolar transistor (IGBT) and a flywheel diode.

15. The fast charger of claim 1, wherein said fast charger produces said filtered fast charging power output without substantial capacitive filtering of rectified AC input frequency.

16. The fast charger of claim 1, wherein said power converter comprises PWM circuitry, arranged to modulate operation of said buck regulator.

17. The fast charger of claim 1, wherein said film capacitor comprises an array of capacitors.

18. The fast charger of claim 17, wherein said film capacitor comprises a polymeric film capacitor.

19. The fast charger of claim 18, wherein said polymeric film capacitor comprises a polypropylene film capacitor.

20. The fast charger of claim 1, wherein said film capacitor comprises a high ripple current film capacitor.

21. The fast charger of claim 1, wherein said filtered fast charging power output comprises ripple current not exceeding about 10% of peak current when said fast charger is coupled to a high capacity battery.

22. The fast charger of claim 1, wherein said inductive filter comprises an air core choke inductor.

23. The fast charger of claim 16, wherein said power converter is arranged to synchronously vary a duty cycle of said PWM circuitry in response to AC ripple voltage of said rectified input.

24. The fast charger of claim 23, wherein said power converter is arranged to continuously monitor said ripple voltage and adjust driving of said PWM circuitry on a pulse-by-pulse basis.

25. The fast charger of claim 23, wherein said power converter is arranged to remove 360 Hertz AC ripple component so that said power output comprises constant DC voltage.

26. The fast charger of claim 23, wherein said power converter is arranged to monitor voltage of said power output and to (i) adjust same in relation to a first voltage setpoint, and to further adjust same in relation to current in said power output at a second voltage setpoint.

27. The fast charger of claim 23, wherein said power converter is arranged to monitor voltage and current of said power output and to adjust same in relation to setpoint(s) therefor, while allowing passage of 360 Hertz AC ripple current and voltage to said power output.

28. The fast charger of claim 27, wherein said power converter is arranged to adjust said power output while analog filtering power therein and time averaging same to damp adjustment of said power output.

29. The fast charger of claim 27, wherein said power converter is arranged to adjust said power output while damping adjustment of said power output by at least one of (i) numerical methods technique and (ii) constraining adjustment frequency by a predetermined constraint thereon.

30. The fast charger of claim 1, further comprising a programmable controller programmably arranged to control time-varying charging at a fixed charging variable condition, wherein said charging variable is selected from the group consisting of charging voltage and charging current.

31. The fast charger of claim 30, wherein said programmable controller is programmably arranged to control time-varying charging according to an IVI charging profile.

32. The fast charger of claim 31, wherein said IVI charging profile comprises a first constant current charging to about 50% of battery capacity, a second constant voltage charging until the battery reaches the charge rate of 5A/100 Ahr of capacity, and a third constant current charging to rated battery Ahrs capacity.

33. The fast charger of claim 1, further comprising a programmable controller programmably arranged to control charging current below a predetermined current set point.

34. The fast charger of claim 33, wherein said predetermined current set point is in vicinity of about 30 amperes.

35. The fast charger of claim 33, wherein said charging current is maintained below a predetermined current set point by pulse width switching of said switching componentry.

36. The fast charger of claim 1, further comprising thermal management element(s) for maintaining temperature of a battery during charging by the fast charger.

37. The fast charger of claim 36, wherein said thermal management elements comprise at least one of (i) a fluid flow source for cooling of the battery and (ii) thermally conductive dissipation element(s) for thermally contacting and conductively dissipating heat from said battery.

38. A fast battery charger comprising an AC input rectification conditioner and film capacitor operating above 2 kilohertz, operatively coupled with a buck regulator switching at above 2 kilohertz and inductive filter for producing a filtered fast charaing output, a battery charging power transmission member arranged for transmitting said filtered fast charaing output to a battery, and a programmable controller programmably arranged to control time-varying charging at a fixed charging variable condition, wherein said charging variable is selected from the group consisting of charging voltage and charging current, and wherein said programmable controller is programmably arranged to control time-varying charging according to an IVI charging profile.

39. The fast charger of claim 1, further comprising a battery charging power transmission member, and a housing having disposed therein power management circuitry including said input power conditioner, power converter and inductive filter, for producing battery charging power, wherein said battery charging power transmission member comprises a charging cable arranged with a retractor enabling said charging cable to be refracted toward the housing from an extended use position to a retracted non-use position, and to be extensibly drawn away from said housing for battery charging.

40. The fast charger of claim 1, further comprising a battery charging meter, comprising a selectively iliuminatable array of illuminating elements, and circuitry for electrically coupling said array to a battery charger, arranged to actuate a progressively increasing number of said illuminating elements for emission of illumination therefrom in correspondence to a state of charge of a battery when connected to the battery charger and during charging of the battery by the battery charger.

41. The that charger of claim 40, wherein the array of illuminating elements is linear, and its end points are demarcated by indicia of respective low/no-charged state and fully charge state of said battery.

42. The fast charger of claim 41, wherein the indicia comprise "E " and "F" indicia.

43. A fast battery charger comprising power management circuitry for producing battery charging power, including an AC input rectification conditioner and film capacitor operating above 2 kilohertz, operatively coupled with a buck regulator switching at above 2 kilohertz and inductive filter for producing a filtered fast charging output, a battery charging power transmission member arranged for transmitting said filtered fast charging output to a battery, and a housing having disposed therein said power management circuitry for producing battery charging power, said housing including an openable/closable member for selective access to an interior region of said housing, wherein said openable/closeable member is coupled with a member for producing an open circuit condition in said power management circuitry when said openable/closeable member is opened.

44. A method of fast charging high capacity batteries, comprising:
　conditioning input power by AC input rectification thereof yielding rectified input, in a circuit including a film capacitor coupled with an AC input rectifier, wherein the film capacitor operates at frequency above about 2 kilohertz;
　converting power from said conditioning step in a circuit including a buck regulator and switching componentry operating at frequency above about 2 kilohertz, to produce a power output; and
　inductively filtering the power output, to produce a filtered fast charging power output.

45. A method of charging a a high capacity battery, comprising:

charging said battery at a rate of greater than 30 Amper per 100 Ampere-hours of battery capacity, to bring the state of charge of said battery from 30% to 80% of full charge in less than about 1.5 hours;

maintaining temperature of said battery below 125° F. during said charging and transmitting charging energy to said battery during said charging according to an IVI charging profile.

46. The method of claim 45, wherein said IVI charging profile comprises a first constant current charging to about 50% of battery capacity, a second constant voltage charging until the battery reaches a charge rate of 5A/100 Ahr capacity, and a third constant current charging to rated battery Ahrs capacity.

47. A method of recharging a high capacity battery having a depleted state of charge, comprising:

charging said battery at a rate of greater than 30 Amperes per 100 Ampere-hours of battery capacity, to bring the state of charge of said battery from 30% to 80% of full charge in less than about 1.5 hours; and maintaining temperature of said battery below 125° F. during said charging.

48. The method of claim 47, wherein the step of maintaining temperature of said battery below 125° F. during said charging, comprises thermistically monitoring temperature of electrolyte in said battery, and varying charge rate during said charging.

49. The fast charger of claim 1, constructed and arranged to deliver energy at a voltage in a range of from about 12 to about 300 volts.

50. The fast charger of claim 1, coupled to a high capacity lead-acid battery for delivery of said filtered fast charging power output to said battery.

51. A fast charger for high capacity batteries, comprising:
(a) an AC input;
(b) means for rectifying AC power from said AC input to produce a rectified output;
(c) means for converting said rectified output to a converted DC output for charging a high capacity battery, said means comprising high frequency, high ripple current capacitors switched with a power switching circuit in a buck configuration into an inductor/capacitor output filter; and
(d) cabling for transmission of the rectified output to the high capacity battery, wherein said means (b) and (c) are arranged for charging the high capacity battery at a charging rate greater than 30 A per 100 Ahrs of capacity to bring the state of charge of the battery from 30% to 80% of full charge in less than 1.5 hrs while maintaining temperature of said battery below 125° during said charging.

52. The fast charger of claim 51, wherein said means (b) and (c) are contained in a unitary housing.

53. The fast charger of claim 52, wherein said housing includes an access door.

54. The fast charger of claim 53, wherein the access door is coupled with a circuit breaker to said AC input so that opening of the door interrupts power availability to the fast charger.

55. A fast charger for high capacity batteries, comprising:
(a) an AC in put;
(b) means for rectifying AC power from said AC input to produce a rectified output;
(c) means for converting said rectified output to a converted DC output for charging a high capacity battery, said means comprising high frequency, high ripple current capacitors switched with a power switching circuit in a buck configuration into an inductor/capacitor output filter, and
(d) cabling for transmission of the rectified output to the high capacity battery;

wherein said means (c) comprise a first electronic switch driven by a pulse width modulation circuit and a second electronic switch providing a current path when the first switch is off in a pulse width modulation cycle of the first switch.

56. The fast charger of claim 55, wherein said first electronic switch comprises at least one high ripple current film capacitor.

57. The fast charger of claim 55, wherein said second electronic switch comprises a flywheel diode.

58. The fast charger of claim 55, wherein said wherein said means (c) provide no substantial capacitive filtering of said rectified output in converting same to said converted DC output.

59. A method of fast charging a high capacity battery, comprising generating output charging power with rectification and pulse width modulation of an AC input, modulating the output charging power in response to the rectified AC input waveform, and synchronously varying the pulse width modulation duty cycle in proportion and response to the AC ripple voltage of the rectified AC input waveform, to provide a substantially constant DC voltage output charging power, wherein said AC input after said rectification is conditioned in a conditioning circuit including a film capacitor operating at above 2 kilohertz, and converted to said substantially constant DC voltage output charging power by subjecting she conditioned AC input to flower conversion effecting said pulse width modulation, and inductive filtering, wherein said power conversion is effected in a power converter including a buck converter and switching componentry operating at frequency above 2 kilohertz.

60. A fast battery charger comprising an AC input rectification conditioner and film capacitor operating above 2 kilohertz, operatively coupled with a buck regulator switching at above 2 kilohertz and inductive filter for producing a filtered fast charging output, a battery charging power transmission member arranged for transmitting said filtered fast charging output to a battery, and a programmable controller programmably arranged to control time-varying charging at a fixed charging variable condition, wherein said charging variable is selected from the group consisting of charging voltage and charging current, and wherein said programmable controller is programmably arranged to control time-varying charging according to a predetermined charging profile.

61. A fast charger for a high capacity battery, comprising:
an input section including a transformer for voltage adjustment of inputted AC voltage and a rectifier for producing a rectified bus voltage;
a conditioning section arranged to receive the rectified bus voltage, including a first electronic switch, a pulse width modulation circuit driving said first electronic switch, and a second electronic switch providing a current path with the first electronic switch is off in a pulse width modulation cycle of said pulse width modulation circuit, and at least one film capacitor filtering the first electronic switch and output filter circuitry while minimally filtering the bus voltage, said conditioning section producing a conditioned power output; and an output filter comprising said output filter circuitry, arranged to receive the conditioned power output and produce a charging power output.

62. The fast charger of claim 61, wherein the first switch comprises a power transistor.

63. The fast charger of claim 62, wherein the power transistor is constructed and arranged for switching voltage in a range of from about 100 V to about 1400 V and switching frequency at frequencies of at least 2 kilohertz.

64. The fast charger of claim 62, wherein the power transistor comprises an IGBT.

65. The fast charger of claim 61, wherein the second switch comprises a flywheel diode.

66. The fast charger of claim 61, wherein said output filter comprises an inductor and a high frequency, high ripple current capacitor.

67. The fast charger of claim 61, wherein the pulse width modulation circuit comprises output transducers monitoring the charging power output, a controller circuit reading the transducers, and a controller regulating output of the pulse width modulation circuit.

68. The fast charger of claim 61, wherein said at least one film capacitor comprises a polypropylene film capacitor.

69. The fast charger of claim 61, further comprising a thermistor sensor for sensing battery temperature, and a charging program stored in the fast charger and operatively arranged to vary charging conditions in response to battery temperature sensed by the thermistor sensor.

70. The fast charger of claim 69, wherein the thermistor sensor is arranged for contacting with electrolyte of a battery during charging thereof.

71. The fast charger of claim 69, wherein the thermistor sensor is arranged for contacting of post structure of a battery during charging thereof.

72. The fast charger of claim 69, wherein the thermistor sensor is arranged for contacting of interconnects coupled with a battery during charging thereof.

73. The fast charger of claim 69, wherein the program is operatively arranged to vary charging voltage.

74. The fast charger of claim 69, wherein the program is operatively arranged to vary charging current.

75. The fast charger of claim 69, wherein the program is operatively arranged to shut down the fast charger if battery temperature exceeds a predetermined value.

76. The fast charger of claim 61, wherein the output filter circuitry comprises a magnetic core inductor constructed to prevent occurrence of saturation.

77. The fast charger of claim 76, wherein said magnetic core inductor comprises an open-ended laminated I-core high frequency choke.

78. A method of fast charging of a high capacity battery, comprising:
rectifying an input AC voltage to produce a rectified bus voltage;
conditioning the rectified bus voltage, by conditioning circuitry including a first electronic switch, a pulse width modulation circuit driving said first electronic switch, and a second electronic switch providing a current path with the first electronic switch is off in a pulse width modulation cycle of said pulse width modulation circuit, and at least one film capacitor filtering the first electronic switch and output filter circuitry while minimally filtering the bus voltage, to produce a conditioned power output; and
filtering said conditioned power output to produce a charging power output for fast charging of the high capacity battery.

79. The method of claim 78, wherein said input AC voltage is a three-phase power input voltage, and the pulse width modulation cycle is modulated in response to AC ripple voltage of the rectified AC input waveform.

80. The method of claim 79, wherein AC ripple component is substantially removed from the charging power output.

81. The method of claim 78, further comprising monitoring an operating variable affecting the fast charging, and responsively adjusting the pulse width modulation cycle.

82. The method of claim 81, wherein ripple voltage of said rectified bus voltage is monitored, and the pulse width modulation cycle is responsively adjusted on a pulse-by-pulse basis.

83. The method of claim 78, further comprising maintaining temperature of the high capacity battery below 125° F. during the fast charging.

84. The method of claim 78, comprising conducting said fast charging in a staged progression of steps including at least one constant current step and at least one constant voltage step.

85. The method of claim 84, including a first constant current step, a second constant voltage step and a third constant current step.

86. The method of claim 85, wherein the first step comprises charging the battery at constant current to about 50% of its capacity.

87. The method of claim 86, wherein the second step comprises charging the battery at constant voltage until the battery reaches a charge rate of about 5A/100 Ahrs. of battery capacity.

88. The method of claim 87, wherein the third step comprises charging the battery at constant current to its rated Ahr. capacity.

89. The method of claim 87, wherein the battery has a state of charge at the conclusion of the second step that is about 90% SOC.

90. The method of claim 78, further comprising maintaining temperature of the battery during fast charging thereof below 125° F.

91. The method of claim 90, wherein said maintaining temperature comprises flow of coolant air over the battery.

92. The method of claim 90, wherein said maintaining temperature comprises modulating charging conditions to maintain temperature rise incident to charging below a level that would raise battery temperature above 125° F.

93. The method of claim 90, wherein said maintaining temperature comprises monitoring temperature of electrolyte in said battery, and responsively modulating charging conditions to maintain battery temperature below 125° F.

94. The method of claim 78, wherein more than one battery is concurrently charged.

95. The method of claim 78, wherein the battery is selected from the group consisting of flooded lead-acid batteries and sealed batteries.

96. The fast charger of claim 39, wherein said retractor comprises a tensioning reel.

97. The fast charger of claim 39, wherein said retractor comprises a pulley coupled with a counterweight to effect retraction of said charging cable.

98. The fast charger of claim 61, further comprising a charging program stored in the fast charger and operatively arranged to adjust the pulse width modulation cycle of said pulse width modulation circuit in response to AC ripple voltage of the rectified AC input waveform.

99. The fast charger of claim 61, further comprising a program stored in the fast charger, arranged to control said conditioning section to produce a predetermined charging power output, and to adjust operation of the fast charger for at least one variable operating parameter selected from the group consisting of (1) battery voltage, (2) battery capacity, (3) maximum charging rate, (4) charging algorithm and (5) set point times for finishing and equalizing battery charging.

100. The fast charger of claim 61, further comprising a program stored in the fast charger, and arranged for selective control of charging operation steps of the fast charger, wherein said charging operation steps include (a) battery parameter set-up, (b) finish and equalize battery charge, (c) set time and date, (d) delayed start, (e) battery temperature sensing (yes/no), (f) calibration factor, and (g) exit/reversion to normal charging program.

* * * * *

UNITED STATES PATENT AND TRADEMARK OFFICE
CERTIFICATE OF CORRECTION

PATENT NO. : 6,803,746 B2
DATED : October 12, 2004
INVENTOR(S) : Aker et al.

It is certified that error appears in the above-identified patent and that said Letters Patent is hereby corrected as shown below:

Column 19,
Line 45, "106V AC" should be -- 106 VAC --

Column 20,
Line 34, "$_{desired}:=0.025 \cdot Max_{Iout}$" should be -- $d1_{desired}:=0.025 \cdot Max_{Iout}$ --

Column 27,
Line 4, "thereof" should be -- thereof. --

Column 45,
Line 1, "a a" should be -- a --

Signed and Sealed this

Seventh Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,803,746 B2
DATED : October 12, 2004
INVENTOR(S) : Aker et al.

It is certified that error appears in the above-identified patent and that said Letters Patent is hereby corrected as shown below:

Column 19,
Line 45, "106V AC" should be -- 106 VAC --

Column 20,
Line 34, "$_{desired}:=0.025 \cdot Max_{Iout}$" should be -- $di_{desired} := 0.025 \cdot Max_{Iout}$ --

Column 27,
Line 4, "thereof" should be -- thereof. --

Column 45,
Line 1, "a a" should be -- a --

This certificate supersedes Certificate of Correction issued June 7, 2005.

Signed and Sealed this

Fifth Day of July, 2005

JON W. DUDAS
*Director of the United States Patent and Trademark Office*